April 24, 1962  D. J. GREEN ETAL  3,031,658
AIR TRAFFIC CONTROL SYSTEM
Filed Aug. 21, 1956

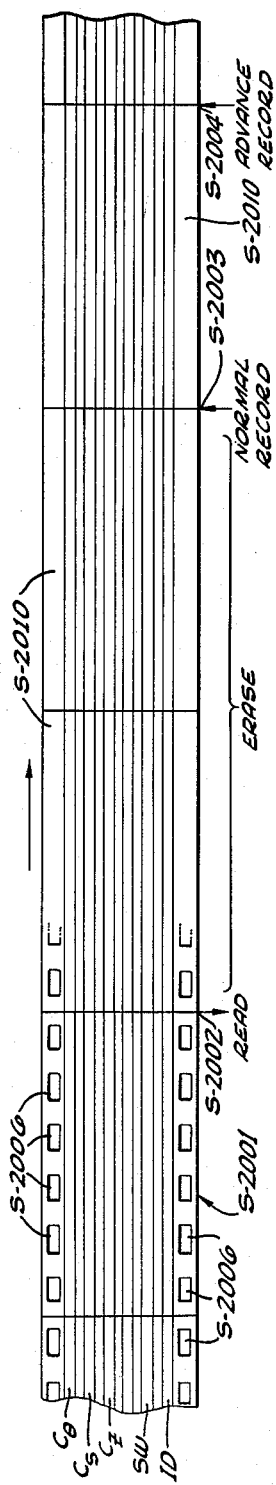
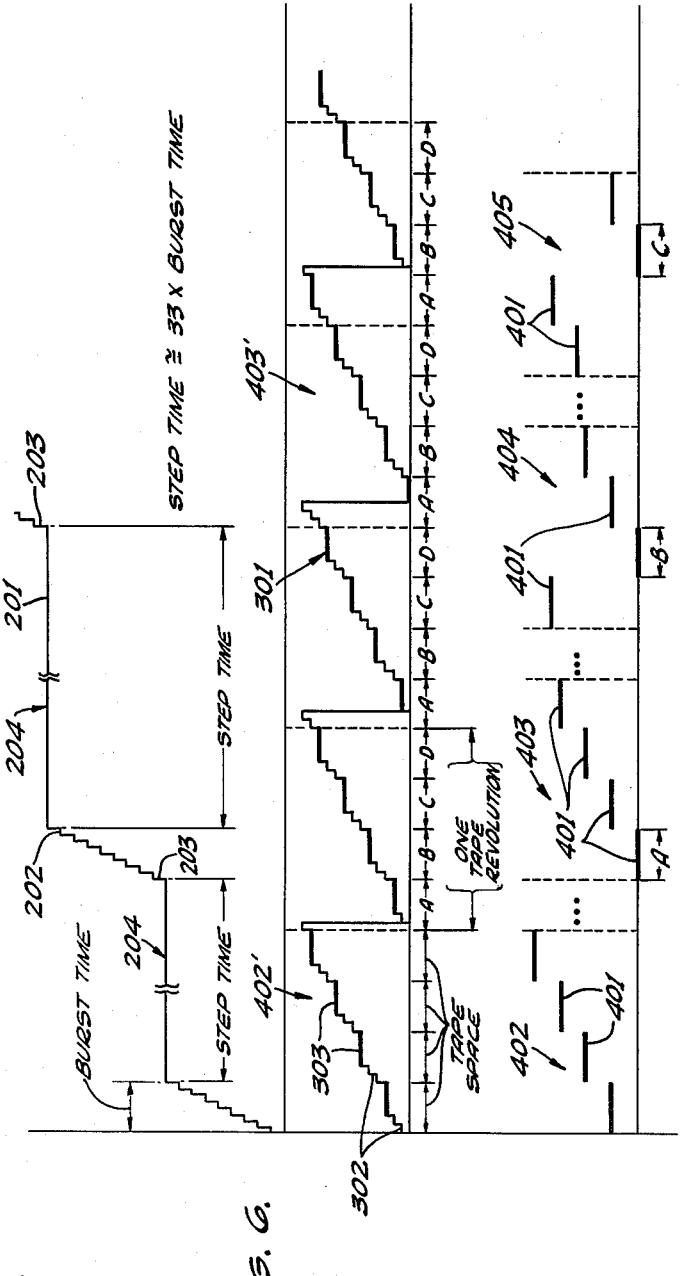

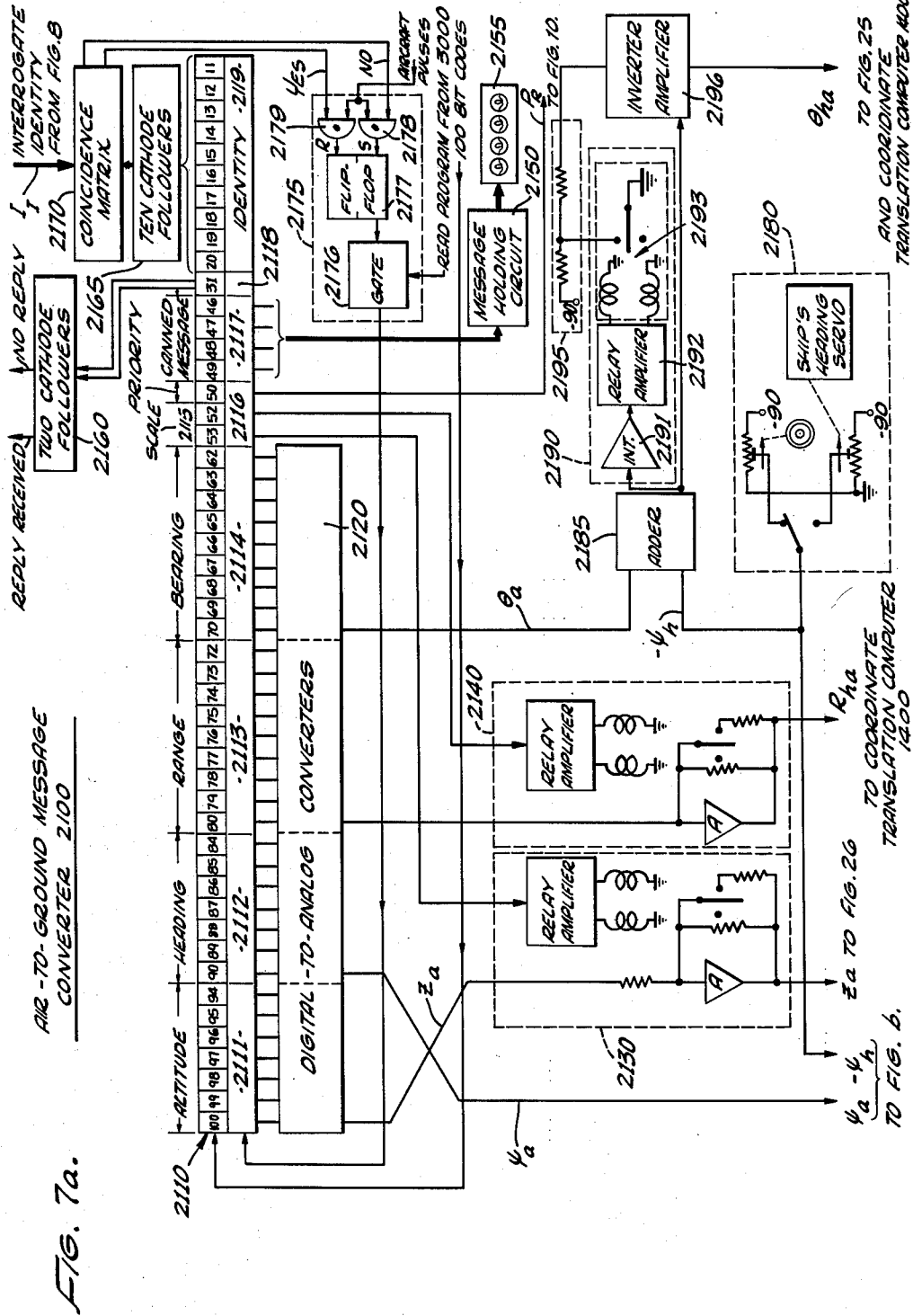

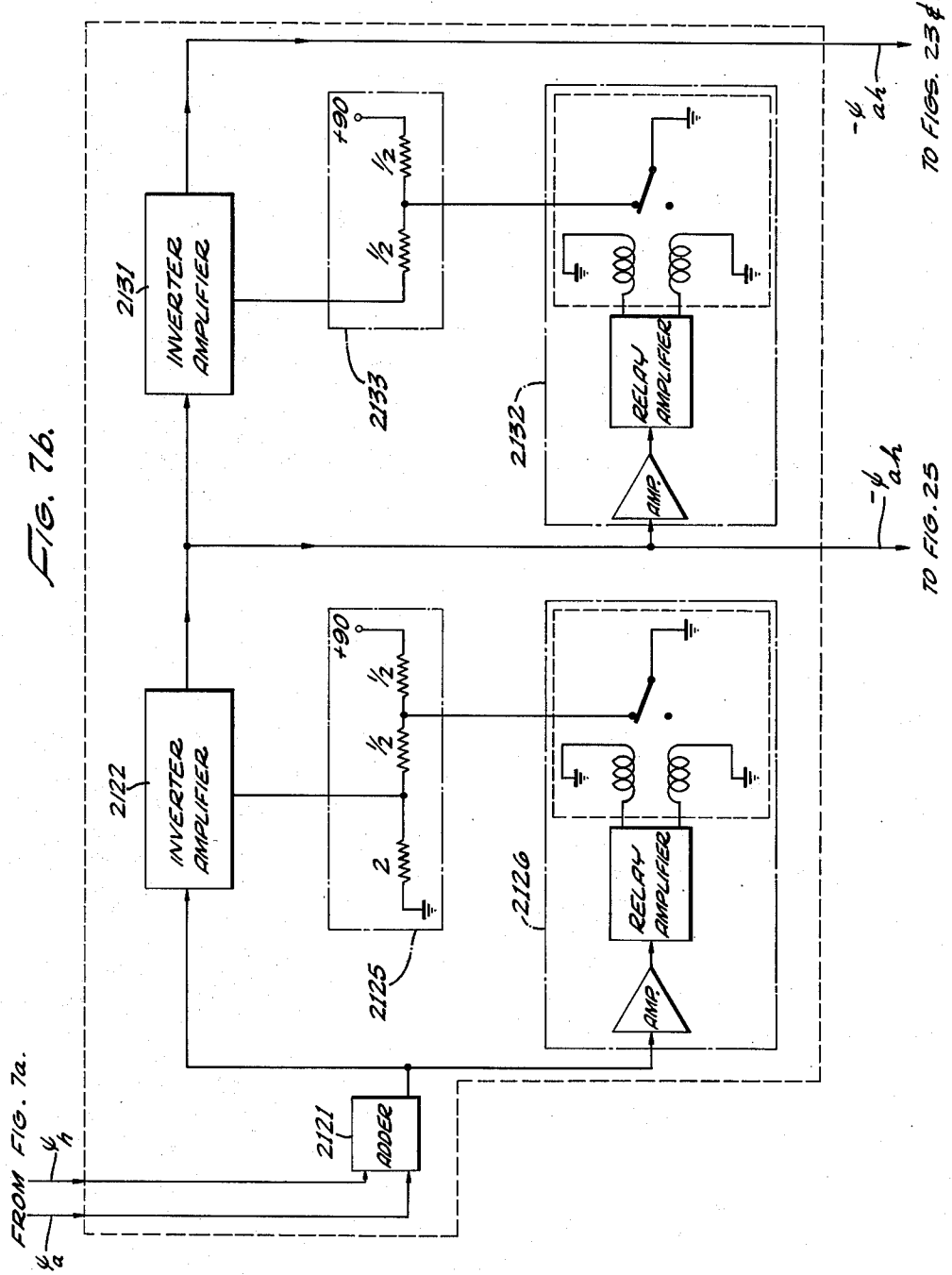

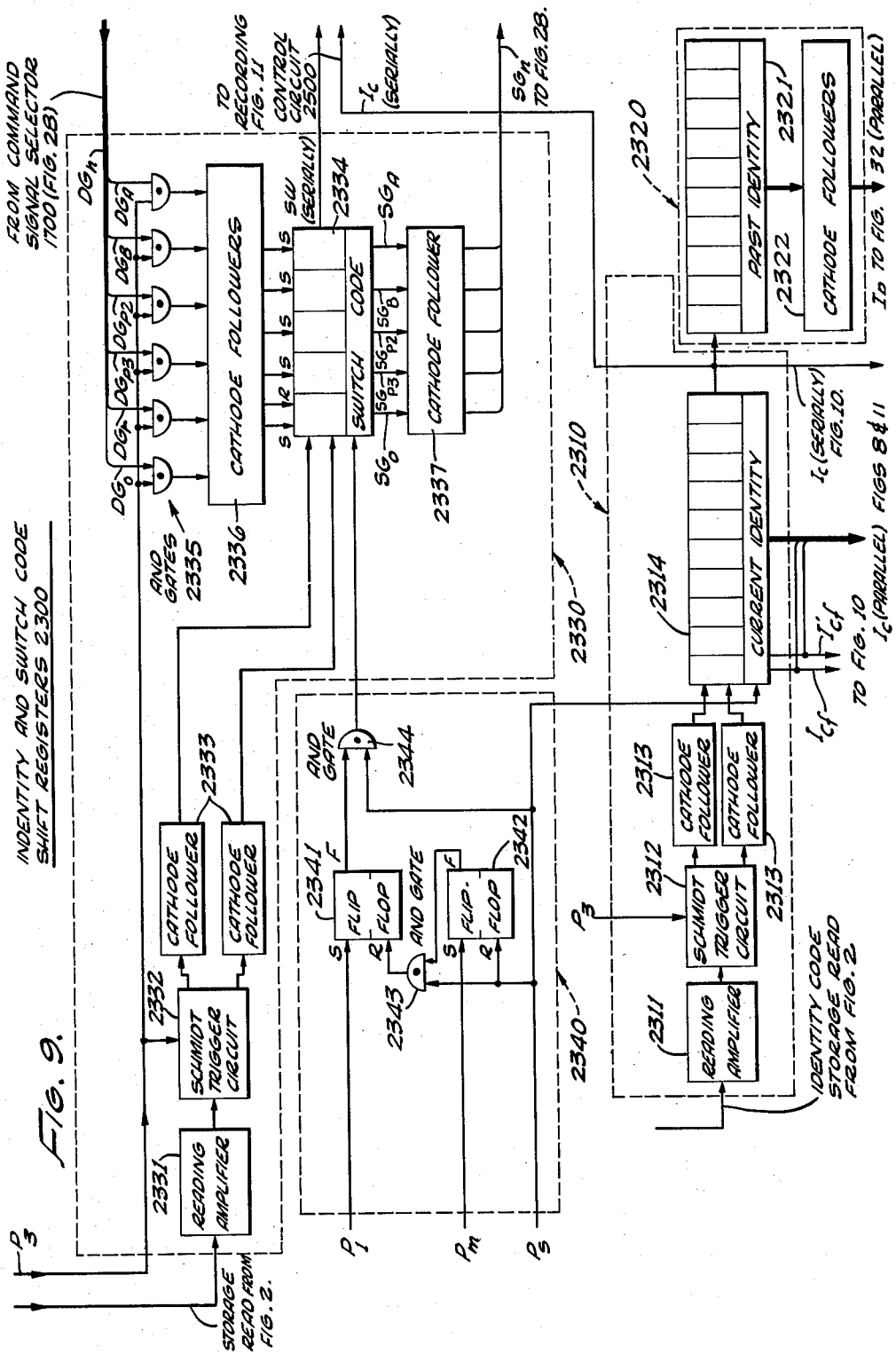

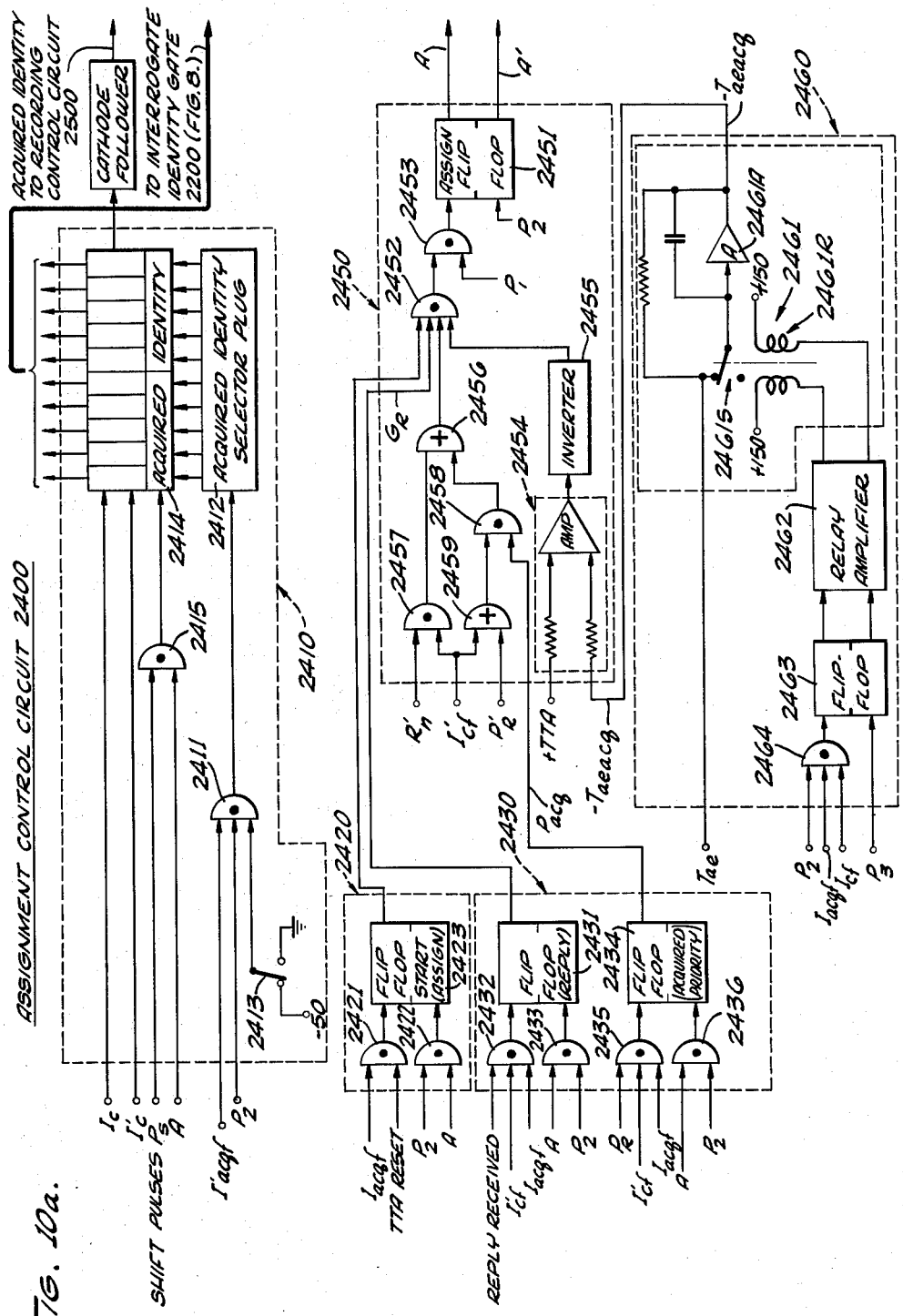

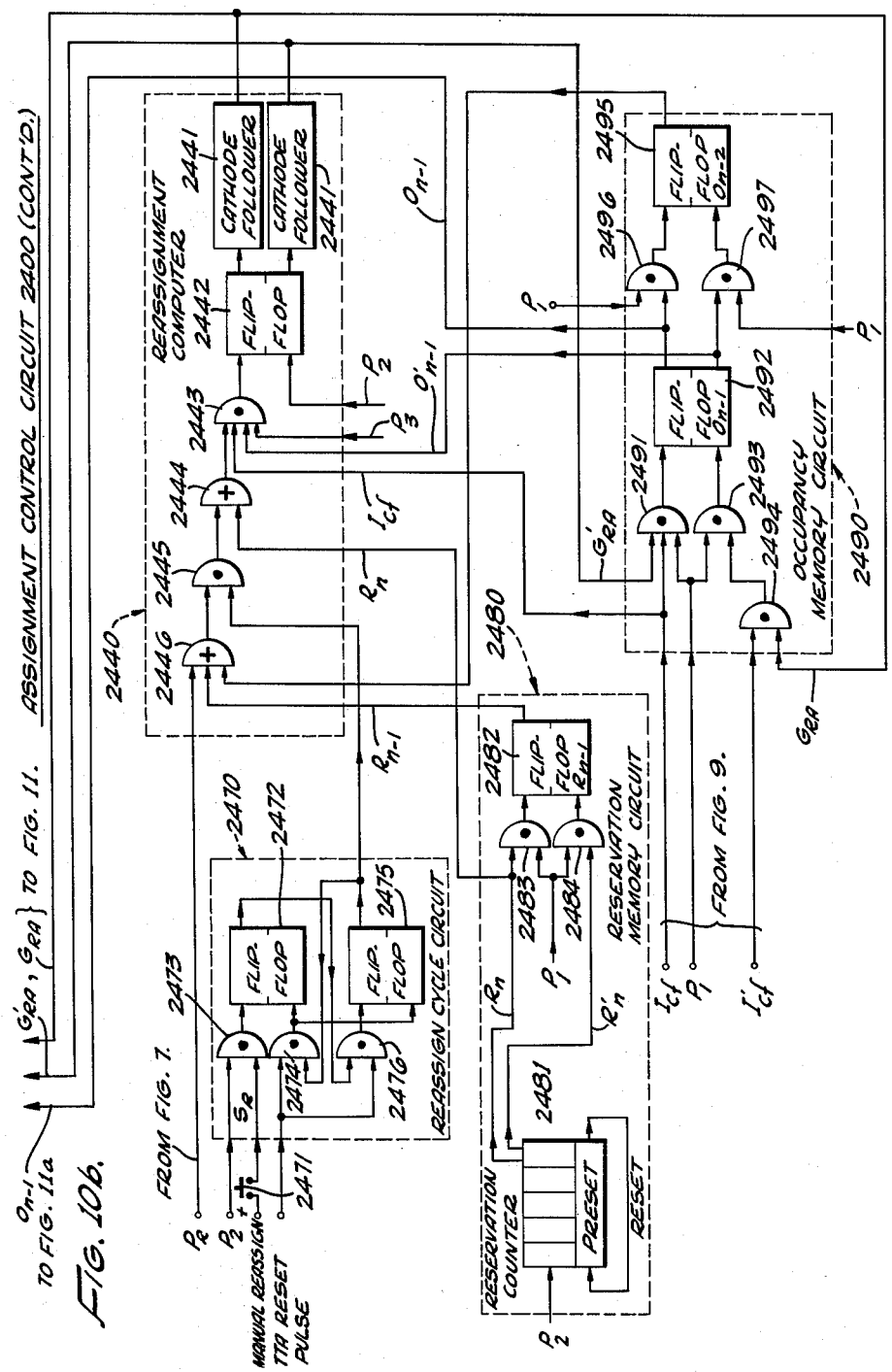

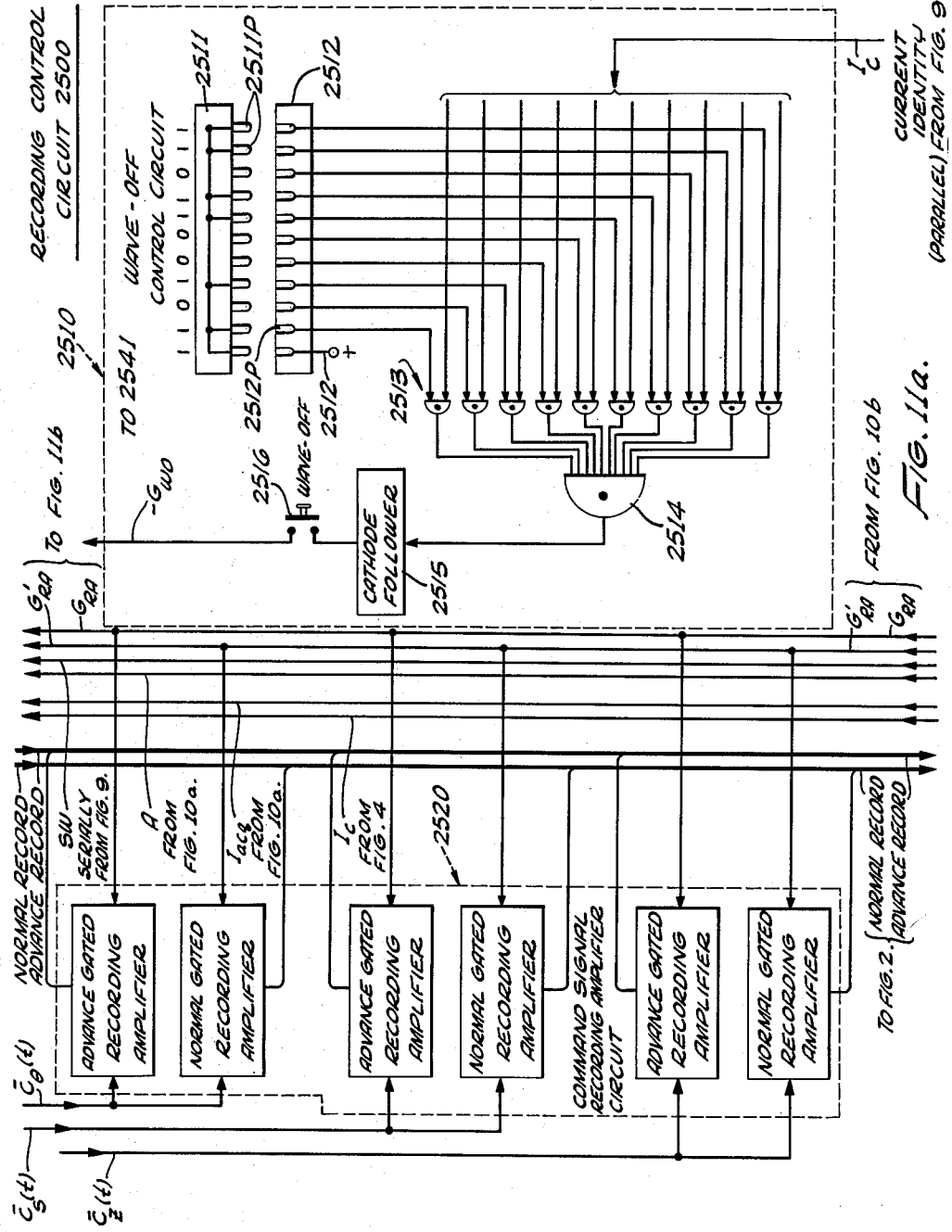

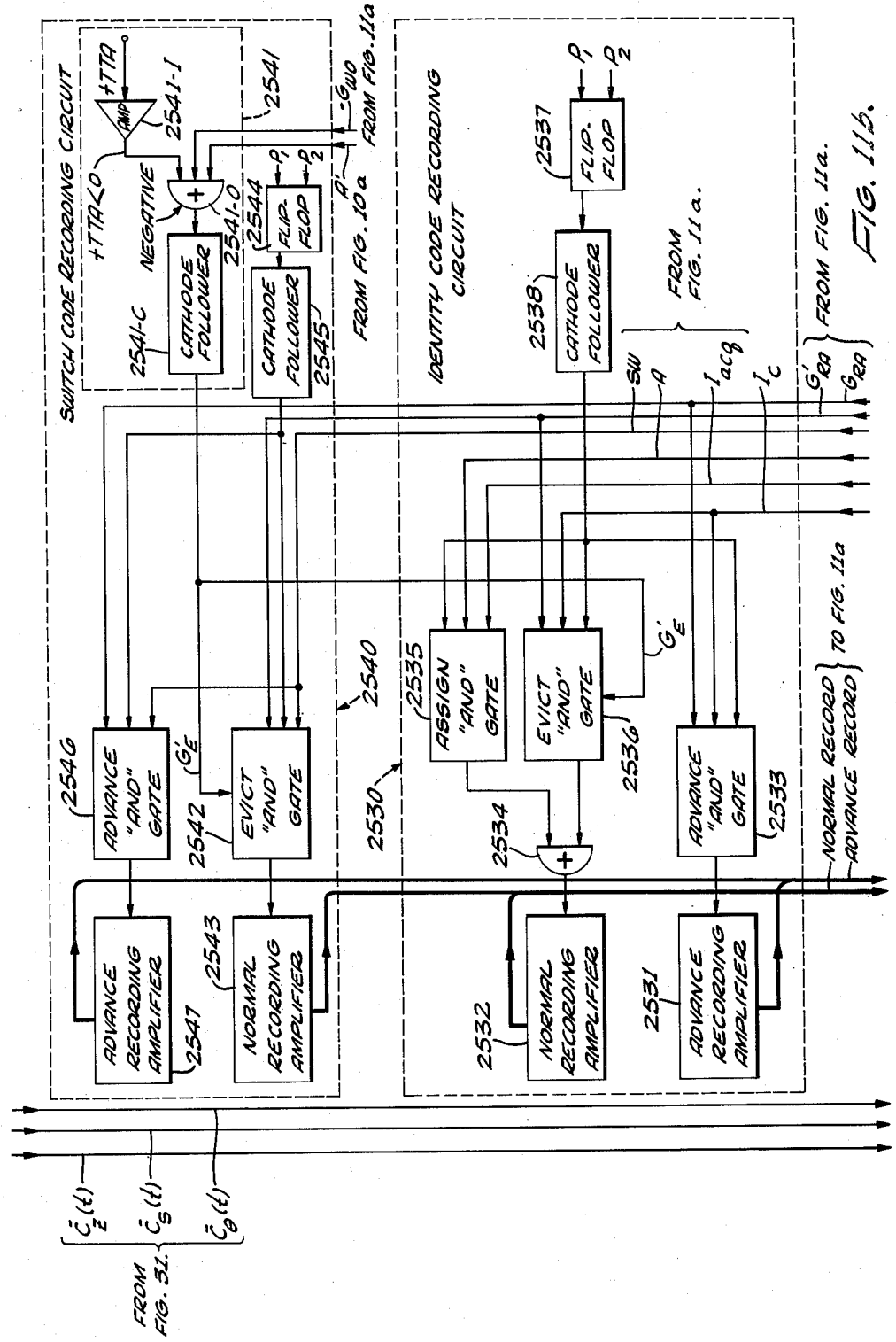

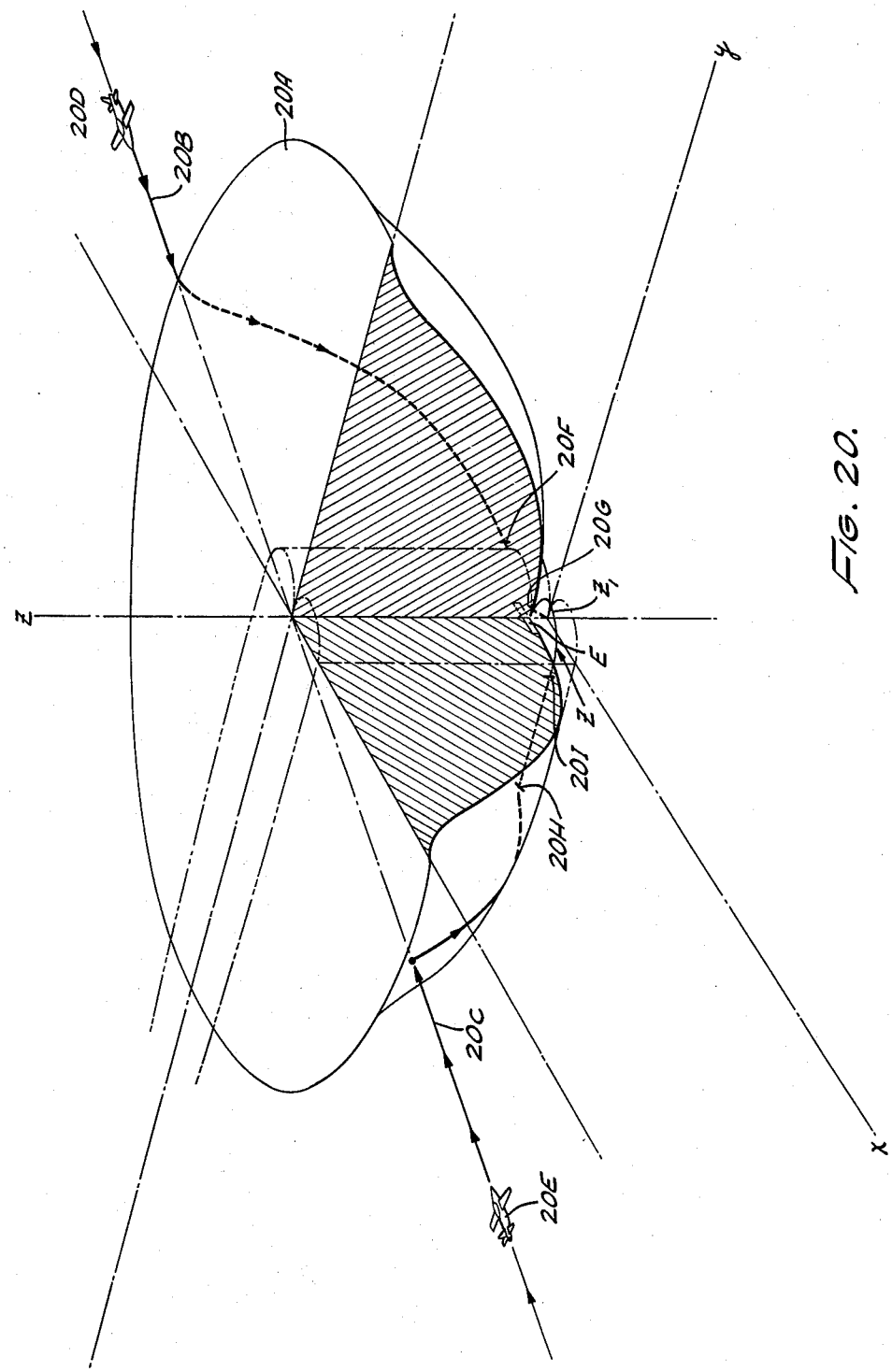

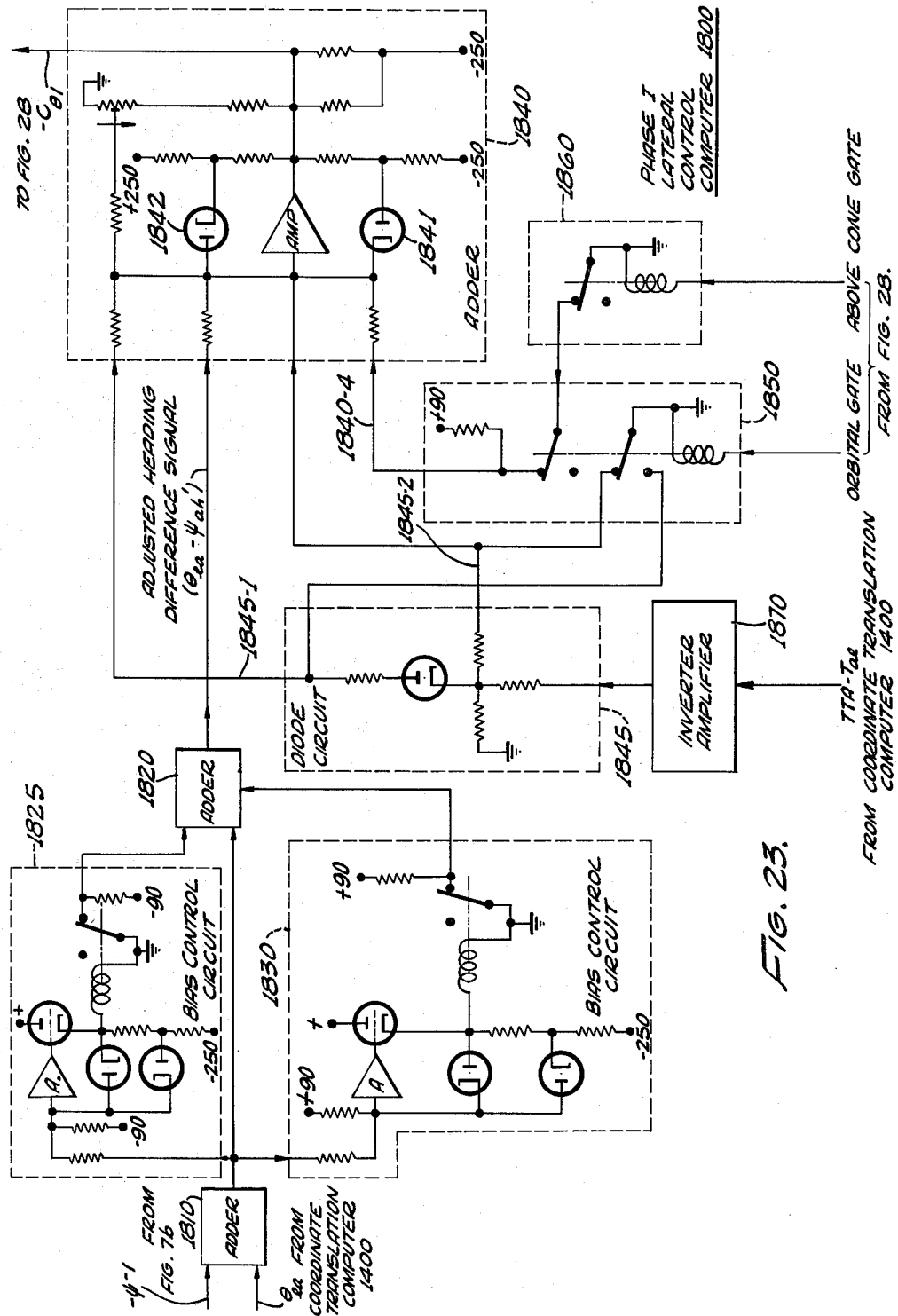

April 24, 1962 D. J. GREEN ETAL 3,031,658
AIR TRAFFIC CONTROL SYSTEM
Filed Aug. 21, 1956 25 Sheets-Sheet 25

ILS CROSS POINTER METER FOR $C_\theta$ AND $C_z$

SPECIAL THROTTLE DISPLAY METER

United States Patent Office 3,031,658
Patented Apr. 24, 1962

3,031,658
AIR TRAFFIC CONTROL SYSTEM
David J. Green, Alvin Guy Van Alstyne, Garvin M. Moore, Jr., Ray William Sanders, and Quentin L. Bonness, Los Angeles, and Albert Royal Noland, La Crescenta, Calif., and Verland Olson, Milwaukee, Wis., assignors to Gilfillan Bros., Inc., Los Angeles, Calif., a corporation of California
Filed Aug. 21, 1956, Ser. No. 605,690
42 Claims. (Cl. 343—6)

This invention relates to air traffic control devices and more particularly to a guidance method of and system for directing a plurality of aircraft to and through the "entry gate" or point of initial radar detection of a ground controlled approach (GCA) or other type of landing system.

In most applications of blind or automatic landing systems, it is desirable to direct a large number of aircraft successively through a landing system entry gate at least a predetermined minimum time interval apart in order to accommodate a landing system having a fixed maximum capacity. This requires that each aircraft be simultaneously controlled on assigned or selected entry gate time-to-arrival schedules from substantially any point within a selected maximum range of the entry gate. The attitude of an aircraft must then be controlled to guide it through the entry gate while heading toward a landing station or airstrip where an associated landing station may be situated.

Solutions to the above described guidance problems are provided by a system described and claimed in copending application Serial No. 389,542, now Patent No. 2,927,751, entitled "Air Traffic Control System Using Ideal Approach Tracks," filed November 2, 1953, by John I. Daspit. In accordance with this system, an aircraft is directed to an approach zone at one end of which an entry gate is disposed. This end of the approach zone is provided with two tangent curved portions which meet in a cusp. The entry gate is disclosed on the cusp and spaced from an associated landing station in the approach zone so that an aircraft passing through the entry gate will be headed directly toward the landing station.

The Daspit control system is employed to direct an aircraft on a course to minimize fuel consumption. This course is a straight line tangent to one of the curved portions of the approach zone. The Daspit system is specifically employed to direct aircraft on entry gate time-to-arrival schedules different in time by at least a predetermined minimum interval. This is accomplished by slowing fast aircraft down and speeding slow aircraft up during the early phases of their entry gate approach. After each aircraft has been directed through all of the early phases, its speed is maintained constant until it passes through the entry gate.

Guidance is accomplished in the Daspit system by developing error control signals representative of the difference between the actual and ideal courses of an aircraft. These signals are then communicated to corresponding aircraft to direct them along ideal courses. The ideal courses of all aircraft, which courses are actually fixed in space, are produced by a plurality of function generators corresponding to each.

The Daspit system provides adequate solutions to the entry gate approach problems of a moderate number of aircraft; however, it has been desirable to minimize the equipment needed in that system when an unsually large number of aircraft are involved because the number of function generators and computers used in the Daspit system is always in direct proportion to the number of aircraft guided. In addition, the optimum or ideal course function generators and computers for the Daspit system must generally be intricate. They must also be synchronized to provide proper time scheduling and the function generators in particular must generally be designated identically to preserve uniformity in guidance.

The present invention provides an alternative air traffic control system to reduce system equipment in simultaneously directing relatively large number of aircraft to and through a landing system entry gate. This is accomplished by providing a time sharing or data handling unit which is employed to initiate the computation of error control signals periodically for each aircraft "acquired" by the system or assigned to an entry gate time-to-arrival schedule maintained by the system. For example, if the system has a maximum capacity C of acquired aircraft and error control signals are generated at a rate R, i.e., the error control signals for one aircraft are computed during the period $1/R$, the data handling unit may include a mechanism for storing the coded identity of an aircraft acquired by the system, and means for recurrently reproducing the identity of the aircraft at a rate approximately proportional to $C/R$ to initiate the computation of error control signals for that particular aircraft.

It is thus evident that with the system of the present invention only one set of function generators and computers is required to compute error control signals for any selected number of aircraft. Equipment thus need not be heavily increased in a system of increased capacity. In addition, the system of the present invention has the advantage of generating error control signals which are uniform, i.e., since only one guidance unit or set of function generators and computers is employed in the entire system, all aircraft are guided according to uniform internal settings of the single guidance unit. For this reason the "alignment" of a plurality of guidance units for corresponding aircraft in a system is obviated. Still further, no synchronization of a plurality of guidance units is required since, obviously, only one guidance unit is employed with the system of the invention.

The invention contemplates the use of an approach zone similar to that employed in the Daspit system; however, a special guidance method is employed in accordance with the invention to avoid the use of intricate computers which guide an aircraft along a particular straight line course tangent to a curved portion of the approach zone. This method comprises the steps of guiding an aircraft directly toward the entry gate until it arrives approximately at the perimeter of the approach zone, guiding the aircraft around the perimeter of the approach zone until it arrives approximately at the entry gate, and guiding the aircraft directly toward the landing station as the aircraft passes through the entry gate.

In both the Daspit system and the system of the present invention, it is necessary to translate aircraft coordinates with respect to the landing station in the approach zone to coordinates with respect to the entry gate. However, in the Daspit system, it is necessary, in addition, to translate coordinates with respect to the entry gate to coordinates with respect to the geometric center of one of the curved portions of the approach zone. This second coordinate translation is obviated by the guidance method of the invention since an aircraft is always directed toward the entry gate until it arrives approximately at some point on the perimeter of the approach zone.

The above-described method of the invention has an advantage in that a method step is called for to guide an aircraft directly toward the landing station as the aircraft passes through the entry gate. This step insures that no discontinuity in an error control or command signal will result when the aircraft passes through the entry gate, the aircarft being guided according to its own heading with respect to the bearing of the landing station rather than that of the entry gate.

In accordance with the guidance method of the invention, three phase control computers are employed in a guidance unit to produce heading error control signals to guide an aircraft during three phases of approach to the landing system entry gate. These phases are called the initial or radial phase, the intermediate or perimetric phase, and the final phase. The computers corresponding to these phases are, respectively, phase I, phase II, and phase III control computers. Selector means or a command signal selector is provided with switch means to channel a phase II error control signal produced by the phase II control computer to an aircraft after a phase I error control signal by the phase produced by the phase I control computer is channeled to the aircraft. Channeled in this sense includes separating error control signals before or after one or all of the error control signals are communicated to the aircraft. The command signal selector is also provided with means for operating the switch means when the phase II error control signal is equal to zero. This becomes particularly advantageous when the phase II error control signal is produced by computing a heading difference signal proportional to the difference between the actual aircraft heading and the ideal perimetric heading of the aircraft for its particular bearing. A range difference signal is also computed which is proportional to the difference between the actual range of the aircraft and the ideal perimetric range of the aircraft for its particular bearing. The difference between the range and heading difference signals is then the phase II error control signal, the range difference signal causing the aircraft to turn toward the approach zone perimeter away from the entry gate when the aircraft is outside the approach zone, and the heading difference signal causing the aircraft to turn parallel to the approach zone in the direction of the entry gate when outside the approach zone.

The range difference signal serves to keep the aircraft on the approach zone and the heading difference signal serves as a damping factor. That is, the aircraft is prevented from overtraveling the perimeter of the approach zone when headed at an angle with respect to the perimeter of the approach zone.

The heading difference signal will at some point exceed the range difference signal as an aircraft arrives at the approach zone. An aircraft is then directed around the perimeter of the approach zone to the entry gate in the shortest possible time in accordance with a specific embodiment of the invention wherein the phase II error control signal is channeled to the aircraft only after it has reached zero. When the range difference signal becomes less than the heading difference signal, the aircraft is directed approximately toward the entry gate.

Although the guidance method of the invention reduces equipment required to control a relatively large number of aircraft and provides phase control switching to minimize flight time, reduced equipment is obtained only at the expense of extra aircraft fuel consumption. However, this fuel expenditure is not wasteful compared to the equipment saved. In addition, compensating fuel conservation is achieved in a number of other ways in accordance with the invention.

In the first place, in the initial or phase I step of the aircraft guidance method of the invention, an aircraft is not guided to any ideal coordinates or along any ideal course fixed in space. On the contrary, an aircraft is guided only radially inbound directly toward the landing system entry gate. This saves aircraft fuel because the aircraft is always directed along a course which is the instantaneous minimum distance directly to the entry gate.

A novel lateral control method is also employed to correct the heading of an aircraft. This method includes the steps of generating a heading command signal representative of heading error, and communicating the heading command signal to the aircraft, whereby the heading error may be reduced to zero when the bank angle of the aircraft is maintained proportional to the command signal, and the rate of turn of the aircraft is maintained at a value required for stable flight.

In accordance with the first or phase I step of the guidance method of the invention, the heading command signal is developed by comparing the heading of an aircraft with respect to the position of the entry gate to the bearing of the entry gate from the aircraft. In the second step in the guidance method, the heading command signal is made proportional to the difference between the heading and range difference signals as explained previously. In accordance with another feature of the invention a time difference signal is added to a heading difference signal to modify the rate of turn or heading command signal of an aircraft to cause it to meet its selected entry gate time-to-arrival schedule more quickly.

The phase II or second step in the guidance method of the invention is preferably divided into two parts, viz a phase IIA part and a phase IIB part. In the phase IIA part the heading command signal is proportional only to the difference between the heading and range difference signals. However, when the aircraft approaches one of the curved end portions of the approach zone, a time difference signal and a constant rate of turn signal are added to the heading and range difference signals. The time difference signal is derived from a comparison between a selected entry gate time to arrival and an entry gate time to arrival computed on the assumption that the aircraft will follow an ideal glidepath and radial course at an ideal velocity to the entry gate. Use of the time difference signal is made to correct the rate of turn of the aircraft around the curved end portion of the approach zone should the speed of the aircraft be somewhat in error or should the turn of the aircraft be started late. Use of the constant rate of turn signal is made to keep the aircraft exactly on the perimeter of the end portion of the approach zone when the instantaneous heading and range of the aircraft is ideal.

In the last step of the guidance method of the invention, the heading command signal is derived by comparing the heading of the aircraft with respect to the position of the landing station to the bearing of the landing station from the aircraft. As stated previously, the use of this heading command signal prevents the occurrence of computer discontinuities as the aircraft passes through the entry gate.

In accordance with the invention fuel conservation is achieved through both novel lateral control and descent control methods. The descent control method involves the use of function generators to guide an aircraft down along an ideal descent cone or bowl shaped glidepath at an ideal velocity for optimum fuel consumption. As will be explained hereinafter, the descent cone is preferably computed numerically from the average of certain performance curves of aircraft for which the associated air traffic control system may be designed. Speed is never maintained constant during descent, but only at an optimum value for optimum fuel consumption.

According to one aspect of the invention, a method of altitude control is provided which comprises the steps of deriving a first signal substantially proportional to the entry gate time to arrival of the aircraft, generating a second signal in response to the first signal, the second signal representing the ideal cone altitude of the aircraft for its particular entry gate time to arrival, deriving a third signal proportional to the actual altitude of the aircraft, comparing the second and third signals, and communicating the results of the comparison to the aircraft for effecting a change in the altitude of the aircraft to cause the aircraft to fly along the surface of the descent cone. One ideal altitude function generator, which may be employed in this method, may be set up according to the descent cone functions. Any one of these functions, i.e., the selected or computed entry gate time to arrival, the ideal or actual altitude, or the ideal or actual range of an aircraft may be computed as a function of any other one. However, the computed time to arrival and the actual altitude or range are preferably not employed because actual range or altitude or computed time to arrival may be in error and the use of them might produce other errors in addition. Computed time to arrival is defined as the time to arrival of the aircraft flying an ideal course and glidepath at optimum velocity. Preferably both ideal altitude and range is generated as a function of selected time to arrival because this time is so often otherwise used throughout the system of the invention.

Another novel concept is employed in accordance with the invention for aircraft speed control. The speed control method of the invention includes the steps of deriving a first signal proportional to the entry gate time to arrival of the aircraft flying a predetermined path to and along the ideal glidepath at a velocity that is a fixed function of the altitude of the aircraft, deriving a second signal proportional to a selected time to arrival of the aircraft, determining the difference between the first and second signals, and communicating the difference to the aircraft for reducing the difference to zero. This method goes to the heart of the scheduling problem. The philosophy of all air traffic control systems in the past has been based upon the assumption that servos for keeping an aircraft on an ideal glidepath must necessarily operate independently of speed control and that eventually all aircraft must travel at a constant speed for passing through a landing system entry gate. The speed control method of the invention thus completely reverses all prior practices by controlling speed on the basis of how late an aircraft is with respect to a selected or assigned entry gate time to arrival schedule. This predetermined and assigned schedule may be corrected for wind and for course deviation such as the deviation encountered on the curved perimetric path of an aircraft around the approach zone as will be subsequently explained; however, most important is the fact that ideal altitude is made a predetermined function of the selected time to arrival of an aircraft. The glidepath or altitude and speed control servos thus are both made responsive to errors from a time, i.e. selected time to arrival, standard rather than a position or coordinate standard. Both of these servos are then concurrently tied to this standard when an aircraft is on the ideal descent cone.

A preferred method is provided in accordance with the invention to channel only speed and course error control signals to an aircraft when it is above the descent cone and to channel only altitude and course error control signals to the aircraft when it is below the descent cone. This permits aircraft pilots to decrease speed for comfort as they are guided downwardly toward the descent cone from their position above and to increase altitude from their position below it to minimize fuel consumption, particularly where fuel savings are increased with altitude as the case is with jet aircraft.

According to a preferred arrangement of the invention, a flight time computer is employed to produce a computed time to arrival signal, as distinguished from a selected time to arrival signal. The computed time to arrival signal is employed with a speed control computer. The flight time computer produces the computed time to arrival by means including means for producing an $R_{ea}$ signal proportional to the actual range of the aircraft, means for producing a $Z_a$ signal proportional to the actual altitude of the aircraft, means responsive to the $Z_a$ signal for producing an $R_{ec}^*$ signal proportional to the ideal range of an aircraft on the descent cone at the particular altitude of the aircraft, means for determining the difference between the $R_{ea}$ and $R_{ec}^*$ signals to derive a range difference signal, means responsive to the $Z_a$ signal for producing a $V^*$ signal proportional to the ideal velocity of the aircraft at its particular altitude, means for computing the ratio of the range difference signal to the $V^*$ signal, means for deriving a $T_{ac}$ signal proportional to the ratio and representative of the time to arrival of the aircraft at the descent cone, a $T_{ce}^*$ function generator for producing a $T_{ce}^*$ signal proportional to the time to arrival of an aircraft on the descent cone at the altitude of the aircraft, first switch means for selectively introducing the $R_{ea}$ signal to the $T_{ce}^*$ function generator when the aircraft is on the descent cone and introducing the $R_{ec}^*$ signal to the $T_{ce}^*$ function generator when the aircraft is not on the descent cone, an adder responsive to the $T_{ce}^*$ signal for producing a $T_{ae}$ signal proportional to the time to arrival of the aircraft at the entry gate, and second switch means for introducing the $T_{ae}$ signal to the aircraft only when the aircraft is below the descent cone. The flight time computer may be provided with additional means to compensate for course deviation due to the ideal course around the perimeter of the approach zone. The flight time computer may also be provided with means to compensate the computed time to arrival for wind. Both of these features will be described in detail hereinafter.

It is generally unnecessary to derive a computed time to arrival signal when an aircraft is above the descent cone since no speed control is contemplated at that time; however, this could obviously be accomplished without departing from the true scope of the invention if such a control were desired.

According to a specific feature of the invention a smoothing circuit is provided to smooth heading, altitude and speed command signals so that one or two large erroneous random signals will not cause an aircraft to be instantaneously misguided. This smoothing circuit includes means for storing a first signal proportional to the smoothed value of a command signal for a length of time represented by C data intervals where C represents the capacity of an associated air traffic control system. Means are also provided for subtracting the stored signal from a second signal proportional to the current computed value of the command signal to derive a difference signal. Means are additionally provided for subtracting a portion of the difference signal from the first signal for deriving an output signal proportional to the current smoothed value of a command signal.

According to another feature of the invention a novel assignment circuit is provided for "acquiring" an aircraft, i.e. for entering a coded aircraft identity in the air traffic control system to be stored therein and for assigning the aircraft to a selected one of the entry gate time to arrival schedules maintained by the system. Aircraft "acquisition" is accomplished by means including an acquired identity shift register and an acquired identity selector plug prewired to set the acquired identity shift register in a state corresponding to the identity of an aircraft to be acquired. The acquisition circuit also includes means for applying a shift pulse to the acquired identity selector plug to set the acquired identity shift register according to the selector plug wiring.

In a preferred arrangement, the invention contemplates the use of a data link and message storage unit for producing a position signal, e.g. an altitude signal, proportional to the position of an aircraft, the identity of which is currently delivered to the data link and message storage unit. It is particularly desirable that the position signal of an aircraft to be acquired by the system be provided during error control signal computation periods not assigned to an aircraft so that the approximate entry gate time to arrival of an aircraft to be acquired may be computed. When this information is computed, the aircraft to be acquired is preferably assigned a selected entry gate time-to-arrival schedule approximately equal to the computed time to arrival. Means are accordingly provided by the invention to interrogate the data link and message storage unit with an identity of an acquired aircraft during the unoccupied data or error signal computation intervals. This interrogation device comprises a current identity shift register for temporarily storing the identity of an aircraft being currently guided by the system, an acquired identity shift register for storing the identity of an aircraft to be entered in the system; and an interrogate gate for delivering the identity contained in the current identity shift register to the data link and message storage unit only when an identity is actually contained in the current identity shift register, and for delivering only the identity contained in the acquired identity shift register when no identity is contained in the current identity shift register, whereby the data link and message storage unit may be operated to deliver the position signal from which the computed value of the time to arrival of the aircraft to be acquired may be derived.

An assignment circuit is also provided by the present invention to enter the current identity of an aircraft in the air traffic control system on the occurrence of predetermined conditions. This circuit includes means for initiating an assignment cycle at approximately the time that the identity of an aircraft closest to the entry gate is reproduced by a storage mechanism contained in the circuit. Means are also provided for producing an ideal entry gate time-to-arrival signal proportional to the selected entry gate time to arrival of an aircraft on a current schedule. In addition means for producing a $T_{ae}$ signal proportional to a computed value of the entry gate time to arrival of an aircraft to be acquired by the system as a function of the spacial position of the aircraft to be acquired. Further means are provided for shifting the identity contained in the acquired identity shift register to the storage mechanism when the ideal or selected TTA signal is approximately equal to the $T_{ae}$ signal.

Special provision is also made for assigning schedules to "priority" aircraft, i.e. aircraft which have been damaged, which are low on fuel, which carry injured personnel or pilots, which have been waved-off for lack of a proper approach, etc. Assignment is accordingly made with the assignment circuit; however, this circuit is modified to include additional means to render the means for shifting the acquired identity inoperative unless the current schedule is not reserved by automatic reservation and not occupied, or the aircraft to be acquired is a priority aircraft and the aircraft assigned to the current schedule is not a priority aircraft.

In accordance with this preferred embodiment of the invention, a non-priority aircraft may be evicted from the system by a priority aircraft. In such a case, the identity of the non-priority aircraft is shifted simultaneously into the acquired identity shift register as the acquired identity of a priority aircraft is shifted into the system storage mechanism. The non-priority aircraft is then automatically reassigned a next later unoccupied and unreserved schedule.

The air traffic control system of the present invention also incorporates a special and novel eviction control circuit to manually evict an aircraft in the event that the aircraft becomes unable or is situated such that it cannot make a proper approach to the entry gate or to the landing station. The eviction control circuit comprises a prewired eviction identity selector plug for producing a selected coded identity of an aircraft selected to be evicted, an identity coincidence circuit for producing an exict signal when the selected identity coincides with the current identity reproduced from the synchronizing and storage mechanism of the associated air traffic control system. The eviction control circuit also includes switch means actuable to pass the evict signal at a selected eviction time when a current identity of the selected aircraft would normally be recorded in the storage mechanism.

The air traffic control system of the present invention also incorporates a special and novel eviction circuit to evict an aircraft under any of several conditions. The first condition occurs when an aircraft has passed through the entry gate. The second condition occurs when an aircraft is evicted for "priority" aircraft as explained previously. The third eviction condition arises when an aircraft is in a position such that it cannot make a proper approach to the landing gate or landing system. In this case it is desirable to manually evict the aircraft as previously explained. The eviction circuit includes the current identity shift register for temporarily storing the identity of an aircraft currently being reproduced by the system storage mechanism; gate means for shifting the identity in the current identity shift register back into the storage mechanism; manually operable switch means for evicting an aircraft; the assignment circuit for introducing the identity of an aircraft to be acquired by the system; means for producing a reference signal proportional to zero time to arrival; means for rendering the gate means inoperative when the storage mechanism is actuated; means for rendering the gate means inoperative when the assignment circuit is actuated; and means for rendering the gate means inoperative when the reference signal exceeds the TTA signal.

Preferably all aircraft are controlled to "hold," i.e., to circle the landing system entry gate at constant range when the landing system is disabled. It is evident that it would be undesirable to direct aircraft inbound while the station is disabled; however, reassignment to earlier entry gate time-to-arrival schedules would bring aircraft closer to the entry gate although not through it. Reassignment is in fact provided by the present invention according to certain specified conditions which will be discussed in greater detail hereinafter.

It is therefore an object of the invention to provide an air traffic control system for guiding a relatively large number of aircraft to and through a landing system entry gate.

It is another object of the invention to provide an air traffic control system requiring relatively few component parts.

It is still another object of the invention to provide an air traffic control system for periodically producing error control signals on a time-shared basis to guide a plurality of aircraft successively to and through a landing system entry gate.

Yet another object of the invention is to provide an improved method of guiding an aircraft to a landing system entry gate situated at a point on the perimeter of an approach zone.

A further object of the invention is to provide means for successively and selectively channeling different error control signals to an aircraft for effecting a correction in the heading thereof.

A still further object of the invention is to provide means for successively and selectively communicating different error control signals to an aircraft to guide it directly toward a landing system entry gate situated at a point on the perimeter of an approach zone, and to guide it around the approach zone to and through the entry gate.

Still another object of the invention is to provide an improved method of guiding an aircraft directly toward a landing system entry gate.

Another object of the invention is to provide improved means for guiding an aircraft around an approach zone to a landing system entry gate situated at a point on the perimeter thereof.

A further object of the invention is to provide an improved aircraft guidance method for changing the heading control of an aircraft from a value dependent upon the angular position of the aircraft with respect to the landing system entry gate to a value dependent upon the angular position of the aircraft with respect to a landing station.

Yet a further object of the invention is to provide a novel method of lateral control for an aircraft in flight.

Another object of the invention is to provide means for effecting a change in the perimetric heading error control signal to cause an aircraft to turn at a substantially constant rate around a curved portion of the perimeter of an approach zone having an entry gate situated at a point thereon.

Still another object of the invention is to provide means for controlling the rate of turn of an aircraft around a curved end portion of an approach zone to a landing system entry gate to correct for an error in speed and to correct for a time delay in starting the turn.

Another object of the invention is to provide an improved method of aircraft altitude control.

A further object of the invention is to provide an improved method of aircraft speed control.

Still another object of the invention is to provide a novel method for selectively communicating altitude and speed error control signals to an aircraft to guide it to and through a landing system entry gate.

A still further object of the invention is to provide a smoothing circuit for producing smoothly varying error control signals to reduce errors introduced by random computation errors in an air traffic control system.

Yet another object of the invention is to provide a novel aircraft assignment circuit for an air traffic control system.

It is another object of the invention to provide an interrogation device for calling for certain information from a data link and message storage unit of an air traffic control system.

It is another object of the invention to provide an assignment circuit for assigning aircraft to a particular selected entry gate time-to-arrival schedule maintained by an air traffic control system.

It is a still further object of the invention to provide an eviction control circuit to evict aircraft from an air traffic control system when they cannot make a suitable approach.

It is another object of the invention to provide a novel eviction circuit for evicting aircraft from guidance in an air traffic control system.

It is a still further object of the invention to provide a novel reassignment circuit for assigning aircraft to earlier schedules during a holding period that may be required when an associated landing station is disabled.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

FIG. 3 is a plan view of a portion of a magnetic tape record employed with the synchronizing and storage mechanism of FIG. 2;

FIG. 6 is a graph of a group of waveforms characteristic of the operation of the TTA generator shown in FIG. 5;

FIG. 7 is a diagrammatic view of an air-to-ground message converter shown in FIG. 1, FIG. 7 being shown in two parts, viz. FIGS. 7a and 7b, on two individual sheets of drawings, respectively;

FIG. 9 is a block diagram of identity and switch code shift registers shown with their associated actuating means and output devices;

FIG. 10 is a block diagram of an assignment control circuit shown in FIG. 1 including means for entering aircraft to be acquired into the air traffic control system and a reassignment circuit for assigning aircraft to next earlier schedules during the holding periods, FIG. 10 being shown in two parts, viz. FIGS. 10a and 10b, on two individual sheets of drawings, respectively;

FIG. 11 is a block diagram of a recording control circuit shown in FIG. 1 which is provided with means to record identity, switch code, and command signals corresponding to a particular aircraft in either a normal record or an advance record position on the magnetic tape shown in FIG. 3 and for evicting aircraft from the air traffic control system;

FIG. 20 is a three dimensional view of a solid descent cone having a quarter removed therefrom to show the path of aircraft approaching from near the front and near the rear of the approach zone shown in FIG. 19;

FIGS. 23, 24 and 25 are diagrammatic views of aircraft lateral control computers for providing error control signals during different phases of the approach of an aircraft to a landing system entry gate;

Figure 1:
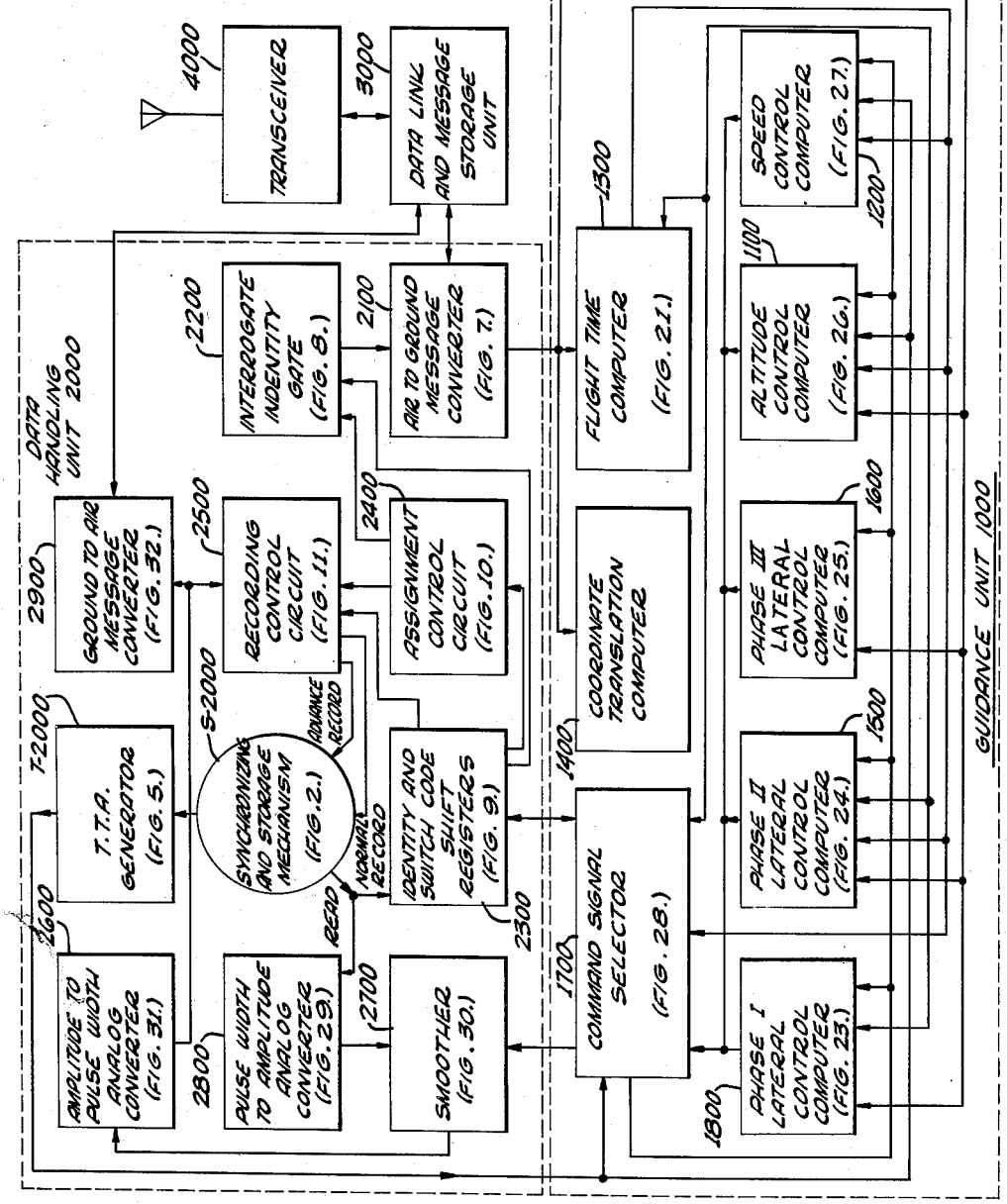
FIG. 1 is a block diagram of the air traffic control system of the present invention.
Figure 33:
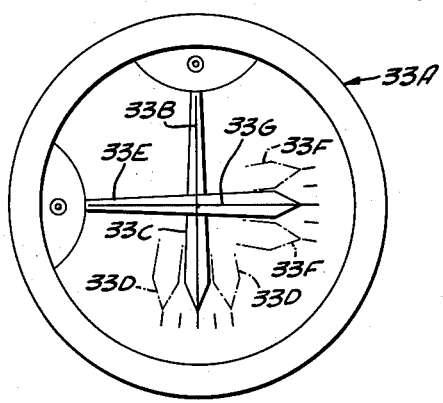
Figure 34:
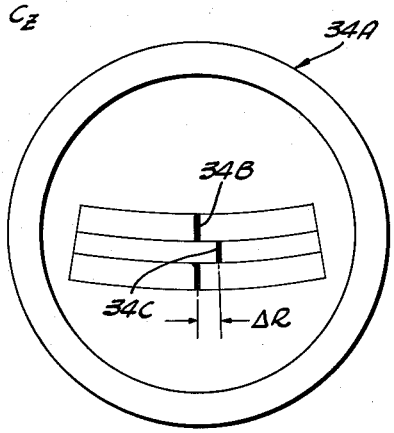
Figure 36:
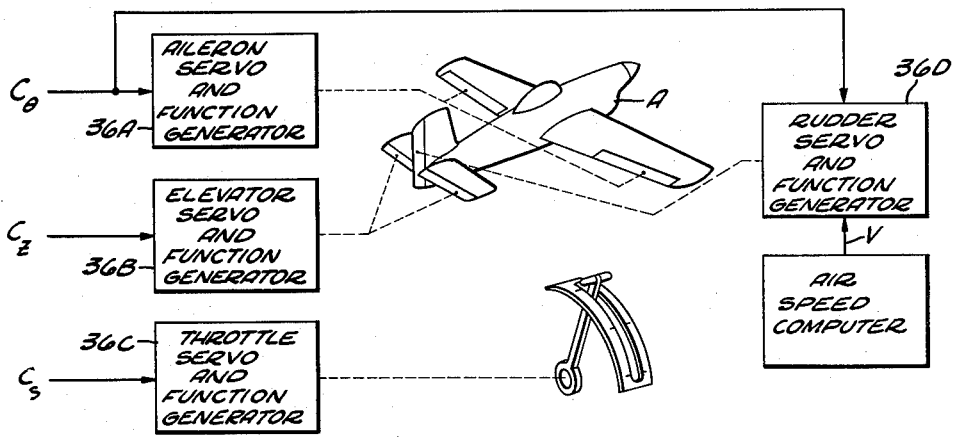
Figure 35:
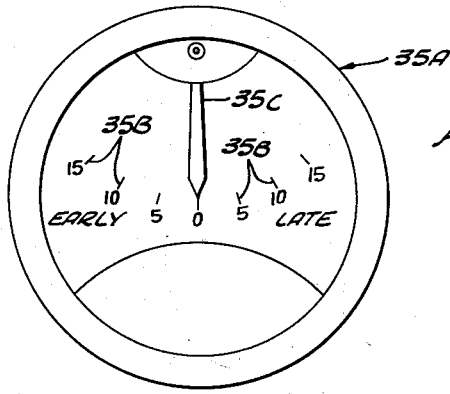

FIGS. 33, 34 and 35 are elevation views of airborne instruments which may be usefully employed with the air traffic control system of the present invention; and FIG. 36 is an isometric view of an aircraft shown with a diagrammatic view of airborne controls that may be employed with the air traffic control system of the invention to automatically control the flight path of an aircraft according to command signals produced by the air traffic control system shown in FIG. 1.

*The Air Traffic Control System Shown in FIG. 1*

In the drawings in FIG. 1 a great many features of the invention relate to one of the components shown therein called the guidance unit 1000 and another unit called data handling unit 2000. The guidance unit 1000 is employed to produce error control signals to guide aircraft, on a time shared basis, in response to flight conditions transmitted to the guidance unit 1000 by the data handling unit 2000. The guidance unit 1000 is also employed to produce flight signals, the conditions of which may be recorded in the data handling unit 2000 and reproduced as switching control signals. The reproduction of these stored flight conditions control the operation of computers in the guidance unit 1000. The outputs of the computers in the guidance unit 1000 are then processed and transmitted through the data handling unit 2000 to a data link and message storage unit 3000 which conveys them to a transceiver 4000 for transmission to an aircraft corresponding to the particular error control signals computed by the guidance unit 1000. The transceiver 4000 is also employed to receive heading, bearing and position signals from aircraft in order to relay them through the data link and message storage unit 3000 and the data handling unit 2000 to the guidance unit 1000 whereby new error control signals may be computed on the basis of most recent information.

The data link and message storage unit 3000 is employed to store both incoming and outgoing messages until they are called for by an aircraft or until they are called for by the data handling unit 2000 by means of preassigned coded aircraft identities. The detailed function of the data link and message storage unit 3000 will be explained in connection with the specific circuit of data handling unit 2000 especially including air to ground message converter 2100 shown in FIG. 7 and ground to air message converter 2900 shown in FIG. 32.

Synchronization for time sharing is accomplished in the data handling unit 2000 through the use of a synchronizing and storage mechanism S–2000. The synchronizing and storage mechanism S–2000 is employed to produce a number of synchronizing pulses that are employed throughout the system although the specific connections are not generally shown in FIG. 1. The synchronizing and storage mechanism also is provided with a storage record, preferably a magnetic tape, and a plurality of magnetic recording and reproducing heads for recording several types of information at two different points on the tape and for reading the information from the tape at a third point.

The synchronizing and storage mechanism S–2000 is employed to produce a particular synchronizing pulse to initiate the operation of a TTA generator T–2000 which is also shown in the data handling unit 2000. The TTA or time-to-arrival generator T–2000 is employed to produce a staircase voltage, both the positive and the negative of which may be used throughout the system. The staircase TTA output voltage is particularly used in an altitude control computer 1100 shown in the guidance unit 1000.

As stated previously the data link and message storage unit 3000 is employed to deliver aircraft flight condition information to the data handling unit 2000 and more specifically to an air to ground message converter 2100 contained in the data handling unit 2000. The air to ground message converter preferably comprises a shift register of the conventional type containing the coded identity of a particular aircraft as determined by an input from an interrogate identity gate 2200. In this manner the air to ground message converter 2100 calls for the data on a particular aircraft and the data link and message storage unit 3000 in response records this data in the shift register contained in the air to ground message converter 2100. The air to ground message converter 2100 is employed then to convert the digital code into analog values corresponding to flight conditions indicated by the digital code transmitted to the air to ground message converter 2100 from the data link and message storage unit 3000. The converted signals which are proportional to the prescribed flight conditions are then impressed upon a flight time computer 1300, a coordinate translation computer 1400, a phase II lateral control computer 1500 and a phase III lateral control computer 1600 in the guidance unit 1000.

The identity called for by the air to ground message converter 2100 is determined by the output of the interrogate identity gate 2200 as stated previously. The interrogate identity gate is adapted to operate in response to signals produced by a current identity shift register in the block 2300 in the data handling unit 2000 and an acquired identity shift register used in the assignment control circuit 2400 shown in the data handling unit 2000. The identity existing in the current identity shift register is called a current identity because it is an identity read into a shift register from the synchronizing and storage mechanism S–2000 as an identity corresponding to an aircraft for which error signals must be computed in a current data interval or error signal computation period.

The acquired identity or the identity of an aircraft to be acquired, which is contained in the acquired identity shift register of the assignment control circuit 2400, is preferably manually placed in the acquired identity shift register as corresponding to the identity of an aircraft to be guided by the air traffic control system. The interrogate identity gate 2200 is employed to call for either the current identity or an aircraft or the coded acquired identity of an aircraft actually to be acquired. The interrogate identity gate 2200 is employed to prefer current identity over acquired identity in that if any current identity is actually read from the synchronizing and storage mechanism S–2000 then this identity will be produced by the interrogate identity gate as an interrogate identity and the air to ground message converter will automatically call for data on the aircraft having an identity corresponding to this interrogate identity. The interrogate identity gate 2200 is employed to call for the acquired identity when no current identity is actually read from the synchronizing and storage mechanism S–2000. This occurs when there is a time during which no error signals are to be computed by the guidance unit 1000 because the capacity of the air traffic control system is not filled.

The current identity and switch code shift registers 2300 shown in the data handling unit 2000 have several functions. One function of the current identity shift register has just been explained in connection with the interrogate identity gate 2200. Another function of the current identity shift register is to temporarily store the identity of an aircraft during the data interval in which error control signals are computed by the guidance unit 1000. After these error control signals are computed they are smoothed and recorded with the current identity through a recording control circuit 2500 which is provided with means to evict aircraft from the system and for assigning priority aircraft to the same schedule or for assigning an aircraft in a regular manner or for reassigning an aircraft to a schedule in advance of its normal schedule. Another function of the current identity shift register contained in the block 2300 is to deliver the current identity of an aircraft to the assignment control circuit 2400 to be recorded in the acquired identity shift register when an aircraft is evicted, i.e. when a non-priority aircraft is removed from the air traffic control system and a priority aircraft is entered in the system in the place of the non-priority aircraft.

The switch code shift regitser in the current identity and switch code shift register block 2300, shown in the data handling unit 2000, is employed to store a switch code indicative of the flight condition of a particular aircraft corresponding to the identity recorded in the current identity shift register. This switch code in the first place is employed with a command signal selector 1700 in the guidance unit 1000 to initially operate the three lateral control computers 1800, 1500 and 1600 and the altitude and speed control computers 1100 and 1200. The state of the switch code shift register in the block 2300 is also changed by the command signal selector 1700 which detects particular flight conditions according to the states of the control computers 1100, 1200, 1500, 1600 and 1800. This is also true with respect to the flight time computer 1300. The switch code contained in the switch code shift register of the block 2300 is also recorded with the corresponding current identity contained in the current identity shift register with other computed error control signals by the recording control circuit 2500 contained in the data handling unit 2000.

The assignment control circuit 2400 provides the identity of an aircraft to be acquired to the interrogate identity gate 2200 as stated previously. The invention contemplates novel means for setting up this acquired identity shift register. The acquired identity is shifted into the synchronizing and storage mechanism S-2000 by the recording control circuit 2500 when an aircraft is to be assigned. The assignment control circuit 2400 also includes means for reassigning an aircraft to advance schedules when the aircraft are required to hold due to the fact that an associated landing station may be disabled. The assignment control circuit 2400 thus cooperates with an eviction circuit incorporated in the recording control circuit 2500 for evicting a non-priority aircraft for a priority aircraft. As stated previously, in this case the identity contained in the current identity shift register of the block 2300 is then shifted into the acquired identity shift register of the assignment control circuit 2400 as the identity of the assignment control circuit is shifted into the synchronizing and storage mechanism S-2000 through the recording control circuit 2500.

The recording control circuit 2500 also incorporates an eviction control circuit for purposely evicting an aircraft when it is in a position or becomes situated such that it is unable to make a proper approach to a landing station. For example, the aircraft may be too close to the entry gate to turn into it and be suitably headed toward a landing station as it passes through the entry gate. It is seen that the recording control circuit 2500 has three inputs, viz. an amplitude to pulse with analog converter 2600, the current identity and switch code shift register 2300 and the assignment control circuit 2400. The current identity and switch code shift registers provide current identities and switch codes to be recorded; the assignment control circuit provides an identity of an aircraft to be acquired and to be recorded at the appropriate time; and the amplitude pulse width analog converter 2600 provides error control signals to be concurrently recorded with a corresponding current or acquired identity to be recorded.

The recording control circuit 2500 has two outputs, one to a group of normal record heads at a normal record position on the magnetic tape of the synchronizing and storage mechanism S-2000 and a group of output leads to a group of magnetic recording heads to an advance record position on the tape of the synchronizing and storage mechanism S-2000. The recording control circuit 2500 is thus employed to normally record identities, switch codes and error control signals in the normal record position; however, when the reassignment circuit in the assignment control circuit 2400 is operated, the recording control circuit 2500 records appropriate identities, switch codes, and error control signals in the advance position on the tape of the synchronizing and storage mechanism S-2000.

Based on the polar coordinates of an aircraft, the flight time computer 1300 in the guidance unit 1000 is employed to produce two flight times in accordance with one specific embodiment of the invention. These flight times are the flight time of an aircraft to the cone when it is under the ideal descent cone, and the flight time to the entry gate of the aircraft on the descent cone at its particular present altitude based on ideal velocity. These flight times are computed on the assumption that the aircraft will travel at an ideal velocity for its particular altitude. The time of flight of aircraft from its current position to the cone is based on the assumption that the aircraft will fly horizontally, i.e., at a constant altitude. These flight times are used in all the control computers in the guidance unit 1000 except the phase III lateral control computer 1600.

The coordinate translation computer 1400 is employed to translate the coordinates of an aircraft with respect to a landing station situated at an airstrip with respect to the coordinates of the aircraft wih respect to the entry gate. The coordinate translation computer 1400, the data link and message storage unit 3000 and the transceiver 4000 are the only components of the air traffic control system shown in FIG. 1 which are not shown in a detailed diagrammatic figure. The coordinate translation computer 1400 may be constructed of any known components to translate the polar coordinates of aircraft; however, the computer is preferably made in accordance with a copending application Serial No. 521,965, entitled "System For Radar Positional Data," filed July 14, 1955, by Alvin Guy Van Alstyne and Garvin M. Moore, Jr. The coordinate translation computer is employed to provide polar coordinates with the aircraft with respect to the entry gate for the phase I lateral control computer 1800 and the phase II lateral control computer 1500 shown in the guidance unit 1000. Coordinate translation is required in one specific embodiment of the invention because preferably a beacon is transmitted by a transmitter based at an associated landing station whereby the aircraft may derive its own positional data within specified tolerances. This data is then transmitted to the transceiver 4100 to be relayed to the guidance unit 1000 through the data link and message storage unit 3000 and the data handling unit 2000.

The phase I lateral control computer 1800 is employed to produce one of two error control signals. One error control signal is employed to guide an aircraft radially inbound toward the landing system entry gate and the other error control signal is employed to guide an aircraft circumferentially about the entry gate at substantially constant range. In accordance with one embodiment of the invention an aircraft is guided circumferentially around the entry gate at exactly constant range when an associated landing station becomes disabled. The phase I lateral control computer 1800 is also employed to direct aircraft around the entry gate at a decreasing range when a particular aircraft happens to be above the ideal descent cone. In this case only the altitude control computer 1100 is employed to reduce the altitude of the aircraft. Normally, as all aircraft are on the cone, they are directed radially inbound by the phase I lateral control computer 1800 on a time shared basis determined by the cycle of the synchronizing and storage mechanism S-2000 of the data handling unit 2000. The phase I lateral control computer 1800 is controlled by the command signal selector 1700 which passes an appropriate error control signal to a smoother 2700 in the data handling unit 2000. The command signal selector accordingly changes the switch code in the switch code shift register of the block 2300 according to the position of an aircraft with respect to the ideal descent cone, i.e. the state of the switch code shift register is indicative of whether a particular aircraft is above, on or below the descent cone. The command signal selector also includes means for detecting the state of the switch code shift register and to control the outputs of all the control computers in the guidance unit 1000 accordingly.

As stated previously, an aircraft is directed orbitally around the entry gate under two conditions, viz. when an associated landing station is disabled or when an aircraft is above the cone. The radial or orbital direction of an aircraft is also recorded in one binary bit in the switch code shift register of a block 2300. The state of this bit is then detected by the command signal selector 1700 and the control computers in the guidance unit 1000 are operated accordingly by the command signal selector 1700.

The phase II lateral control computer 1500 is employed to direct an aircraft around an ideal approach zone. A different error control signal is produced in two phases of the operation of the phase II lateral control computer 1500 which may be defined as the phase IIA and the phase IIB parts of phase II in the guidance of an aircraft to a landing system entry gate.

In the IIA guidance phase of an aircraft an aircraft is directed substantially along the sides of an elongated heart-shaped approach zone, and in the IIB phase of the guidance of an aircraft the aircraft is directed around one of the curved end portions of the elongated heart-shaped approach zone. Switching from phase IIA to IIB is accomplished simply by a function of the command signal selector 1700 wherein a switch is actuated in the phase II lateral control computer 1500 in response to an aircraft reading a predetermined bearing from the entry gate. The polar angle coordinate $\theta$ input to the command signal selector 1700 thus is provided by the coordinate translation computer 1400.

The phase III lateral control computer 1600 is employed to produce an error control signal to guide an aircraft through the entry gate directly toward a landing system by comparing the heading of an aircraft to the bearing of the aircraft with respect to the landing station. As stated previously, the phase III lateral control computer is employed to prevent discontinuities from arising when an aircraft actually passes through the entry gate.

The phases of lateral control are also recorded in the switch code shift register of the block 2300 in two binary bits. Aircraft guidance is always accomplished first in the first phase and thus the switch code shift register always registers phase I when an aircraft is entered in the system. An aircraft passes from phase I lateral control to phase II lateral control in one specific embodiment of the invention when the phase IIA error control signal of the phase II lateral control computer 1500 is equal to zero. In this case the command signal selector detects this condition, changes the status of the switch code shift register in the block 2300, detects the change in condition of the switch code shift register in the block 2300 and transfers lateral control from the phase I lateral control computer 1800 to the phase II lateral control computer 1500.

The lateral control from the phase II lateral control computer 1500 to the phase III lateral control computer 1600 is made at an arbitrary predetermined entry gate time to arrival of an aircraft. This is accomplished in order to make sure an aircraft is under phase III lateral control as it passes through the entry gate. The predetermined entry gate time to arrival of the aircraft is detected by the command signal selector 1700 by a connection from the TTA generator T-2000 contained in the data handling unit 2000. The change in lateral control from phase II to phase III is then recorded in the switch code shift register of the block 2300 and the change in the state of the switch code shift register contained in the block 2300 is then detected by the command signal selector 1700 and lateral control is then actually switched from the phase II lateral control computer 1500 to the phase III lateral control computer 1600.

The altitude control computer 1100 produces an error control signal or command signal representative of the difference between the actual and ideal altitude of an aircraft for its particular selected entry gate time to arrival as produced by the TTA generator T-2000 in the data handling unit 2000. Altitude control is only provided by the altitude control computer 1100 when an aircraft is on or above the ideal descent cone. As stated previously, the command signal selector detects the "on," "above," or "below" cone condition, records it in the switch code shift register of the block 2300, and detects the change in state of the switch code shift register in the block 2300 to either permit the error control signal of the altitude control computer 1100 to pass to the smoother 2700 in the data handling unit 2000 or to prevent it from passing.

The speed control computer is employed to produce an error control signal proportional to the difference in a selected time to arrival of an aircraft as produced by the TTA generator T-2000 and a computed time to arrival as computed by the flight time computer 1300. This speed control computer is passed by the command signal selector 1700 to the smoother 2700 only on certain conditions, viz. whether an aircraft is on or below the ideal descent cone. As before, the command signal selector 1700 records and detects the state of the cone decision bits in the switch code shift register of the block 2300 and passes the error control signal of the speed control computer to the smoother 2700 or prevents it from passing according to the state of the switch code shift register in the block 2300.

The smoother 2700 in the data handling unit 2000 is employed to smooth the lateral, altitude and speed error control signals produced by the respective lateral, altitude and speed control computers in the guidance unit 1000. The smoother 2700 thus averages each of the error control signals passed by the command signal selector with signals previously computed. These signals are introduced to the smoother 2700 by a pulse width to amplitude analog converter 2800 which is connected from the output of the read heads on the magnetic tape in the synchronizing and storage mechanism S-2000. The smoother 2700 averages current computed values with past smoothed values in order to eliminate the chance of an aircraft being instantaneously misguided on the erroneous computation of one or two large random error control signals. The outputs of the smoother 2700 are current smoothed values of the error control signals passed by the command signal selector 1700.

The outputs of the smoother 2700 are pulse amplitude analogs of the error control signals passed by the command signal selector 1700 and these amplitude analogs are converted to pulse width analogs by an amplitude to pulse width to analog converter 2600, the output of which is impressed upon recording control circuit 2500 and a ground to air message converter 2900. The recording control circuit 2500 thus records the pulse width analogs of the error control signals concurrently with the current identity and switch code contained in the current identity and switch code shift register 2300 which are read out as the identity and switch code of a next preceding aircraft identity and switch code are read into them. The ground to air message converter 2900 is employed to convert the pulse width analogs of the outputs of the pulse width analog converter 2600 into digital codes which are transmitted to the data link and message storage unit 3000 as they are called for.

The exact functions of each of the separate blocks included in the guidance unit 1000 and the data handling unit 2000 may be better understood with reference to the separate figures containing diagrammatic views of each. An explanation of each of these figures follows hereinafter.

Figure 2:
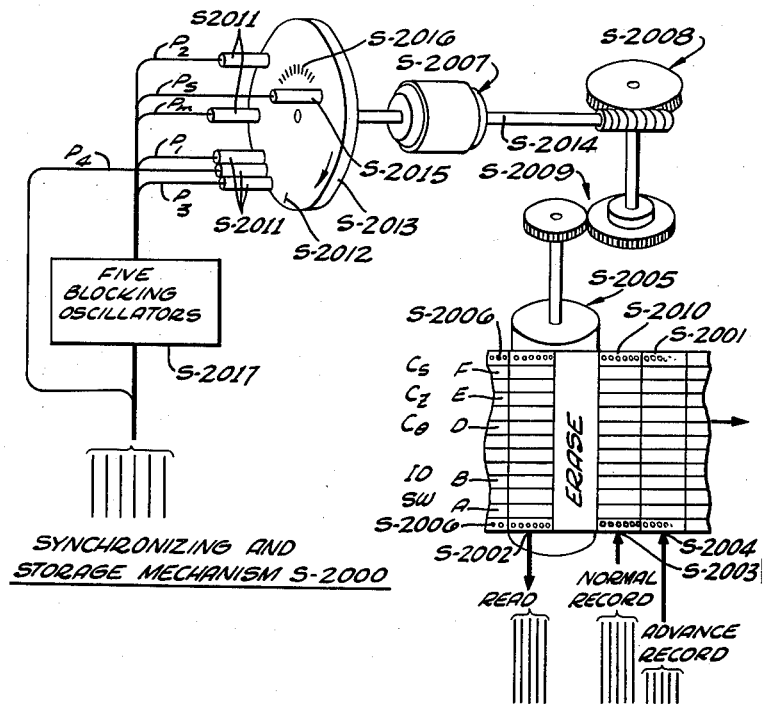
FIG. 2 is a diagrammatic and isometric view of a synchronizing and storage mechanism shown in FIG. 1.

*The Synchronizing and Storage Mechanism S-2000 Shown in FIG. 2*

The synchronizing and storage mechanism S-2000 shown in FIG. 2 includes a magnetic tape S-2001 which is employed to store coded aircraft identities, corresponding switch codes and error control signals for smoothing and for reinitiation of periodic computations of error control signal to continually guide each aircraft entered in the air traffic control system. A drum may obviously be substituted for the tape S-2001. Speed command signals $C_s$ are stored at an F position on the tape S-2001; and lateral control command signals $C_\theta$ are stored at a position D on the tape S-2001.

The binary coded identity of an aircraft is stored at a position B on the tape S-2001 and a switch code is stored at a position A on the tape S-2001. The binary code of the identity of an aircraft is indicated by ID and the switch code is indicated by SW. Information is read by conventional magnetic reproducing heads from the tape S-2001 at a point S-2002 therealong. Normally information is recorded at a point S-2003 on the tape S-2001 and information is recorded in advance at a point S-2004 on the tape S-2001 when reassignment of aircraft to an advance schedule is desired as when all aircraft are required to hold by circling at a constant altitude and range because the landing system associated with the air traffic control system is unable to receive further aircraft.

The tape S-2001 is driven by a 32-tooth capstan drive S-2005, the teeth of which engage holes S-2006 in the tape S-2001. In a representative example the capstan S-2005 is driven by a synchronous motor S-2007 having a shaft S-2014 operating at 1800 r.p.m. through a worm gear reducer S-2008 and a spur gear reducer S-2009. The worm gear reducer S-2008 may have a reduction ratio of 12:1 and the spur gear reducer S-2009 may have an increased ratio of 1:2.25. The net reduction from the 1800 r.p.m. shaft of the synchronous motor S-2007 is then 16:3. Six sprocket holes S-2006 are provided in a section S-2010 of the tape S-2001 wherein the command signals, identity and switch codes of one aircraft are recorded. In accordance with the specific driving mechanism shown in FIG. 2, one section S-2010 of the tape S-2001 passes the read point S-2002 in 33⅓ milliseconds. The length of the tape between the read point S-2002 and the normal record point S-2003 is immaterial although in a representative case two tape sections S-2010 are provided between these points. The length of the tape around the capstan S-2005 from the normal record point S-2003 to the read point S-2002 is then, in terms of sprocket holes, 594 sprocket holes. Thus as the command signals, identity and switch codes of one aircraft are being read, those of another are being recorded. The identity and switch codes corresponding to an aircraft whose error control signals are currently being computed are then temporarily stored in the current identity and switch code shift registers 2300 as shown in FIG. 1.

The command signals for each aircraft are generated every 3⅓ seconds. Timing pulses $P_1$, $P_m$, $P_2$, $P_3$ and $P_4$, synchronizing associated system components with the speed of the tape S-2001 during each 33⅓ milliseconds data interval represented by a section S-2010 of the tape S-2001 are provided by five magnetic pickup heads S-2011 energized by a ferrite slug S-2012 in a phenolic wheel S-2013 on the 1800 r.p.m. shaft S-2014 of the synchronous motor S-2007. A sixth magnetic pickup head S-2015 is energized by ten additional ferrite slugs S-2016 on the same phenolic wheel S-2012. The magnetic pickup head S-2015 thus generates a group of ten consecutive $P_s$ pulses in an interval between two pulses $P_1$ and $P_2$. The $P_s$ pulses are employed in what is known as the internal shift period of the system. The internal shift period is characterized by the fact that identity and switch codes are recorded therein. All the timing pulses produced by the heads S-2011 are applied to five blocking oscillators S-2017 except a pulse $P_4$ which is amplified elsewhere in the system.

Recording digital data on the tape S-2001 consists of saturating the record heads with D.C. current to represent a binary "one" in digital code and introducing no current to represent a "zero" in a binary digital code. The magnetic tape S-2001 is left in a saturated state of an established polarity by a D.C. erase head for the "zero" representation and is saturated with magnetic flux of the opposite polarity for the digital "one" representation.

Analog data is recorded as a single "one" pulse, the width of which is proportional to the amplitude of the error control signal which it is employed to represent. In a typical example an analog pulse width equal to 3.3 milliseconds may be a zero command signal, whereas a pulse width less than 3.3 milliseconds may be considered a negative command signal and a pulse width larger than 3.3 milliseconds may be considered a positive command signal.

Figure 4:
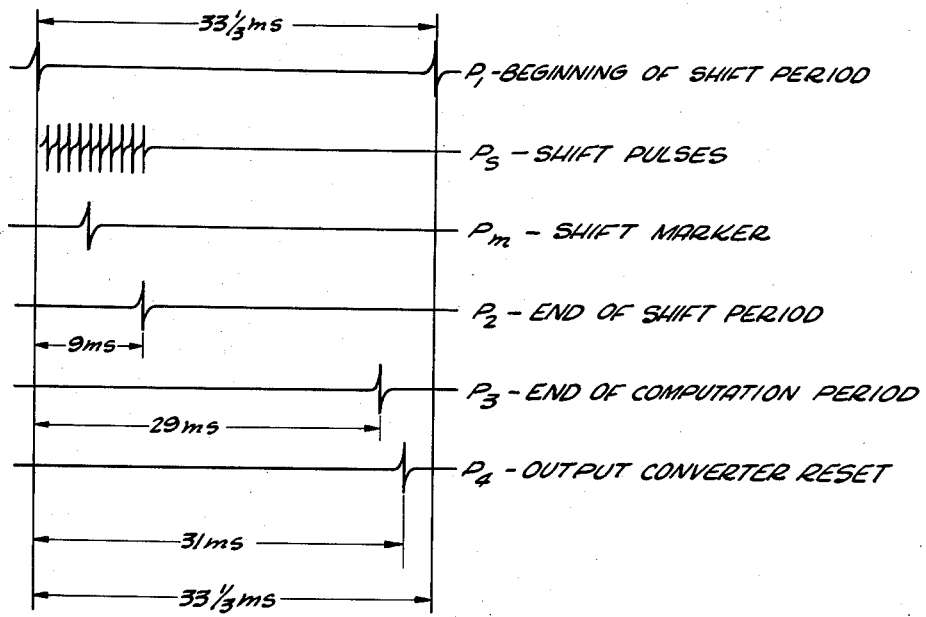
FIG. 4 is a diagrammatic view of a group of waveforms indicating the respective pulse time positions of synchronizing pulses generated by the synchronizing and storage mechanism of FIG. 2.

The various timing pulses and their relative time positions in a 33⅓ millisecond data interval are shown in FIG. 4. The pulse $P_1$ initiates the shift period represented as approximately 9 milliseconds by the pulses $P_s$. A shift marker pulse $P_m$ appears between the fourth and fifth shift pulses $P_s$ to be utilized throughout this system. The pulse $P_2$ initiates computation period and ends the shift period of 9 milliseconds. Pulse $P_3$ ends the computation period, i.e. the period of computation of command or attitude error control signals. $P_4$ represents the output reset pulse of the analog-to-digital or ground-to-air message converter 2900 as shown in FIG. 1. The time between the pulses $P_1$ and $P_3$ is indicated as 29 milliseconds; and the time between pulses $P_1$ and $P_4$ is indicated as 31 milliseconds.

The tape S-2001 is shown in FIG. 2 with the sprocket holes S-2006 disposed on each side of it. The positions of read, normal record and advance record heads are indicated again at S-2002, S-2003 and S-2004. It is to be noted that the tape sections S-2010, corresponding to 33⅓ millisecond data intervals, are equal in length and that two sections S-2010 are included between the read and normal record points S-2002 and S-2003 and that one section S-2010 is disposed between the normal record and advanced record points S-2003 and S-2004. The erase interval, as stated previously, may occupy any desired tape length although two sections S-2010 between the read and normal record points S-2002 and S-2003 are provided for this purpose.

Figure 5:
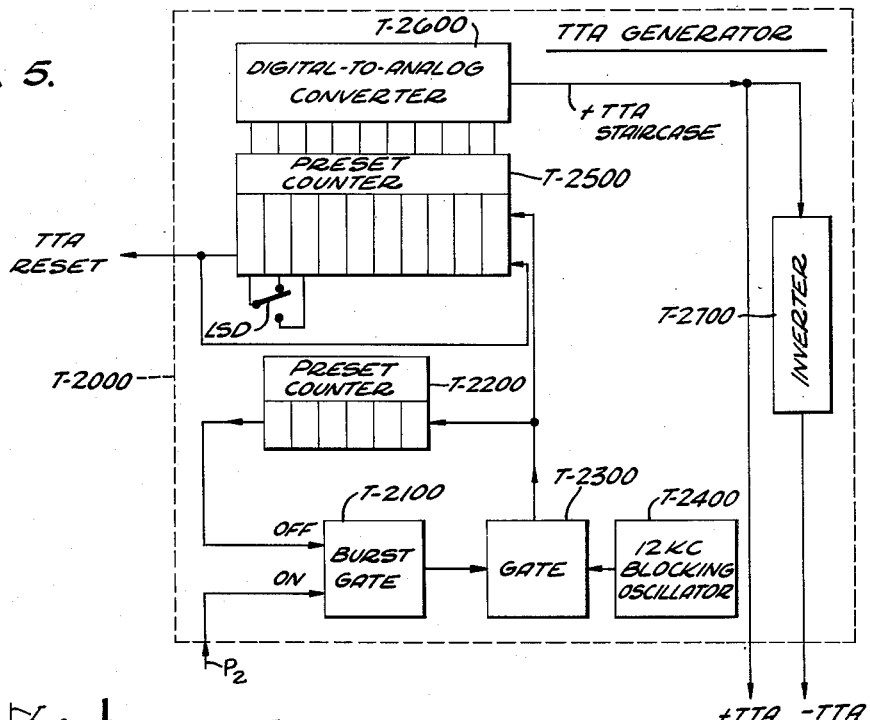
FIG. 5 is a diagrammatic view of a time to arrival or TTA generator shown in FIG. 1.

*The TTA Generator T-2000 Shown in FIG. 5*

The TTA generator T-2000 shown in FIG. 5 is employed to produce a positive going staircase voltage, the amplitude of which is proportional to the selected entry gate time to arrival of an aircraft during a particular data interval corresponding to that particular aircraft. The TTA generator T-2000 is operated by means of a synchronizing pulse $P_2$ which is impressed thereon by the synchronizing and storage mechanism S-2000.

The TTA generator T-2000 is also employed to produce a TTA reset pulse which is used in certain other of the system components shown in FIG. 1. The use of the TTA staircase and reset signals will be subsequently explained in detail. The TTA generator T-2000 as shown in FIG. 5 comprises a burst gate T-2100 which is operated on by a $P_2$ pulse, operated off by an output signal of a small preset counter T-2200 which produces an output pulse when it has counted a number of pulses predetermined by an internal setting. The burst gate T-2100 is employed to operate a gate T-2300 which passes output pulses from a blocking oscillator T-2400 which may have a pulse repetition frequency for example of 12 kilocycles. The output pulses from the blocking oscillator T-2400 are impressed upon the short preset counter T-2200 and a long preset counter T-2500.

The preset counter T-2500 is also set to count a predetermined number of pulses dependent upon the system data interval and dependent upon the number the short preset counter T-2200 is set to count. For example, in an air traffic control system for periodically generating error control signals at a rate R to guide the approaches of a number of aircraft C to a landing system entry gate and thereby to cause each aircraft to arrive at the entry gate at least a time interval A later than a previous one, the blocking oscillator T-2400 preferably has a pulse repetition frequency at least equal to $nAR^2/C$ and preferably substantially greater than this where $n$ is any positive integer. The burst gate T-2100 thus may pass a number of pulses to which the short preset counter T-2200 is set to count and remain in its off state a substantial length of time during which the computation of error control signals may be made utilizing the constant level of the TTA staircase waveform which may be produced by a digital-to-analog converter T-2600 as shown in FIG. 5. The short pulse counter is preferably adapted to count a number of pulses given by the following relationship:

$$S = \frac{nAR}{C}$$

where $n$ is any positive integer. The long pulse counter is preferably set to count a number of pulses given by the following relationship:

$$L = n(AR+1)$$

The short counter may, for example, be set to count 9 and the long counter to 901 for a 100 aircraft system capacity, a 30 per second error signal computation rate, and a minimum aircraft arrival interval of 30 seconds with $n=1$.

An inverter amplifier or simply inverter T-2700 is also provided in the TTA generator T-2000 to provide a negative going staircase TTA signal or voltage for use with other components in the air traffic control system shown in FIG. 1. The TTA generator and its particular function with the synchronizing and storage mechanism S-2000 shown in FIGS. 1 and 2 are described in greater detail and claimed in copending application Serial No. 583,523 entitled "Time Reference Generator," filed May 8, 1956, by A. G. Van Alstyne and J. C. Sampson.

A switch LSD is provided to set the long counter T-2500 to count 900 when the associated landing station becomes disabled. This causes the TTA generator T-2000 to become exactly synchronous with the synchronizing and storage mechanism S-2000 and thereby to maintain all selected TTA schedules constant, whereby aircraft may be directed orbitally around an entry gate at constant range.

The output of the digital-to-analog converter T-2600 of the TTA generator T-2000 is a staircase waveform of the type illustrated at 201 in FIG. 6. The step times are indicated as the time between the last incremental step indicated as 202 on each step and the first incremental step 203 on each of the major steps 204 in the staircase waveform. The burst time is defined as the time necessary for the short counter T-2200 to count nine pulses in the representative system. Burst time plus step time is obviously equal to 33⅓ milliseconds since this is a one-data interval. The large steps 204 in the staircase waveform output of the analog digital converter are broken in FIG. 6 to indicate their extended length. For example, a large step-time for one of the steps 204 is approximately equal to thirty three times the burst time.

It is impractical to display graphically the successive lowering of schedule levels using a representative example of 100 TTA schedules and a nine incremental step break between each schedule. For this reason the operation of a small representative system is described in connection with a staircase waveform 301 shown in FIG. 6 where incremental steps 302 are shown to have a burst time substantial in comparison to the overall schedule step time. Only three incremental steps 302 mark the difference in schedule levels indicated at 303. Only four schedule levels are shown; therefore, the utilization of a tape having only four data intervals would be employed. The tape spaces are labelled A, B, C and D in FIG. 6.

In this typical system TTA generator the short counter would be set to count three, and for four major steps 303, the long counter should be set to count 13. The major step levels 303 in successive tape revolutions utilizing four data intervals is shown on the complete waveform 301. Schedule levels 401 are shown below the staircase waveform 301 in FIG. 6 illustrating the major schedule levels every fourth tape revolution. For example, a tape revolution 402 including the major steps 401 in FIG. 6 corresponds to a portion of the staircase waveform 302 indicated at 402'. Another tape revolution 403 including four of the major steps 401 is also represented in the staircase waveform 301 as a tape revolution 403'. The remaining tape revolutions 404 and 405 including the major steps 401 correspond to subsequent tape revolutions not shown on the staircase waveform 301.

It is to be noted that the schedule levels for each of the tape spaces A, B, C and D decrease from a maximum value to zero continually with real time to represent the decreasing TTA or selected entry gate time to arrival of aircraft assigned, respectively, to schedules having corresponding tape positions. An aircraft assigned a selected TTA schedule, or "acquired" by the system, actually has a tape position or section such as a section S-2010 which corresponds to the aircraft since an aircraft identity is recorded in that corresponding tape section.

Important notice should also be taken of the fact that the long counter T-2500 is cyclically mismatched to the synchronous speed of the shaft S-2014 of the synchronizing and storage mechanism S-2000 shown in FIG. 2. This causes the TTA schedules for each aircraft to decrease with real time.

It may be disturbing to note that time to arrival is a linear decreasing function of real time. In the description of FIG. 1 it was stated that speed control is based on the difference between the computed time to arrival and this real time. A question then arises as to how the air traffic control system of FIG. 1 can be based on a variable aircraft speed and still have a speed correction function which is a function of a TTA signal that linearly decreases with real time. This will be better understood in connection with the specific operation of the flight time computer 1300 and the speed control computer 1200 considered in connection with the operation of the altitude control computer 1100 shown in the guidance unit 1000. These computers are shown respectively in FIGS. 21, 27 and 26 and will be discussed in detail hereinafter.

*The Air to Ground Message Converter 2100 Shown in FIG. 7*

The air to ground message converter 2100 contains an air to ground message shift register 2110 having 9 separate portions. The first four portions 2111, 2112, 2113 and 2114 respectively incorporate bits corresponding to the altitude, heading, range and bearing of an aircraft. Two bits 2115 are provided to change the scale of the output of range and altitude digital-to-analog converters included in the block labeled digital-to-analog converters 2120.

The digital-to-analog converters 2120 have four outputs, viz $Z_a$, $\psi_a$, $R_{ha}$ and $\theta_a$. $Z_a$ correspond to the actual altitude of an aircraft; $\psi_a$ corresponds to the aircraft magnetic heading; $R_{ha}$ corresponds to aircraft range from the landing station HS to the aircraft; and $\theta_a$ corresponds to the magnetic bearing of the aircraft. The scales of $Z_a$ and $R_{ha}$ are changed by two relay circuits 2130 and 2140 which are operated by the outputs of the two scale bits 2115 in the air to ground message shift register 2110.

A bit 2116 in the air to ground message shift register 2110 is provided to indicate that an aircraft is a priority aircraft and thereby produces an output signal $P_R$. This priority signal is used in the assignment control circuit 2400 shown in FIG. 10.

Four bits 2117 in the air to ground message shift register 2110 provide message inputs to holding circuit 2150 which may be employed to display a message from any particular aircraft on a group of panel lights indicated at 2155.

A bit 2118 in the air to ground message shift register 2110 is provided to indicate that a reply has been received or that no reply has been received from an aircraft to be acquired by the system shown in FIG. 1. Reply received and no reply gates are then provided through two cathode followers 2160 connected from the bit 2118.

The coded identity of an aircraft is shifted into the last and right hand portion 2119 of the air to ground message shift register 2110. The identity is compared through ten cathode followers 2165 in a coincidence matrix 2170 with an interrogate identity $I_I$ which is produced in the interrogate identity gate 2200 shown in FIG. 8. The coincidence matrix 2170 is employed to produce a "yes" coincidence gate and a "no" coincidence gate when there is either coincidence or non-coincidence of the interrogate identity $I_I$ with the identity shifted into the air to ground message shift register 2110. The coincidence matrix 2170 may be substantially identical to a wave-off coincidence matrix of "and" gates shown in the recording control circuit 2500 of FIG. 11. The yes and no output gates of the coincidence matrix 2170 are then impressed upon a gating circuit 2175 which is employed to gate a plurality of shift pulses labeled "read program" through a gate 2176 to the shift register 2110 to shift a plurality of 100 bit codes into the shift register 2110 from a message storage device in the data link and message storage unit 3000.

In accordance with this specific feature of the invention the message device in the data link and message storage unit 3000 may be a drum or tape having separate record and reproduce channels. The reproduce channel is driven synchronously with the read program shift pulses to shift all the identities of aircraft adapted to be controlled by the air traffic control system of FIG. 1 into the shift register 2110 within a period relatively short compared to the data interval created or established by the synchronizing and storage mechanism S-2000 shown in FIG. 2. The information relative to all particular aircraft is thus shifted into the register 2110 until it is stopped by the circuit 2175. Shift pulses are then prevented from passing the gate 2176 when the identity contained in the bits 2119 of the shift register 2110 correspond to the interrogate identity $I_I$. The gate 2176 is operated by a flip-flop 2177 having a set input from an "and" gate 2178 and a reset input from an "and" gate 2179. An input to each of the "and" gates 2178 and 2179 is provided by "aircraft pulses." In this case aircraft pulses are defined as pulses which are generated on a tape synchronously rotated with the record and reproduce tapes of the message storage device in the data link and message storage unit 3000. When aircraft pulses are impressed upon the "and" gates 2178 and 2179, they indicate that information corresponding to another aircraft is being shifted into the register 2110 by the read program shift pulses through the gate 2176. Since the "no" output from the coincidence matrix 2170 with an aircraft pulse sets the flip-flop 2177, the gate 2176 passes the read program shift pulses until a "yes" is received from the coincidence matrix 2170 with another aircraft pulse. Thus the gate 2176 prevents the read program shift pulses from shifting in further information to the shift register 2110 from the message storage device in the data link and message storage unit 3000. No further information is in fact shifted in until the interrogate identity from the interrogate identity gate 2110 is changed. When the interrogate identity $I_I$ is changed, the output from the coincidence matrix 2170 will be "no" and hence the flip-flop 2177 will operate the gate 2176 to permit read program shift pulses to enter the shift register 2110 to again cause 100 bit codes to enter the shift register 2110 from the message storage device contained in the data link and message storage unit 3000 until there is again coincidence in the identity shifted in and the interrogate identity.

In order to direct an aircraft toward the entry gate E and around the approach zone Z, it is necessary to compare the magnetic heading of an aircraft with the magnetic heading of the line through the landing station HS and the entry gate E. The magnetic heading of this line in the case of a stationary landing strip H will of course be a constant. However, when aircraft are landed on an aircraft carrier, it is necessary to provide the leading of the carrier. In this case the entry gate E will always be considered to be in line with the carrier heading. In a typical case a ships heading servo may be employed in a heading servo circuit indicated at 2180 to provide a magnetic ships heading $\psi_h$. $\theta_a$ from the digital to analog converter 2120 is then added to $-\psi_h$ in an adder 2185. The output of the adder 2185 is then impressed upon an inverter amplifier 2196 to produce a relative bearing signal $\theta_{ha}$. The bias on the inverter amplifier 2196 is changed by a bias circuit 2195 operated by a bias control circuit 2190. The bias control circuit 2190 includes an integrating amplifier 2191, a relay amplifier 2192 and a relay circuit 2193 to change the bias on the inverter amplifier 2196 when the sum of $\theta_a$ and $-\psi_h$ exceeds 180°. $R_{ha}$ and $\theta_{ha}$ are then impressed upon the coordinate translation computer 1400 which is employed to produce the polar coordinates ($R_{ea}$, $\theta_{ea}$) of an aircraft with respect to the entry gate E. From a known distance from the landing station HS to the entry gate E and from the known polar coordinates ($R_{ha}$, $\theta_{ha}$) of an aircraft with respect to the landing station HS as an origin. The polar coordinate $\theta_{ha}$ is also employed in the phase III lateral control computer 1600 shown in FIG. 25, to guide an aircraft directly toward the landing station HS as the aircraft passes through the entry gate E.

In order to compute suitable lateral control signals in the phase I and phase II lateral control computers 1800 and 1500, it is necessary to compute a relative heading, viz $\psi_a - \psi_h = \psi_{ah}$. This difference provides the heading angle of an aircraft with respect to a line through the entry gate E and the landing station HS. This computation is made in FIG. 7b by the use of an inverter amplifier 2122 to provide an output signal $\psi_{ah}$ which is impressed upon the phase III lateral control computer 1600 shown in FIG. 25. Bias is changed on the inverter amplifier 2122 by a bias circuit 2125 which is operated by a bias control circuit 2126. The bias control circuit 2126 is identical to the bias control circuit 2190 shown in FIG. 7a. The bias control circuit 2126 has the same function as the bias control circuit 2190 shown in FIG. 7a in that when the difference ($\psi_a - \psi_h$) exceeds 180° it is necessary to correct this signal to an angle less than 180°.

An inverter amplifier 2131 having an input $-\psi_{ah}$ is also employed to produce a signal proportional to $-\psi_{ah}^{-1}$ where $\psi_{ah}^{-1}$ is defined as $\psi_{ah} \pm 180°$. A bias control circuit 2132 is also provided to operate a bias circuit 2133 to change the bias on the inverter amplifier 2131 when the signal $-\psi_{ah}$ is less than 180°. To prevent $-\psi_{ah}^{-1}$ from exceeding 180°, $-\psi_{ah}^{-1}$ is then impressed upon the phase I and phase II lateral control computers 1800 and 1500 from which phase I and phase II lateral control command signals are developed.

Figure 8:
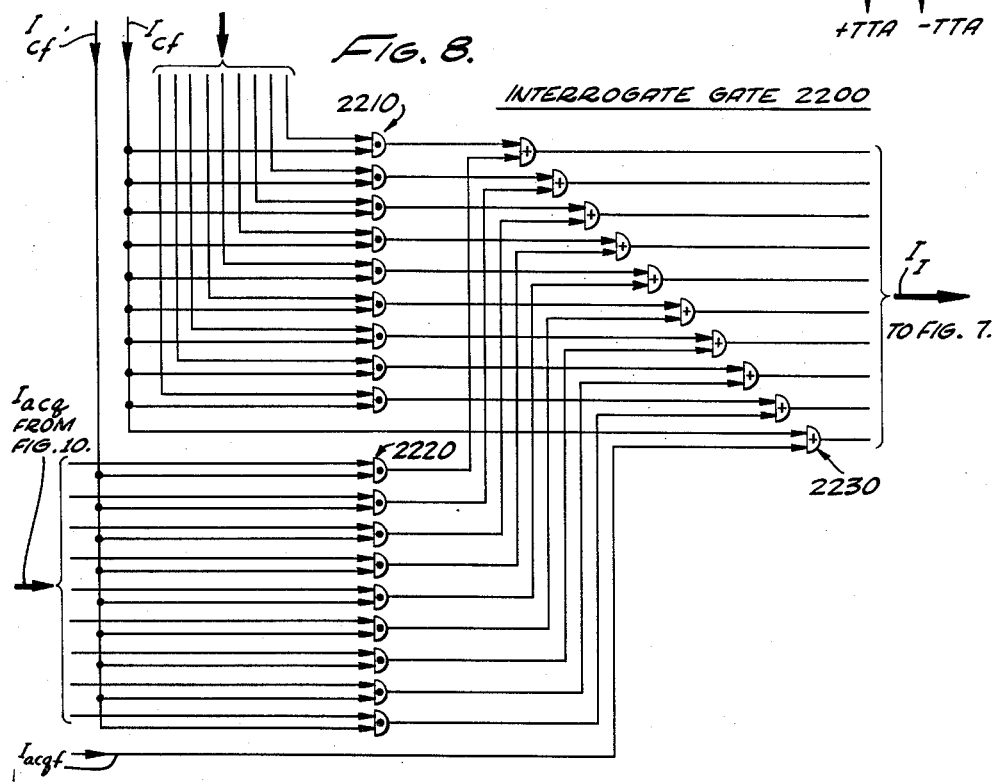
FIG. 8 is a block diagram of an interrogate identity gate shown in FIG. 1.

The Interrogate Identity Gate of FIG. 8

The interrogate identity $I_I$ is produced from an acquired identity $I_{acq}$ and a current identity $I_c$. The current identity $I_c$ contains a flag bit $I_{cf}$ to indicate that $I_c$ actually represents an aircraft already acquired. Similarly the acquired identity $I_{acq}$ contains a flag bit $I_{acqf}$ to indicate an aircraft is actually waiting to be acquired. The flag bit $I_{cf}'$ is employed with a plurality of "and" gates 2210 to pass the remainder of the current identity $I_{cn}$ only when the flag bit of the current identity $I_{cf}$ is true. The complement of the flag bit $I_{cf}$ or $I_{cf}'$ is employed to pass the acquired identity $I_{acq}$ through a second plurality of "and" gates 2220. The current and acquired identities are then passed through a plurality of "or" gates 2230 to provide the interrogate identity $I_I$. The interrogate identity $I_I$ thus is either the current identity $I_c$ or the acquired identity $I_{acq}$. The current identity $I_c$ is always passed when $I_{cf}$ is true and the acquired identity is always passed when $I_{cf}'$ is true. Thus the interrogate gate 2200 prefers the current identity $I_c$ over the acquired identity $I_{acq}$ and the acquired identity is only employed during error control signal computation intervals which are not occupied by an aircraft already acquired or entered in the air traffic control system of FIG. 1.

The Identity and Switch Code Shift Registers 2300 Shown in FIG. 9

Four components form the block 2300 and are shown in FIG. 1. These components are a current identity circuit 2310, a past identity circuit 2320, a switch code circuit 2330, and a gating circuit 2340. The current identity circuit 2310 is provided with input pulses representative of the binary identity of an aircraft produced by the identity read head in the synchronizing and storage mechanism S–2000.

The current identity of an aircraft read out of the synchronizing and storage mechanism S–2000 comprises positive and negative pulses which are the derivative of recorded gates. In the recorded signal binary "ones" in the identity code are represented by positive current levels and binary "zeros" are represented by zero current levels.

Pulses are initially amplified by reading amplifier 2311 which impresses the amplified pulses upon a Schmidt trigger circuit 2312. The Schmidt trigger circuit reconstructs the gate code according to positive pulses between respective adjacent positive and negative read pulses. The code thus produced by the Schmidt trigger circuit 2312 is shifted into a current identity shift register 2314 through a pair of cathode followers 2313. The gating circuit 2340 gates in shift pulses $P_s$ by means of two flip-flops 2341 and 2342 operated by means of pulses $P_1$ and $P_m$ and by means of an "and" gate 2343. The shift pulses $P_s$ are passed by another "and" gate 2344 when the flip-flop 2341 is set by a $P_1$ pulse. The flip-flop 2341 is set by the "and" gate 2343 when the flip-flop 2342 is set and when a sixth shift pulse is received by the "and" gate 2343. The flip-flop 2342 is then reset by the same sixth shift pulse and shift pulses are prevented from being gated to the switch code circuit 2330 although all ten shift pulses $P_s$ are impressed upon the current identity shift register 2314 which is, for example, a ten place register.

The first bit in the current identity shift register 2314 is employed to denote whether an identity has actually been shifted into that register. The true state or "identity contained" state of the first bit of the current identity shift register 2314 is indicated by $I_{cf}$. The false state of this bit or the complement is indicated by $I_{cf}'$.

Parallel connections from each bit in the current identity shift register 2314 indicated as $I_c$ are impressed upon the interrogate identity gate 2200 of FIG. 8 and the recording control circuit 2500 of FIG. 11. The current identity of an aircraft is also shifted out of the current identity shift register 2314 serially into the recording control circuit 2500 of FIG. 11 and occasionally on assignment into the assignment control circuit 2400 of FIG. 10.

The current identity of an aircraft is also serially shifted into the past identity circuit 2320 into a past identity shift register 2321 which has parallel outputs to a plurality of cathode followers 2322. The parallel output $I_p$ of the past identity shift register 2321 is impressed upon the ground to air message converter 2900 of FIG. 32. Thus during the intermediate portion of the shift period a portion of the first bit or the left hand bits of the current identity shift register 2314 may contain the identity of an aircraft, the error control signals of which will be presently computed; the right hand bits of the current identity shift register 2314 will contain the identity of an aircraft which will be designated past identity after the shift period; and the left hand bits of the past identity shift register 2321 will contain the same identity as the right hand bits of the current identity shift register 2314 and in addition the right hand bits of the past identity shift register will contain a portion of the identity of an aircraft, the error control signals of which have been previously recorded. The error control signals of an aircraft having its identity shifted into the past identity shift register 2321 has smoothed values of its command signals recorded in the synchronizing and storage mechanism S–2000 as they are impressed upon the ground to air message converter 2900 of FIG. 32 for transmission to the aircraft.

The switch code circuit 2330 is somewhat similar to the current identity circuit 2310 in that a reading amplifier 2331 is also employed to amplify the positive and negative pulses received from the magnetic switch code reading head of the synchronizing and storage mechanism S–2000. A Schmidt trigger circuit 2332 is also employed to reconstruct the switch code previously recorded in the synchronizing and storage mechanism S–2000 by providing pulses having widths equal to the width between adjacent successive positive and negative pulses read from the synchronizing and storage mechanism S–2000. The normal and advance record amplifiers are gated by the shift period gate which causes the record current to always return to zero at the end of the shift interval. This establishes that the Schmidt trigger is 2312 and 2332 in the identity and switch code circuit 2310 and 2330, respectively, should be zero just prior to the shift intervals specified by $P_1$ and $P_2$. To insure this condition, a trigger pulse $P_3$ is used as a zeroing pulse on the Schmidt trigger circuit 2312 and 2332. This serves as a redundant pulse to guard against the change of state having occurred during the computation interval as might be initiated by a magnetic tape splice.

The identity code output of the Schmidt trigger circuit 2332 is impressed upon a switch code shift register 2334 through a pair of cathode followers 2333. The switch code as initially shifted into the switch code shift register 2334 by the gating circuit 2340. The code in the register 2334 may then be subsequently changed by the command signal selector 1700 shown in FIG. 28. Outputs from the command signal selector 1700 are designated as $GD_o$, $DG_r$, $DG_{p3}$, $DG_{p2}$, $DG_B$ and $DG_A$. These are indicated generally as $DG_n$. The change in state of the command signal selector 1700 is then recorded in the switch code shift register 2334 through a sixth cathode follower 2336 upon the reception of a synchronizing pulse $P_3$ by a plurality of "and" gates 2335, six in number corresponding to decision gates generally denoted as $DG_n$. Initially the switch code is shifted in by the gating circuit 2340. This code is detected by a plurality of cathode followers 2337, five in number to impress switch gates indicated generally at $SG_n$ upon the command signal selector 1700 whereby it may control a number of components of the guidance unit 1000 accordingly. The switch gates are indicated as $SG_o$, $SG_{p3}$, $SG_{p2}$, $SG_B$, $SG_A$. The subscript $o$ on the decision and switch gates indicate an orbital path of an aircraft around the entry gate. The subscript $r$ indicates a radial path inbound toward the entry gate by an aircraft. The first bit in the switch code shift register 2334 thus registers orbital or radial path. The first bit of the switch code shift register 2334 is then the only reversible bit in the whole switch code shift register. The first bit is preferably set by the decision gate $DG_o$ and reset by the decision gate $DG_r$. The subscript $p3$ on both the decision and switch gates indicate that a condition has been detected by the command signal selector 1700 that an aircraft should be in the final phase of its guidance, that is, it should be directed toward the associated landing station of the aircraft of the air traffic control system and through the entry gate. The subscript $p2$ of the decision and switch gates indicate that a switch has been operated in the command signal selector 1700 corresponding to the transition from the first, radial, or initial phase of aircraft guidance to the perimetric phase or the phase of lateral control around the perimeter of the approach zone to the entry gate. The subscript B in the decision and switch gates indicates that an aircraft is below the ideal descent cone. The subscript A indicates that an aircraft is above the descent cone.

*The Assignment Control Circuit 2400 Shown in FIG. 10*

A group of circuits are shown in both FIGS. 10$a$ and 10$b$ illustrated on different sheets of the drawings. The assignment control circuit 2400 of FIG. 10$a$ comprises a device 2410 for entering the identity of an aircraft to be acquired by the system into an acquired identity shift register. Also shown in FIG. 10$a$ are a start assign circuit 2420, a reply received and acquired priority memory circuit 2430, an assignment circuit 2450, and a $-T_{aeacq}$ memory circuit 2460.

In FIG. 10$b$ the remainder of the assignment control circuit 2400 is shown comprising a reassign cycle circuit 2470, a reservation memory circuit 2480, an occupancy memory circuit 2490, and a reassignment computer 2440.

The circuit for entering the selected identity of an aircraft to be acquired by the system into an acquired identity shift register is shown in the circuit 2410. This circuit comprises an "and" gate 2411 for impressing a suitable voltage upon an acquired identity selector plug 2412 when an "entered acquired identity" switch 2413 is closed to ground and when the condition $I_{acqf}'$ and $P_2$ are true. $I_{acqf}'$ is the complement of the flag bit of an acquired identity shift register 2414. The flag bit complement is employed to indicate that no identity is actually contained in the shift register 2414. An "and" gate 2415 for shift pulses $P_s$ and an assigned gate A is provided to shift the acquired identity out of the shift register 2414 into the synchronizing and storage mechanism S–2000 through the recording control circuit 2500 at an appropriate time. The current identity $I_c$ and $I_c'$ is shifted into the acquired identity shift register 2414 when an aircraft is evicted from the system for the assignment of an aircraft having a priority rating. For this reason the acquired identity shift register 2414 has the current identity input. The current identity is shifted serially into the acquired identity shift register because it is shifted serially out of the current identity shift register when the shift pulses $P_s$ are applied to the current identity shift register. The mode of operation of the assignment control circuit 2400 when a priority aircraft is assigned will be better understood in connection with the circuits 2420, 2430, 2450 and 2460 when an aircraft is assigned.

An assign flip-flop 2451 in the circuit 2450 provides an assign gate A upon receiving an output signal from an "and" gate 2452 and a $P_1$ pulse through a second "and" gate 2453. The assign flip-flop 2451 is reset by a $P_2$ pulse. The "and" gate 2452 is provided with four inputs. The first input is taken from the output of the circuit 2420 which is a start assign circuit having two inputs $I_{acqf}$ and TTA reset to an "and" gate 2421 and another pair of reset input gates $P_2$ and A to a second "and" gate 2422. The output of the "and" gate 2421 is employed to set a start assign flip-flop 2423 and the output of the "and" gate 2422 is employed to reset the start assign flip-flop 2423. It is obvious from the operation of the circuit 2420 that assignment automatically starts as soon as an identity is shifted into the acquired identity shift register 2414 of the circuit 2410. It is desirable to start assignment when a TTA reset gate is received because assignment is made according to a preferred embodiment of the invention when the selected staircase TTA voltage is approximately equal to or just exceeds a time $-T_{aeacq}$ or a computed aircraft time-to-arrival corresponding to the aircraft the identity of which is contained in the acquired identity shift register 2414.

In accordance with the invention the computed time to arrival of an acquired aircraft must necessarily be remembered from one vacant schedule to the next in order to make a proper assignment of an acquired aircraft. The computed time to arrival is in fact stored in the memory circuit 2460 which employs a switching circuit 2461 connected from the flight time computer of the guidance unit 1000 shown in FIG. 1 to hold the computed time to arrival of an aircraft during occupied data intervals, i.e., data intervals during which command signals for aircraft already acquired by the system are computed. The switching circuit 2461 comprises simply a feed back amplifier 2461A to the input of which the output of the flight time computer 1300 is connected through a relay switch 2461S that is operated in the position shown only during unoccupied data intervals during which the flight time computer 1300 computes the time to arrival of an aircraft to be acquired. The switch 2461S is operated by double acting relays 2461R through a relay amplifier 2462 which is in turn operated by a computed time-to-arrival flip-flop 2463 having a $P_3$ reset input and a set input from an "and" gate 2464. The "and" gate 2464 has an input $I_{cf}$ from the flag bit of the acquired identity shift register 2414, another input from the flag bit $I_{cf}$ of the current identity shift register 2314, and another input from the $P_2$ pulse source in the synchronizing and storage mechanism S–2000. The flag bit $I_{cf}$ of the current identity shift register 2314 is employed to set the flip-flop 2463 since the condition that a current identity exists is the only condition that makes it necessary to store the computed flight time of an aircraft to be acquired. The computed flight time $T_{ae}$ is the flight time of an aircraft to and along the ideal descent cone based on the assumption that an aircraft will fly at an optimum velocity for its particular altitude. The significance of this computed time to arrival will be discussed in greater detail hereinafter. The amplifier 2461A is employed to invert the polarity of the $T_{aeacq}$ signal and store it temporarily during data intervals occupied by aircraft already acquired by the system. This signal is added to a $+TTA$ voltage in an integrator circuit 2454 of the assignment circuit 2450. The integrator circuit 2454 produces a negative output gate just as the TTA voltage exceeds the negative $T_{aeacq}$ voltage and an inverter 2455 impresses this inverted gate on the "and" gate 2452.

A third input to the "and" gate 2452 is a reply received gate $G_R$ which is provided by the reply received memory circuit 2430. The reply received gate $G_R$ is employed to indicate that data has been received on an aircraft the identity of which is temporarily stored in the acquired identity shift register 2414. This is provided from a reply flip-flop 2431 which is set by an "and" gate 2432 having a reply received input, an $I_{cf}'$ input, and an $I_{acqf}$ input. The reply flip-flop 2431 is reset by an "and" gate 2433 which is provided with an assign gate A input and a $P_2$ input. A similar acquired priority flip-flop 2434 is employed to temporarily store the priority condition of an aircraft to be acquired. The acquired priority flip-flop 2434 is set by an "and" gate 2435 having a priority input $P_R$. The flag bit of the acquired identity shift register 2414 or $I_{acqf}$ and the complement of the flag bit of the current identity shift register 2314 or $I_{cf}'$. The acquired priority flip-flop 2434 is reset by an "and" gate 2436 operated by an assign gate A and a $P_2$ pulse. The last input to the "and" gate 2452 in the assignment circuit 2450 is provided through an "or" gate 2456 which has an input from an "and" gate 2457 and a second "and" gate 2458. The input to the "and" gate 2457 is the complement of a current schedule reserved gate, or $R_n'$; and the complement of the flag bit in the current identity shift register 2314, or $I_{cf}'$. One input to the "and" gate 2458 is derived from the acquired priority flip-flop 2434. The other input to the "and" gate 2458 is provided from an "or" gate 2459 having an input $I_{cf}'$ and $P_R'$. The output of the acquired priority flip-flop 2434 is thus the priority of an acquired aircraft or $P_{acq}$. The priority gate $P_R'$ is the complement of the acquired priority of a current aircraft.

Summarizing the process of new aircraft acquisition, the acquired identity selector plug 2412, which may be similar to a wave-off identity selector plug illustrated in detail hereinafter, is inserted into a panel receptacle. A push button to operate the "enter acquired identity" switch 2413 is then actuated to set up the acquired identity shift register 2414 in accordance with the wiring of the prewired plug 2412. The acquired identity shift register 2414 will so be set up if no identity is currently registered in the acquired identity shift register 2414. This may be indicated to an operator if desired by a connection from the acquired identity shift register 2414 to a group of panel lights each corresponding to each bit in the acquired identity shift register 2414.

The entry of a new identity in the acquired identity shift register 2414 automatically initiates the assignment sequence which results in an optimum schedule for a new aircraft. The assignment process consists of (1) obtaining a computed flight time to the entry gate, $T_{ae}$, on an aircraft to be acquired; (2) scanning all time to arrival, i.e. TTA schedules in sequence, starting with the schedule nearest the entry gate for coincidence with $T_{ae}$; (3) assigning a new aircraft, which is not a priority plane, to the next unoccupied and unreserved schedule which is greater than $T_{ae}$; or (4) assigning a new aircraft with a priority status to the next schedule which is greater than $T_{ae}$ and which is not already occupied by a priority plane.

The identity in the acquired identity shift register 2414 is presented to the air to ground message converter 2100 as the interrogate identity for each data interval which is not occupied by an assigned aircraft in the system. The converter 2100 obtains data on the aircraft and presents it to the guidance unit 1000 which computes the corresponding flight time to the entry gate, $T_{ae}$. The computed $T_{ae}$ is made available through successive occupied schedules by the $T_{ae}$ memory circuit 2460. The integrator circuit 2454 in the assignment circuit 2450 then serves as a coincidence circuit which generates a positive going gate when the selected time to arrival or TTA is greater than the computed time to arrival $T_{aeacq}$.

To start the assignment procedure of looking for an optimum schedule starting with the schedule nearest the entry gate, the start assign flip-flop 2423 is set by the TTA reset pulse and the flag bit $I_{acqf}$ in the acquired identity shift register 2414. The start assign flip-flop 2423 thus must be true before assignment can be made. The assign flip-flop 2451 in the assignment circuit 2450 is then set according to the following logical equation:

Assign= $(R_n' \cdot I_{cf}' + P_{acq} \cdot P_R')$
(Start assign) $(G_R)(TTA > T_{ae})(P_1)$ The assign flip-flop 2451 causes shift pulses to be gated into the acquired identity shift register 2414. The new identity in that register is gated to drive the recording control circuit 2500 in the proper location on the magnetic tape S-2001 in the synchronizing and storage mechanism S-2000. From this point, the new identity recorded on the tape S-2001 will recycle into the current identity shift register 2314 each 3⅓ seconds to interrogate the date link and identify the resultant commpand signals sent from the computer to the aircraft acquired by the system.

In the event that the schedule to which a new aircraft with a priority status is assigned was previously occupied by a non-priority plane, the latter plane is displaced in the synchronizing and storage mechanism S-2000 and the identity of that aircraft is shifted directly into the acquired identity shift register 2414. The displaced plane is treated as a new identity and assignment is automatically made for this plane in the same fashion as the assignment of the priority acquired aircraft. This procedure will result in the displaced plane being reassigned to the next later unoccupied and unreserved schedule.

In the event that a non-priority aircraft is replaced in the synchroniing and storage mechanism S-2000 by a priority acquired aircraft, the non-priority aircraft must be evicted from the synchroniing and storage mechanism S-2000. An eviction control circuit and an eviction circuit will both be explained in connection with the recording control circuit 2500.

When associated landing station becomes temporarily disabled, it is desirable to cause all aircraft to hold or circle circumferentially around the entry gate at constant range. It is not altogether desirable to keep aircraft at exactly constant range since it is possible that all aircraft assigned to the system may be at a substantial distance from the entry gate. For this reason reassignment of aircraft to earlier schedules is provided in accordance with the invention. A reassign gate $G_{RA}$ is produced through a pair of cathode followers 2441 taken from the output of a reassign flip-flop 2442 in the reassignment computer 2440. The reassign flip-flop 2442 is reset by $P_2$ pulse and set by the output of an "and" gate 2443 which has a plurality of inputs. One input is an actuation input or $P_3$ pulse. Another input is an $O_{n-1}'$ input indicating that the next earlier schedule from the current schedule is unoccupied.

In order to provide the $O_{n-1}'$ input, the occupancy memory circuit 2490 is provided with three inputs $I_{cf}$, $P_1$ and $G_{RA}'$ operating through an "and" gate 2491 to the next earlier schedule or $O_{n-1}$ memory flip-flop 2492. The $O_{n-1}$ flip-flop is reset through an "and" gate 2493 by a synchronizing pulse $P_1$ and the output of an "and" gate 2494 which has an input $I_{cf}'$ and $G_{RA}$. The memory of the occupied status of the second earlier schedule from the current schedule is provided by an $O_{n-2}$ flip-flop 2495 which is set by an "and" gate 2496 through which the positive output of the $O_{n-1}$ flip-flop 2492 and a synchronizing pulse $P_1$ is introduced. The complement of the output of the $O_{n-1}$ flip-flop 2492 is also impressed upon an "and" gate 2497 with a synchronizing pulse $P_1$ to reset the $O_{n-2}$ flip-flop 2495. The "and" gate 2443 and the reassignment computer 2440, as stated previously, is provided with the output from the $O_{n-1}$ flip-flop and the synchronizing pulse $P_3$.

The "and" gate 2443 is additionally provided with an input $I_{cf}$ and a fourth input from an "or" gate 2444. One input from the "or" gate 2444 is the reserved gate into the gating of the reserved status of a current schedule, the reserve gate being designated $R_n$. This is produced in the reservation memory circuit 2480 which is provided with a preset counter 2481 that is employed to produce a reserved gate $R_n$ regularly, for example, at every fifth data interval. The reservation counter 2481 is actuated by $P_2$ pulses. The reservation counter 2481 also produces a complement of the reserve gate $R_n$, or $R_n'$.

Reservation memory is also provided with a reservation memory or $R_{n-1}$ flip-flop 2482 that is set by an "and" gate 2483. The "and" gate 2483 is provided with inputs $R_n$ and $P_1$. The $R_{n-1}$ flip-flop 2482 is reset by an "and"

gate 2484 which has a $P_1$ input and a $R_n'$ input. The "or" gate 2444 in the reassignment computer 2440 is also provided with an input from an "and" gate 2445 that has an input from the reassign cycle circuit 2470 and an "or" gate 2446. The "or" gate 2446 has an input $P_R$ indicating the reserve status of a current schedule. An input from the $R_{n-1}$ flip-flop 2482 and from the false plate thereof or $R_{n-1}'$ indicating the unreserved status of a next earlier schedule, and an input from the false plate of the $O_{n-2}$ flip-flop 2495 or $O_{n-2}'$ indicating the unoccupied status of a second earlier schedule.

The second input to the "and" gate 2445 from the reassign cycle circuit 2470 is provided from three inputs. The first input is the synchronizing pulse $P_2$, the second input is provided from a manual reassign switch 2471 and the third input is a TTA reset pulse. A first flip-flop 2472 in the reassign cycle circuit 2470 is set by an "and" gate 2473 that is provided inputs from the switch 2471 and a $P_2$ pulse. The first flip-flop 2472 is reset by an "and" gate 2474 which has an input from a TTA reset and a second input from the output of a second flip-flop 2475. The output of the second flip-flop 2475 is also impressed upon the "and" gate 2445 in the reassignment computer 2440. The second flip-flop 2475 is set by the true plate of the first flip-flop 2472 and the TTA reset pulse through an "and" gate 2476. The second flip-flop 2475 is then reset by the same "and" gate 2474 resetting the first flip-flop 2472.

The arrangement for reassignment provides for two TTA scanning cycles of all assigned aircraft in the system of FIG. 1 at the initiation of an operation by the actuation of a push button connected to the switch 2471 as an input to the reassign cycle circuit 2470. All schedules of all planes are examined in two successive sequences starting with a schedule nearest the entry gate. Each sequence thus requires 3⅓ seconds to complete for this typical system. During the first scanning sequence, any aircraft which has an unoccupied, unreserved schedule preceding it, will be reassigned to that next earlier schedule. In addition, an aircraft will be reassigned to an earlier unoccupied, reserved schedule preceding it, providing that the schedule in turn is preceded by an occupied, unreserved schedule. During the second scanning sequence, those planes which have been temporarily assigned to reserved schedules due to the latter decision are automatically reassigned a second time. In general, a vacant schedule in the system will result in the sequential reassignment of all planes which are in later schedules, with those planes adjacent to reserved schedules getting two successive reassignments to preserve the reserved schedules.

The flip-flop 2442 of the reassignment computer 2440 is thus set by the following logical equation:

$$\text{Reassign} = [(P_R + R_{n-1}' + O_{n-2}')(S_R) + R_n][I_{cf} \cdot O_{n-1}' \cdot P_3]$$

where $S_R$ is employed to indicate the actuation of a manual reassign switch 2471.

The truth of the reassign equation above results by setting the flip-flop 2442 with a $P_3$ synchronizing pulse. The flip-flop 2442 in turn causes the identity, switch code, and command signals computed in a preceding error control signal computation interval to be recorded by advance record heads in the synchronizing and storage mechanism S-2000 by an appropriate control through the recording control circuit 2500. The normal record heads in the synchronizing and storage mechanism S-2000 are thus not employed in this phase of reassignment. The flip-flop 2442, as stated previously, is reset by a synchronizing pulse $P_2$.

It is evident from the above that it is necessary to have the reservation status of the next earlier schedule and the occupancy schedule status of the next two earlier schedules in order to make a reassignment decision. The reservation memory circuit 2480 and the occupancy memory circuit 2490 thus provides this information. The use of the current identity flag $I_{cf}$ in the reassign logical equation is not necessary although it may prevent the reassignment of an aircraft to an occupied schedule on the basis of an error in occupied status memory which may cause a considerable amount of confusion in the system.

*The Recording Control Circuit 2500 Shown in FIG. 11*

The recording control circuit 2500 comprises a wave-off or eviction control circuit 2510, a command signal recording amplifier circuit 2520, an identity code recording circuit 2530 and a switch code recording circuit 2540. The wave-off control circuit comprises an identity selector plug 2511 and a female plug 2512 which may be positioned on a panel board or the like. The female plug 2512 is adapted to receive the male plug 2511 and thereby to connect a plurality of pins 2511-P to a positive source potential indicated at 2512-S. A parallel connection from the current identity shift register 2314 is then impressed with the outputs of leads from the female pins 2512-P of the female plug 2512 to a plurality of "and" gates 2513 which are in turn connected to a single "and" gate 2514 that produces an output pulse when current identity coincides with the identity produced by the identity selector plug 2511. The identity in a binary number is indicated in numbers 1 and 0 at the top of the identity selector plug 2511. Plugs such as the plug 2511 may be constructed for each aircraft to be controlled by the air traffic control system of FIG. 1. Thus by selecting a particular identity selector plug 2511 a particular aircraft may be waved off when the approach of the aircraft is such that a proper approach or landing cannot be made by it.

The output of the "and" gate 2514 is impressed upon a cathode follower 2515, the output of which is selectively impressed upon the switch code recording control circuit 2540 shown in FIG. 11b through the actuation of a push button switch 2516. An aircraft may thus be selectively evicted from the control system of the present invention by choosing a particular identity selector plug placing the male identity selector plug in the female plug 2512, and pressing the wave-off switch 2516 for preferably 3⅓ seconds since all current identities may not be impressed upon the "and" gates 2513 until after 3⅓ seconds according to the particular cycle described in connection with the synchronizing and storage mechanism S-2000. The switch code recording circuit 2540 is then adapted to evict an aircraft from the system as will be explained subsequently.

The command signal recording amplifiers 2520 include advance and normal recording amplifiers for each of the pulse width analogs $\bar{C}_o(t)$, $\bar{C}_s(t)$, $\bar{C}_z(t)$ of command signals corresponding to smoothed lateral, speed and altitude signals produced by the amplitude to pulse width analog converter 2600. The command signals for particular aircraft are recorded in the normal position when the identity and switch codes corresponding to that particular aircraft are recorded in the normal position; likewise, the command signals are recorded in the advance position when the identity and switch codes of that particular aircraft are recorded in the advance position on the magnetic tape S-2001 shown in the synchronizing and storage mechanism S-2000 in FIG. 2. It is obvious from the description of FIG. 10 that the advance recording amplifiers are employed only to record the command signals in an advanced position when reassignment is initiated. Accordingly, the normal and advance record amplifiers of the circuit 2520 are respectively gated on by the reassigned gates $G_{RA}'$ and $G_{RA}$. The output signals of the circuit 2520 are then impressed upon the command signal record heads of the synchronizing and storage mechanisms S-2000.

In FIG. 11 the identity code recording circuit 2530 is shown comprising an advance recording amplifier 2531, a normal recording amplifier 2532, an advance "and" gate 2533 for gating the current identity $I_c$ of an aircraft serially to the advance identity record head of the synchronizing and storage mechanism S-2000 through the advance recording amplifier 2531.

The identity of an aircraft to be acquired by the system or the current identity of an aircraft already acquired by the system is gated through an "or" gate 2534 respectively by an assign gate 2535 and an eviction gate 2536. Both the assign and evict gates 2535 and 2536 are "and" gates. The output of the "or" gate 2534 is then impressed upon the normal recording amplifier 2532, the output of which is impressed upon the identity normal record head of the synchronizing and storage mechanism S-2000. To insure that no identity codes are serially passed by any of the "and" gates 2533, 2535 and 2536, the output of a flip-flop 2537 is impressed upon each of the "and" gates 2533, 2535 and 2536 through a cathode follower 2538. The flip-flop 2535 is set by $P_1$ pulse and reset by a $P_2$ pulse. Thus, the "and" gates 2533, 2535 and 2536 may not pass any identity codes except during the shift period of the synchronizing and storage mechanism S-2000.

The advance "and" gate 2533 is employed to pass current identity $I_c$ serially upon the reception of a reassign gate $G_{RA}$ from the flip-flop 2442 of the reassignment computer 2440 shown in FIG. 10b. The assign gate 2535 is employed to pass an acquired identity $I_{acq}$ upon the reception of an assign gate A. The evict gate 2536 is employed to pass current identity $I_c$ only when a negative evict gate $G_E$ or the reassign gate $G_{RA}$ are false or when the conditions $G_E'$ and $G_{RA}'$ are true. Specifically, when $G_E'$ is positive and $G_{RA}'$ is positive, the current identity $I_c$ is passed by the evict gate 2536. When either $G_{RA}'$ is negative or $G_E'$ is negative, the evict gate 2536 prevents the current identity $I_c$ from being shifted serially through the evict gate 2536 and the "or" gate 2534 to the synchronizing and storage mechanism S-2000 through the normal recording amplifier 2532. The negative evict gate $G_E$ is produced by an eviction circuit 2541 shown in the switch code recording circuit 2540.

The eviction circuit 2541 has negative inputs $-G_{wo}$ from the wave-off control circuit 2510, a negative complement A' of an assign gate A and an input from an integrating amplifier 2541-I which produces an output pulse when the positive TTA signal produced by the TTA generator T-2000 goes negative. All three of the signals $(+TTA<0)$, A' and $-G_{wo}$ are received by a negative "or" gate 2541-O. The "or" gate 2541-O impresses a negative pulse upon a cathode follower 2541-C, which in turn impresses a negative gating signal $G_E$ upon the evict gate 2536 of the identity code recording circuit 2530 and an evict "and" gate 2542 of the switch code recording circuit 2540. The evict gate $G_E$, when such exists, prevents the switch code denoted as SW from passing the evict gate 2542 to a normal recording amplifier 2543 which records switch codes serially in the normal record position S-2003 on the magnetic tape S-2001 in the synchronizing and storage mechanism S-2000.

The switch code is serially recorded on the magnetic tape S-2001 by an appropriate normal switch code magnetic record head. Switch code is passed serially by the evict gate 2542 upon two other true conditions. They are that the state of a flip-flop 2544 is true, the flip-flop 2544 being set by a $P_1$ pulse and reset by a $P_2$ pulse; and that a $G_{RA}'$ gate from the reassignment computer 2440 shown in FIG. 10b is true. The output of the flip-flop 2544 is impressed upon the evict gate 2542 through a cathode follower 2545. The output of the flip-flop 2544 to the cathode follower 2545 is also impressed upon an advance gate 2546 which is employed to pass the switch code when $G_{RA}$ is positive or true. The switch code is thus eventually passed by the advance gate 2546, in the event of reassignment, through an advance switch code recording amplifier 2547 to the switch code advance record head in the synchronizing and storage mechanism S-2000 shown in FIG. 2. It is to be noted that an aircraft is evicted from the system upon the reception of a $G_E$ gate from the cathode follower 2541-C of the eviction circuit 2541. This negative evict gate is generated on one of three conditions, that is, that an aircraft is being assigned to the system, or that A' is negative; or that an aircraft is being purposely waved off, i.e. a negative $G_{wo}$ gate is generated by the wave-off control circuit 2510; or on the third condition that $$(+TTA<0)$$

i.e. an aircraft has passed through the entry gate.

Figure 21:
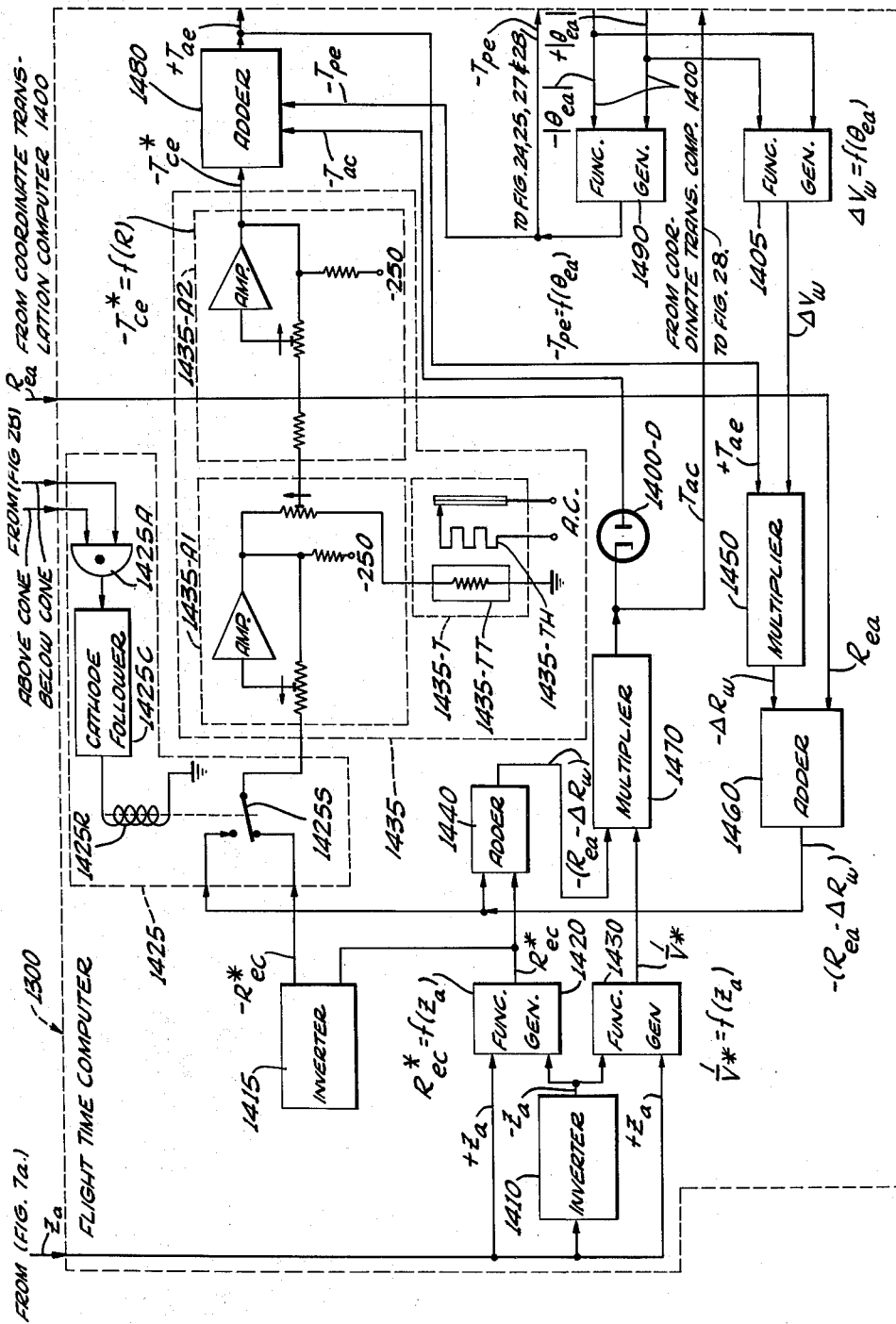
FIG. 21 is a block diagram illustrating a flight time computer employed with the air traffic control system of the present invention shown in FIG. 1.

*The Flight Time Computer 1300 Shown in FIG. 21*

As stated previously, the altitude control computer 1100 and the speed control computer 1200 both work from the selected TTA standard or selected time-to-arrival signal produced by the TTA generator T-2000 shown in FIG. 5. The altitude control computer 1100 is employed to produce an altitude command signal $C_z$ proportional to the difference between the actual altitude of an aircraft and the ideal altitude as generated in response to the TTA signal produced by the TTA generator T-2000. The speed control computer 1200 is synchronized with the altitude control computer in that it is also provided with a time-to-arrival standard or TTA signal from the TTA generator T-2000 from which a speed command signal $C_s$ is computed proportional to the difference between the TTA signal and a $T_{ae}$ signal produced by the flight time computer 1300. It is to be understood that the flight time computer 1300 is only a subsidiary device to the speed control computer 1200, however, its function will be described in detail hereinafter in order to explain more thoroughly the operation of the speed control computer 1200. It thus becomes desirable to explain the true flight path of an aircraft to a landing system entry gate as guided by the system of FIG. 1 in order to explain the detailed functions of each of the sub-components of the flight time computer 1300.

Figure 12:
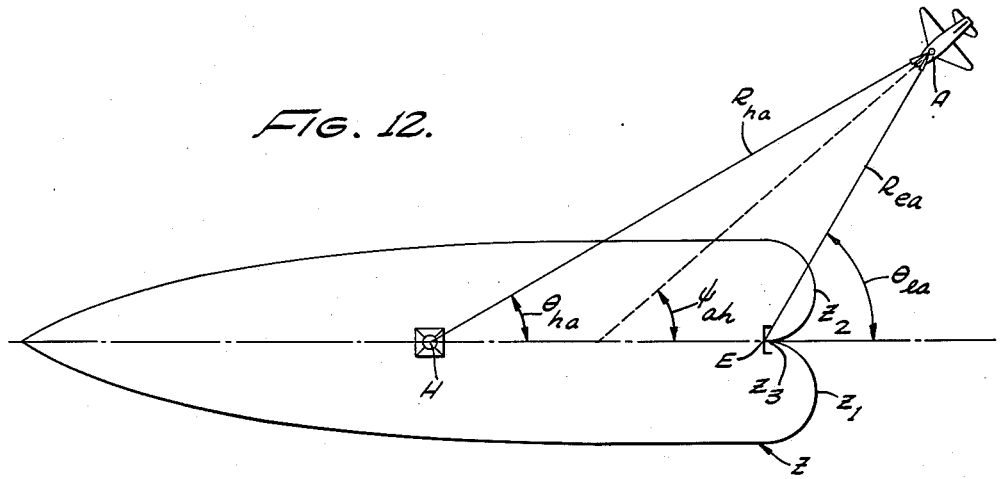
FIG. 12 is a plan view of an approach zone employed with the control system of the present invention indicating the respective coordinate designations made with respect to an aircraft being guided toward the approach zone.

A plan view of an aircraft A approaching an entry gate E is shown in FIG. 12 with a corresponding geometry of the approach zone Z and the control angles and ranges of the aircraft thereshown.

$\theta_{ha}$ is the bearing of the aircraft A from a landing station H as computed by the air to ground message converter 2100. $R_{ha}$ is the aircraft range from the landing station H; $R_{ea}$ is the range of the aircraft from the entry gate E; $\theta_{ea}$ is the bearing of the aircraft with respect to the entry gate E; and $\psi_{ah}$ is the heading of the aircraft with respect to the line through the landing station H and the entry gate E. It is to be noted that the approach zone Z is an elongated heart shaped approach zone having two curved end portions $Z_1$ and $Z_2$ which meet in a cusp $Z_3$ at one end of the approach zone. Preferably an aircraft turns around the end portions $Z_1$ and $Z_2$ at a constant rate and a maximum rate determined by the maximum turning rate of the aircraft A and the maximum turning rate necessary for pilot comfort.

Figure 13:
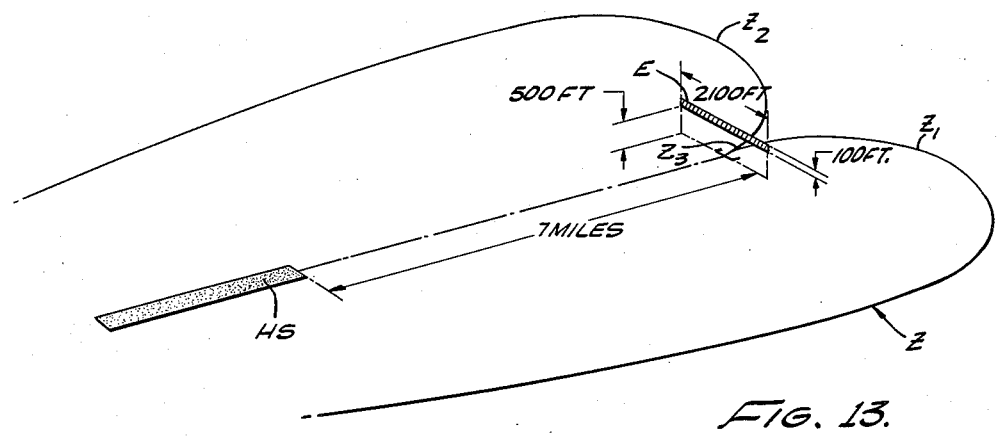
FIG. 13 is an isometric view of a landing strip and an entry gate spaced therefrom illustrating typical dimensions and location of an entry gate.

The typical dimensions of an entry gate and its position are illustrated in FIG. 13 where the approach zone Z is shown encompassing the entry gate E which is spaced typically seven miles from a landing strip HS. The entry gate may be an area in a vertical plane which is spaced 500 feet from ground level, is 100 feet high and is 2100 feet wide.

Figure 14:
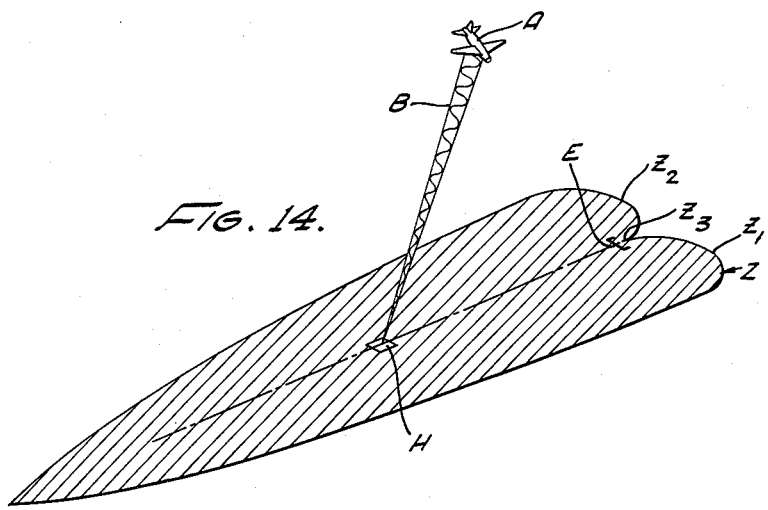
FIG. 14 is an isometric view of the approach zone illustrated in FIG. 12 showing descending aircraft deriving coordinate signals from a beacon transmitted from a landing station in the approach zone.

FIG. 14 is another isometric view of an aircraft A, the approach zone Z, and the landing station H. A modulated beacon B is shown being transmitted from the landing station H to the aircraft A whereby the aircraft may determine its range bearing and heading with respect to the landing station H, transmit it to the transceiver 4000, and through the data link and message storage unit 3000, the air to ground message converter 2100 may develop appropriate position output signals. The use of a beacon of course is not absolutely necessary since range in bearing may be determined in a number of other ways.

Figure 15:
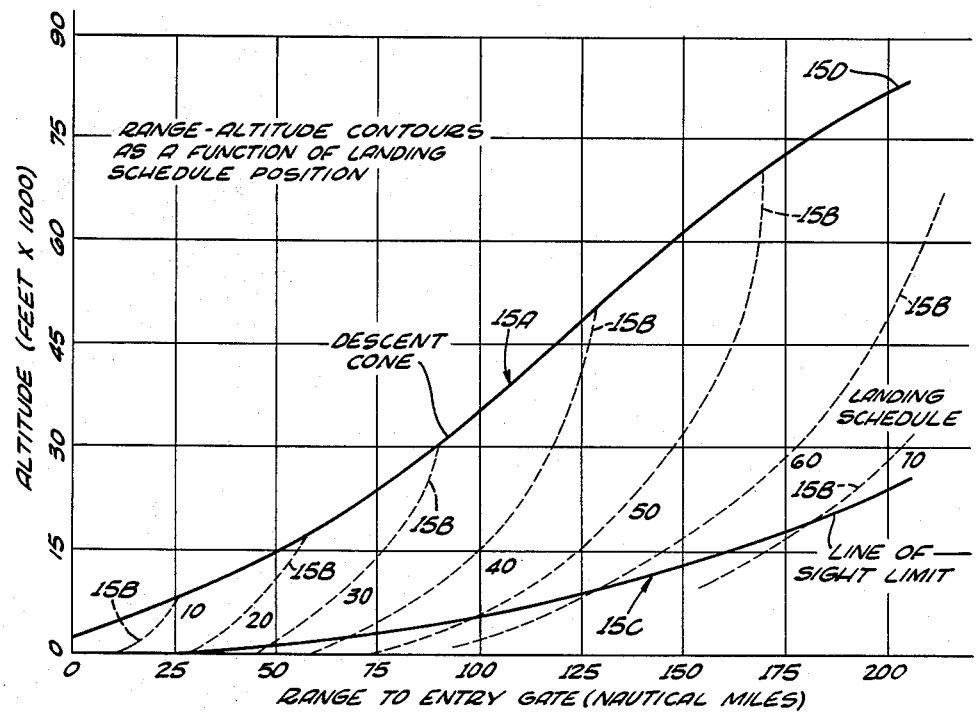
FIG. 15 is a graph illustrating the typical curvature of a descent cone employed with the air traffic control system of the present invention.

A graph of an ideal glidepath 15A for the average performance curves of a group of aircraft designed for the present system is shown in FIG. 15. The ordinant of the graph is altitude in thousands of feet and the range to the entry gate is the abscissa in nautical miles. A group of dotted lines 15B indicate constant times to arrival. These times to arrival are selected times to arrival as produced by the TTA generator T–2000 shown in FIG. 1. A line of sight 15C is also shown in FIG. 15 to show that the radio range of a landing station may be limited by the range of an aircraft therefrom. An aircraft below the ideal glidepath 15A will have a longer ideal entry gate time to arrival than an aircraft on the cone because its average optimum speed is lower at lower altitudes. This is true because aircraft velocity is controlled to be an increasing function of altitude which is the case for all jet aircraft. The dotted lines 15B are thus downwardly concave.

The ideal glidepath 15A was computed for jet aircraft. For this reason certain conditions were specified. The ideal glidepath 15A may be arbitrarily set according to the maximum performance of an aircraft or may be set according to any special conditions in accordance with the present invention. However, it may be of interest to explain the manner in which the ideal glidepath 15A was actually computed. The altitude versus range curve or the glidepath 15A was computed starting at the entry gate or zero range to a predetermined and arbitrary maximum range. As stated previously the glidepath 15A was designed for jet aircraft. Fuel conservation was the prime concern in determining the ideal glidepath 15A. It is well known that jet aircraft operate more efficiently at high altitudes. For this reason, the glidepath 15A was designed to keep an aircraft at a maximum altitude for a maximum length of time, to guide the aircraft at a maximum rate of descent for a predetermined length of time, and for the rest of the time the aircraft is in flight to the entry gate the aircraft is decelerated according to a maximum value.

It is necessary to compute the altitude versus range curve 15A from the entry gate at zero since a velocity integration is necessary and velocity is known only according to altitude. What is meant by "velocity is known" is that optimum velocity for a particular altitude is only known as a function of altitude and not of time or range. The deceleration of an aircraft at a maximum value is determined by its particular velocity and altitude. Deceleration cannot be so fast as to cause "flame-out" or a point at which a jet engine is not provided with sufficient fuel to keep the jet stream of the aircraft engine ignited. The maximum deceleration is an aircraft performance curve and may be averaged with a group of airplanes for which the system of FIG. 1 was designed to accommodate. Maximum deceleration with a safety factor thus can be found as a function of velocity and altitude.

As stated previously, optimum velocity for altitude is determined also from performance curves or average performance curves. Conversely, altitude may be expressed numerically in curves as a function of velocity. By substituting the altitude function of velocity in the curves representing the equation of maximum deceleration as a function of velocity in altitude, maximum deceleration may be represented solely as a function of velocity. This equation may be numerically integrated to give velocity as a function of time. From the representation of velocity as a function of time altitude and range may both be computed as a function of time by numerical integration. By substituting constants for time=0 and altitude equal to, for example, 500 feet, or the height of the entry gate as illustrated in FIG. 13, all the constants on the curves of altitude and range as functions of time or the curves representing them may be determined by substitution. Velocity at the entry gate height may also be determined simply by substituting or finding on the curve of altitude as a function of optimum velocity, the velocity of an aircraft at the altitude of the entry gate. Other rate of descent constants may be found by setting the rate of change of range with respect to time equal to optimum velocity at the entry gate altitude and by setting the rate of change of altitude at entry gate altitude equal to zero.

Figure 16:
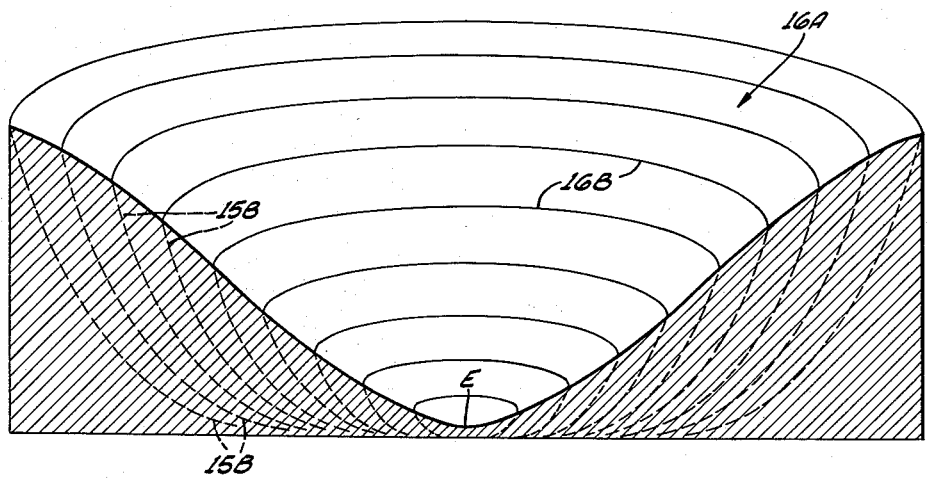
FIG. 16 is a sectional view of an imaginary solid descent cone or bowl which is solid below its upper surface having the curvature illustrated in the graph of FIG. 15.

As stated previously, the ideal glidepath 15A of an aircraft is computed from zero range positively. The altitude versus range curve is computed by eliminating the parameter of time in altitude as a function of time and range as a function of time. Altitude is then computed as a function of range until a predetermined rate of descent or maximum rate of descent is found. This maximum rate of descent may be set according to any special condition. In a preferred embodiment of the invention wherein the ideal glidepath 15A was computed, the maximum rate of descent was based on pilot comfort at, for example, 4000 feet per second. From this point on the curve 15A a different set of curves was employed to determine altitude as a function of range. By setting the derivative of the altitude function of optimum velocity equal to the maximum rate of descent, velocity again may be computed as a function of time from which altitude and range may be computed as a function of time by numerical integration. From these two functions by eliminating the time parameter, altitude may again be computed as a function of range as a continuation of the ideal glidepath 15A. It is to be noted that a topmost portion 15D of the ideal glidepath 15A turns downwardly, i.e., the slope of the curve 15A decreases with range. This is true because at higher altitudes a plane is controlled according to the increased velocity function of altitude and thus in order to maintain the rate of descent at a constant maximum value the rate of change of range component of velocity must be greater than rate of change of altitude component as totaled velocity increases. One half the surface of revolution of the ideal glidepath 15A is indicated as 16A in FIG. 16. A portion of the space below the surface of revolution 16A is indicated as solid. The constant time to arrival or landing schedule dotted lines 15B are again shown in FIG. 16 which in a complete surface of revolution would form a "bucket." All of the "buckets" are not shown in FIG. 16 since as in FIG. 15 only every tenth landing schedule is indicated by a dotted line. However, should all the buckets been shown in FIG. 16 each aircraft assigned to the system would be assigned only to one bucket and would follow the edge of the bucket as indicated by line 16B downwardly toward the entry gate indicated at E as a corresponding bucket continues to decrease in size. This is true of an aircraft on or below the cone or bowl represented by the surface 16A.

Figure 17:
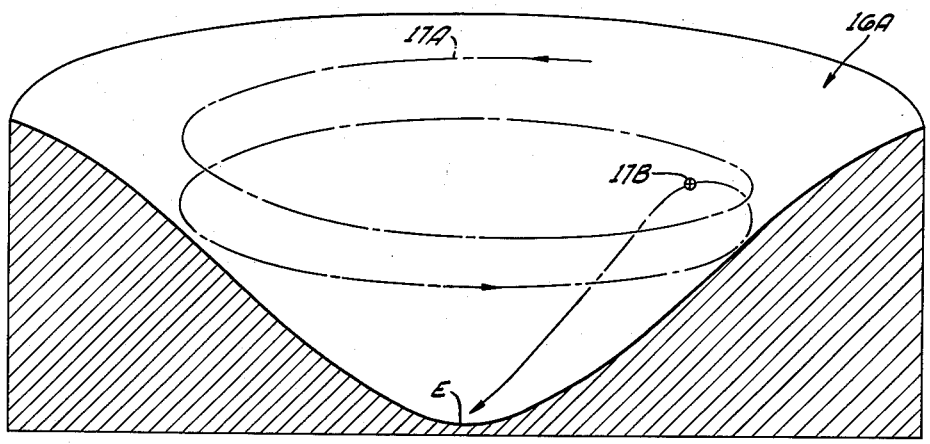
FIG. 17 is a sectional view of the descent cone which is solid below its upper surface as shown in FIG. 16 with the track of an aircraft shown above the descent cone as it descends to and arrives at the descent cone.

In accordance with the invention an aircraft above the surface 16A is caused to circle at a range and decreasing altitude until it reaches the surface 16A. This is shown in FIG. 17 where the flight path of an aircraft above the cone is indicated by 17A and an entry gate is indicated at E. It is to be noted that the aircraft reaches the surface 16A at a point 17B and from there proceeds along the surface 16A to the entry gate E.

An aircraft also circles below the cone when such a command signal is given by the system of FIG. 1 in the event that an associated landing station becomes disabled. The altitude control of an aircraft above the ideal descent cone however is not accompanied by speed control although it is with an aircraft below the ideal descent cone or surface 16A.

Figure 18:
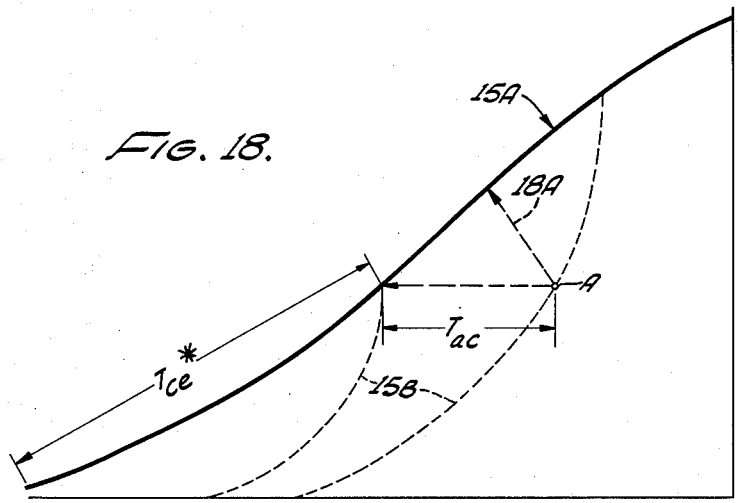
FIG. 18 is a graph of the curvature of the descent cone shown in FIG. 16 with relative entry gate times to arrival of aircraft situated at a point below the descent cone.

Although an aircraft circles with speed control below the ideal descent cone, a correction in speed error is not actually made until the holding period is ended and the aircraft approaches the entry gate radially inbound at a velocity somewhat greater than optimum velocity. As stated previously, speed control is not communicated to an aircraft above the ideal descent cone in order to permit a pilot to decrease speed to descend at a rate for his comfort. Altitude control accordingly is not provided for an aircraft below the descent cone in order to permit an aircraft to rise to the descent cone and thereby increase fuel conservation, which is particularly true with respect to jet aircraft. This is indicated in FIG. 18 where the curve 15A is again shown with two constant TTA lines or landing schedule lines 15B. The position of an aircraft is indicated at A and a dotted arrow 18A is employed to show that an aircraft may increase its altitude to any desired value below or up to the curve 15A. The flight time computer 1300 however is employed to produce a time signal $T_{ae}$ proportional to two times indicated in the FIG. 18 as $T_{ce}^*$ and $T_{ac}$. $T_{ce}^*$ is employed to indicate the time to arrival of an aircraft situated on the glidepath 15A at the altitude of the aircraft A shown in FIG. 18. The time $T_{ac}$ is employed to indicate the time of flight of an aircraft at the altitude A to the ideal glidepath 15A flying at a constant altitude.

Although it may not be absolutely necessary, the flight time computer 1300 preferably makes a correction for the perimetric flight of an aircraft around the approach zone Z, which is shown in FIGS. 12, 13, 14 and 19. The flight time computer 1300 is particularly employed to correct for the deviation in lateral flight of an aircraft around the curved end portion $Z_1$ and $Z_2$ of the approach zone Z.

Figure 19:
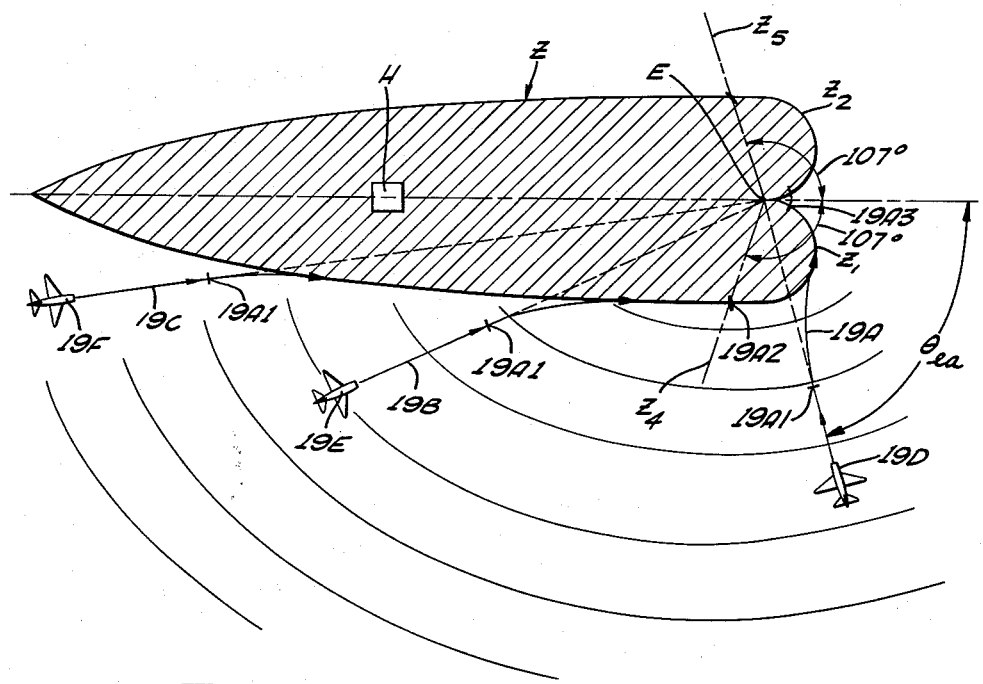
FIG. 19 is a plan view of an approach zone showing aircraft approaches to the perimeter and around the perimeter of the approach zone to an entry gate disposed at a point on the perimeter thereof.

The flight time computer 1300 is also provided with means to correct for wind which generally is assumed to be in the direction of the entry gate from the landing station in the approach zone Z along the axis of the approach zone Z. The need for a correction in the perimetric flight of an aircraft is shown in FIG. 19 where three flight paths 19A, 19B and 19C of three aircraft 19D, 19E and 19F respectively are shown approaching the entry gate at smaller and smaller bearing angles $\theta_{ea}$. Darkened lines perpendicular to the flight path of an aircraft are also shown in FIG. 19 indicating the different phases of lateral control. The first phase of lateral control or the radial phase takes place to the points 19A1 on the three flight paths 19A, 19B and 19C. The second phase of lateral control is initiated at the point 19A1. The second phase is divided into two parts. It is seen that the aircraft 19D is only directed through the second part of the phase II, arriving at a third phase point 19A3 without passing through a point 19A2 representing a change from the first part to the second part of the phase II lateral control of an aircraft. All the aircraft 19D, 19E and 19F pass through the third point 19A3 which is a predetermined and arbitrary selected time to arrival point which may be, for example, 30 seconds from the entry gate E shown in FIG. 19.

The aircraft 19D thus is initially directed radially to the entry gate E and around the curved portion $Z_1$ of the approach zone Z to the point 19A3 at which time the aircraft is directed directly toward the landing station H shown in the approach zone Z. The aircraft 19E is guided directly toward the entry gate E until it reaches a point 19A1 at which time it is directed around the perimeter of the approach zone Z until a point 19A2 at which time a constant rate of turn and speed control signal is added to the lateral control command signal for the aircraft 19E and a constant rate of turn is initiated which will cause the aircraft 19A to again travel around the curved end portion $Z_1$ of the approach zone Z. The aircraft 19E and 19F will follow similar perimetric flight paths around the approach zone Z although the radial flight path toward the entry gate will obviously be somewhat different.

The 107° angle shown between the line through the entry gate E and the landing station H and the dotted line $Z_4$ and $Z_5$ is employed to indicate the bearing angle of an aircraft at which a constant rate of turn and speed control signal is added to the lateral control command signal of an aircraft. The magnitude of this angle is arbitrary and is employed to guide aircraft around the end portions $Z_1$ and $Z_2$ of the approach zone Z at a time sufficiently early to prevent an aircraft from turning too widely and thereby missing the entry gate E. It is to be noted that the air traffic control system of FIG. 1 is a time sharing system and thus command signals generally will not be communicated to an aircraft until 3⅓ seconds after bearing and heading signals are communicated to the landing station H. For this reason the angle from the line to the entry gate E and the landing station H to the dotted lines $Z_4$ and $Z_5$ is greater than 90°. A speed control signal is added in the second part of the phase II lateral control of an aircraft in order to increase the rate of turn of an aircraft should the aircraft be late with respect to its selected entry gate time to arrival schedule.

An isometric view of a solid descent cone 20A is shown in FIG. 20 with the flight paths 20B and 20C of two aircraft 20D and 20E respectively from a point without the system to the entry gate E of the system. An $xyz$ coordinate system is represented with the $z$ coordinate representing altitude and the $x$ and $y$ coordinates representing distance from the entry gate. The aircraft 20D is guided along a first phase to a point 20F from which it is guided along a phase IIB path to the point 20G. From the point 20G the aircraft 20D is guided directly toward a landing station H not shown in FIG. 20. The aircraft 20E is guided along a point and along the bottom surface of the descent cone or bowl 20A to a point 20H at which time it is guided around the perimeter of the approach zone according to a phase IIA lateral control signal. At a point 20I the aircraft 20E is guided around the curved end portion $Z_1$ of the approach zone Z to the final phase switching point 20G at which time it is guided directly toward the landing station H not shown in FIG. 20. It is to be noted that with respect to FIG. 20 all aircraft follow the surface of the ideal descent cone at the same time that the lateral control of aircraft is being changed through different phases.

The flight time computer 1300 is employed to develop three special flight times which are used throughout the guidance unit 1000 of the air traffic control system shown in FIG. 1. These flight times are $+T_{pe}$ and $-T_{ac}$. $+T_{ae}$ may be considered a time reference signal whereas the signal $-T_{ac}$ is in addition employed as a switching signal in the command signal selector 1700. The time $-T_{pe}$ is employed as a TTA correction signal for use with the TTA signal produced by the TTA generator T-2000 in the altitude control computer 1100 shown in FIG. 6. The three times $+T_{ae}$, $-T_{ac}$ and $-T_{pe}$ are generated from four input signals. The first input signal is the actual altitude of an aircraft $Z_a$ impressed upon the flight time computer 1300 by the air to ground message converter 2100 shown in FIG. 7. An "above cone" and a "below cone" gate is also impressed upon the flight time computer 1300 by the command signal selector 1700. An aircraft range to entry gate $R_{ea}$ is also impressed upon the flight time computer by the coordinate translation computer 1400 which may be employed to compute the aircraft range to entry gate $R_{ea}$ from the polar coordinates of the aircraft with respect to the landing station and the distance between and the bearing of the entry gate from the landing station.

The altitude signal $Z_a$ is inverted by an inverter 1410 which is employed to impress a negative actual altitude signal upon two function generators 1420 and 1430 which respectively produce range and reciprocal velocity functions of altitude, function generators generally requiring positive and negative inputs. The ideal range of an aircraft having the particular altitude $Z_a$ is indicated as $R_{ec}^*$ and the reciprocal of ideal velocity of an aircraft for its particular altitude is indicated as $1/V^*$. The range $R_{ec}^*$ is the ideal range of an aircraft at its particular altitude but only on the ideal descent cone. The ideal velocity of the aircraft $V^*$ is of course not a function of the aircraft range. The range $R_{ec}^*$ is added to a corrected range difference $-(R_{ea}-\Delta R_w)$ in an adder 1440. The corrected range difference signal is obtained through the use of a multiplier 1450 which multiplies the component of velocity of wind $\Delta V_w$ as a function of the bearing of the aircraft with respect to the entry gate or $\theta_{ea}$ as produced by the coordinate translation computer 1400 and a computed flight time $T_{ae}$ of the time to arrival of the aircraft flying an ideal course at a constant altitude to the ideal descent cone and along the descent cone to the entry gate at an ideal velocity. This time $+T_{ae}$ thus is equal to $T_{ce}*+T_{ac}+T_{pe}$ where $T_{ce}*$ is the ideal flight time of the aircraft along the descent cone from its particular altitude to the entry gate; $T_{ac}$ is the aircraft time to arrival to the ideal descent cone flying at a constant altitude equal to its current actual altitude $Z_a$; and $T_{pe}$ is the additional time to arrival required for an aircraft deviating from its course directly toward the entry gate around the perimeter of the approach zone Z containing the landing station H. $T_{pe}$ is also generated as a function of the bearing of the aircraft from the entry gate or a function of $\theta_{ea}$.

The output of the multiplier 1450 thus is $-\Delta R_w$ or the range correction needed for the actual range of the aircraft $R_{ea}$ to indicate actual range of the aircraft as corrected for wind. In the present case wind is always assumed in the direction from the landing station toward the entry gate. $R_{ea}$ is added to $-\Delta R_w$ by an adder 1460 which then produces the difference $-(R_{ea}-\Delta R_w)$ from the ideal cone range $R_{ec}*$ of an aircraft at its particular altitude. As stated previously the difference $$-(R_{ea}-\Delta R_w)$$

is added to $R_{ec}*$ by the adder 1440 to derive a corrected range signal which is multiplied by the reciprocal of ideal velocity or $1*/V$ by a multiplier 1470 which produces the negative signal $-T_{ac}$.

When $T_{ac}$ is positive, this means that an aircraft is above the ideal descent cone. No speed correction is made when an aircraft is above the descent cone. Hence no "computed time to arrival" or $T_{ae}$ must necessarily be computed when $T_{ac}$ is negative. For this reason a diode 1400–D is employed to prevent the addition of the positive signal $-T_{ac}$ in an adder 1480 which is employed to take the sum of $-T_{ce}*$, $-T_{ac}$ and $-T_{pe}$ to produce an output signal proportional to $+T_{ae}$.

The correction signal $-T_{pe}$ is taken directly from the output of a function generator 1490 and a function generator 1405 is employed to produce a $\Delta V_w$ wind velocity component as a function of the aircraft bearing $\theta_{ea}$ from the entry gate. As stated previously the time correction signal $-T_{pe}$ is also generated as a function of $\theta_{ea}$. The negative $-T_{ae}$ signal is impressed upon the adder 1480 from the diode 1400–D and the $-T_{pe}$ signal is impressed upon the adder 1480 by the function generator 1490. The $-T_{ce}*$ signal is impressed upon the adder 1480 by computing means including an inverter 1415, a switching circuit 1425, and a function generator 1435. The inverter 1415 is employed to produce a signal proportional to $-R_{ec}*$ which is impressed upon the switching circuit 1425 with a $-(R_{ea}-\Delta R_w)$ signal.

The switching circuit 1425 is provided with an "and" gate 1425–A to indicate an "on cone" signal when both above and below cone gates are received from the command signal selector 1700 of FIG. 28. The output of the "and" gate indicating the on cone condition is impressed upon a cathode follower 1425–C which in turn energizes a relay 1425–R. In the normally de-energized state the relay 1425–R permits a switch 1425–S to connect the output of the inverter 1415 or $-R_{ec}*$ to the function generator 1435. When the relay 1425–R is energized, the output of the adder 1460 or $-(R_{ea}\Delta R_w)$ is impressed upon the function generator 1435. The use of the switching circuit 1425 thus permits the computation of $-T_{ce}*$ as a function of the actual corrected range of an aircraft and thereby $+T_{ae}$ will also be a function of the actual corrected range of the aircraft. The speed control computer 1200 shown in FIG. 27 utilizes the signal $+T_{ae}$ in combination with the output signal $+TTA$ of the TTA generator T–2000 shown in FIG. 5. A time difference signal $(TTA-T_{ae})$ is, in fact, taken in the speed control computer 1200 to derive a speed command signal. This speed command signal, when an aircraft is on the cone, then is a special function of how late an aircraft is, i.e. the difference between TTA and $T_{ae}$ will produce the signal proportional to the difference in the selected and computed times to arrival of an aircraft; however, in addition the corrected $T_{ae}$ produced by the switching circuit 1425 also makes the speed command signal produced by the speed control computer 1200 a function of the actual range of the aircraft. The speed control computer 1200 is therefore permitted to generate a speed command signal that is also a function of ideal range.

The output of the adder 1460 $-(R_{ea}-\Delta R_w)$ cannot be used when an aircraft is above or below a cone since the function generator 1435 may not be appropriately or easily set for each particular altitude at which an aircraft might be flying. Hence the signal $-R_{ec}*$ is introduced to the function generator 1435 when an aircraft is above or below the ideal descent cone. The function generator 1435 itself comprises an input amplifier 1435–A1, an output amplifier 1435–A2 and a thyrite oven 1435–T which includes a thyrite element 1435–TT and a heating element 1435–TH. The output of the thyrite function generator 1435 thus is $-T_{ce}*$ which with $-T_{ac}$ and $-T_{pe}$ is added by the adder 1480 to produce the signal $+T_{ae}$.

*The Phase I Lateral Control Computer 1800 Shown in FIG. 23*

Figure 22:
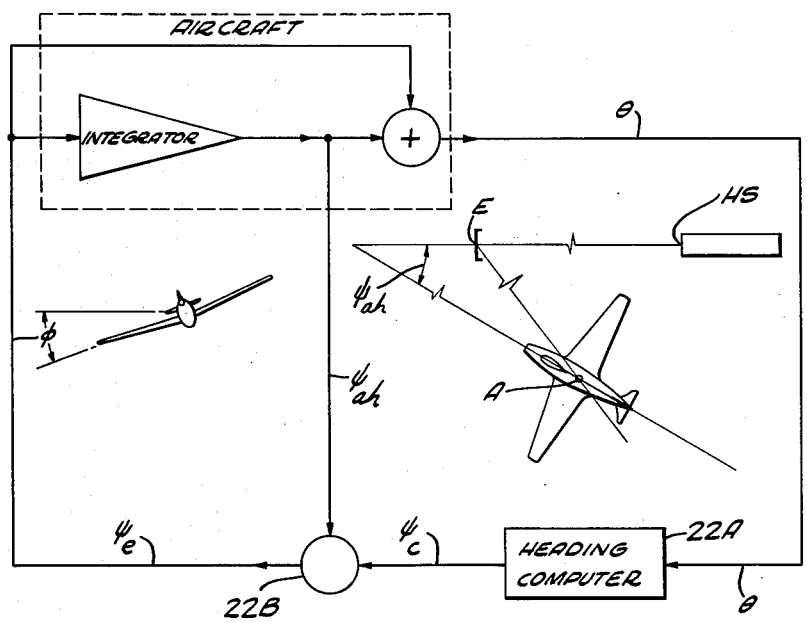
FIG. 22 is a schematic view of a servo loop illustrating the lateral control method of the present invention.
Figure 25:
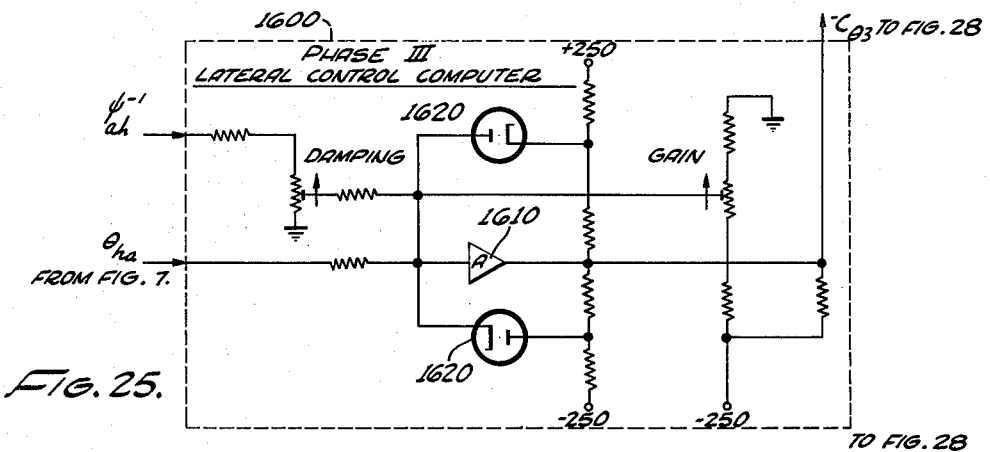

A novel method of lateral control provided in accordance with the invention is illustrated in FIG. 22 relative to the lateral control computers 1800, 1500 and 1600 of FIGS. 23, 24 and 25. An aircraft is shown in FIG. 22 as an analog integrator of a heading error control signal $\psi_e$ to produce an actual heading $\psi_{ah}$. The aircraft shown in FIG. 22 is also illustrated as an analog adder of $\psi_e$ and $\psi_{ah}$ to produce the polar bearing coordinates $\theta$ of the aircraft. A heading computer 22A is also shown in FIG. 22 which produces an ideal heading signal $\psi_c$ in response to the input of coordinate $\theta$. The heading computer 22A may be considered any one of the control computers of the guidance unit 1000 of FIG. 1. The ideal heading signal $\psi_c$ is then compared in a comparator 22B with the actual heading signal $\psi_{ah}$ to produce the heading error signal $\psi_e$.

The truth of the diagram of FIG. 22 may easily be proved by making a few reasonable assumptions. In the first place, the diagram of FIG. 22 will be employed to show that the method of lateral control provided by the invention is unconditionally stable, i.e. an actual aircraft heading will not oscillate about its ideal heading.

In accordance with the invention a heading error is communicated to an aircraft as a bank angle signal $\theta$. The pilot or autopilot of an aircraft is then required to maintain the rate of turn of the aircraft at a value for stable flight. This requires that the sum of the centrifugal force and the weight of the aircraft act at right angles to the wing axis of a plane. This means that $$\tan \phi = \frac{a}{g} \qquad (1)$$

where $a$ is acceleration due to centrifugal force and $g$ is acceleration due to gravity.

By definition $$a = V\frac{d\psi ah}{dt} \qquad (2)$$

thus $$\tan \phi = \frac{V}{g}\frac{d\psi ah}{dt} \qquad (3)$$

When $\theta$ is small, e.g. $\theta \leq 8°$, $$\phi = \frac{V}{g} \frac{d\psi ah}{dt} \quad (4)$$

or $$\psi ah \alpha \int \phi dt \quad (5)$$

which is the first analog function of the aircraft shown in FIG. 22.

As stated previously, $\phi$ is made proportional to heading error. Thus $$\theta - \psi_{ah} = K\theta \quad (6)$$

where $\theta$ is equal to or a function of ideal heading $\psi_c$ and K is a constant of proportionality.
But $$\tan \phi = \frac{V}{g} \frac{d\psi ah}{dt} \quad (7)$$

thus $$\tan \frac{1}{K}(\theta - \psi ah) = \frac{V}{g} \frac{d\psi ah}{dt} \quad (8)$$

For small error angles, then $$\theta - \psi ah = \frac{KV}{g} \frac{d\psi ah}{dt} \quad (9)$$

and $$\theta = \frac{KV}{g} \frac{d\psi ah}{dt} + \psi ah \quad (10)$$

By definition $$\psi_{ah} \alpha \int \phi dt \quad (11)$$

and $$\frac{d\psi ah}{dt} \alpha \phi \quad (12)$$

Then substituting into Equation 10, $$\theta \alpha \phi + \int \phi dt. \quad (13)$$

Equation 13 thus proves the aircraft analog addition diagrammatically illustrated in FIG. 22.

To prove that the method of lateral control provided by the invention is unconditionally stable, Equation 9 may be used when rewritten as $$\tau \frac{d\psi ah}{dt} + \psi ah = \theta \quad (14)$$

where $$\tau = \frac{KV}{g} \quad (15)$$

Equation 14 may be subjected to a LaPlace transformation to give an output function $Y(s)$ and an input function $X(s)$ as follows:

$$Y(s) = \int_0^\infty e^{-st} \psi_{ah}(t) dt \quad (16)$$

$$Y(s) = \int_0^\infty e^{-st} \theta(t) dt \quad (17)$$

where $s$ is a complex variable. Working the LaPlace transformation of Equation 14, the following is found:

$$(\tau s + 1) Y(s) = Y(s) + \tau \psi_0 \quad (18)$$

where $$\psi_0 = \psi(o) \quad (19)$$

thus $$Y(s) = \frac{X(s)}{\tau s + 1} + \frac{\psi_0}{\tau s + 1} \quad (20)$$

However, the change in $Y(s)$ due to a change in $X(s)$, or $Y_0(s)$ is given by $$Y_0(s) = \frac{X(s)}{\tau s + 1} \quad (21)$$

The transfer function of the aerodynamic servo then is $$\frac{Y_0(s)}{X(s)} = F(s) = \frac{1}{\tau s + 1} \quad (22)$$

This is well known in the art as a simple lag network. s cannot have imaginary roots. Hence, $\psi_{ah}$ cannot be oscillatory about $\theta$ and the servo is unconditionally stable.

$\theta_{ea}$, the relative bearing of an aircraft with respect to the entry gate E, is developed by the coordinate translation computer 1400 and impressed upon an adder 1810 shown in FIG. 23 and thereby added to the $-\psi_{ah}^{-1}$ signal produced by the air to ground message converter 2100 shown in FIG. 7. The output of the adder 1810 is then impressed upon an adder 1820, the bias upon which is changed by a pair of bias control circuits 1825 and 1830. The bias control circuit 1825 is employed to change the bias on the adder 1820 when the quantity $(\theta_{ea} - \psi_{ah}^{-1})$ exceeds a predetermined positive value, for example, a value representative of a difference equal to more than 180°. The bias control circuit 1830 is employed to add a positive bias to the adder 1820 when the difference $(\theta_{ea} - \psi_{ah}^{-1})$ exceeds a predetermined low level.

The output of the adder 1820 or $(\theta_{ea} - \psi_{ah}^{-1})$ which may be called the adjusted heading difference signal is then impressed upon a third adder 1840 which adds a negative signal $-(TTA - T_{ae})$ when $(TTA - T_{ae})$ is positive and an aircraft is directed inbound. An inverter amplifier 1870 is then employed with a diode-resistor circuit 1845 to prevent the $-(TTA - T_{ae})$ signal from being added to the adjusted heading difference signal $$(\theta_{ea} - \psi_{ah}^{-1})$$

in the adder 1840 when $(TTA - T_{ae})$ is negative.

When an aircraft is directed inbound toward the entry gate E, no orbital gate is received from the command signal selector 1700 shown in FIG. 8 to actuate a relay circuit 1850. Accordingly a second output labeled 1845–2 is connected to ground to the relay circuit 1850 when no orbital gate is received from the command signal selector 1700 and the diode-resistor circuit 1845 through a first output 1845–1 adds a negative $-(TTA - T_{ae})$ signal when $(TTA - T_{ae})$ is positive. When an orbital gate is received from the command signal selector 1700, the first output 1845–1 of the diode-resistor circuit 1845 is grounded and the second output 1845–2 is then impressed upon the adder 1840 to add a negative $TTA - T_{ae}$ signal to the adjusted heading difference signal $(\theta_{ea} - \psi_{ah}^{-1})$ whether or not $(TTA - T_{ae})$ is positive.

An above cone relay circuit 1860 with the relay circuit 1850 is employed to ground a fourth input 1840–4 to the adder 1840 when either an aircraft is on or below the ideal descent cone and when the aircraft is directed inbound on a radial path toward the entry gate E. When either the circuit 1850 receives an orbital gate from the command signal selector 1700 or an above cone gate is impressed upon the above cone relay circuit 1860 from the command signal selector 1700, a constant positive voltage is impressed upon the adder 1840 to the fourth input lead 1840–4 to cause an aircraft to be directed on an orbital path around the entry gate E.

It is obvious that an orbital path is desired when an orbital gate is received from the command signal selector 1700. An aircraft is directed on an orbital path also when an above cone gate is received from the command signal selector 1700 since, in accordance with the invention, an aircraft is preferably not directed inbound until it arrives at the ideal descent cone, the ideal descent cone rate of descent being a maximum at least for a portion thereof. The negative $-(TTA - T_{ae})$ signal impressed upon the output 1845–1 of the diode-resistor circuit 1845 is provided to slow the turn of an aircraft when it is ahead of schedule. This thus reduces the inbound velocity of an aircraft until its computed time to arrival $T_{ae}$ becomes equal to the selected or ideal time to arrival TTA.

If an aircraft is behind schedule, then of course the use of a negative time difference signal, that is, $-(TTA-T_{ae})$ is not desired and hence the use of the diode circuit 1845.

When an aircraft is either early or late and it is being directed orbitally around the entry gate E, it is desirable to speed up an aircraft or slow it down according to its particular schedule, thus the range of the aircraft is decreased or increased by a heading that causes an aircraft to be directed somewhat inbound or somewhat outbound until it reaches a radius proportional to its ideal time to arrival or selected time to arrival, TTA. When the landing station is disabled TTA will remain constant since the TTA generator T-2000 shown in FIG. 5 will be caused to count, for example, an even multiple of the capacity of the system shown in FIG. 1. When an aircraft simply is above the ideal descent cone, TTA will of course be changed and an aircraft will be directed on a radial path downwardly toward the ideal descent cone and somewhat inbound dependent upon the rate of change of range of an ideal range position established by the TTA signal. The adder 1840 is provided with a pair of biased diodes 1841 and 1842 to prevent the output of the adder 1840 or $-C_{o1}$, the phase I laterally control command signal, from exceeding predetermined and selected positive or negative values.

The Phase II Lateral Control Computer 1500 Shown in FIG. 24

The lateral control computer 1500 is employed to produce a command signal $-C_{o2}$ to guide an aircraft around the perimeter of the approach zone Z. The lateral control computer 1500 has two phases of operation. The first phase to guide an aircraft according to the command signal $C_{\theta 2A}=K_1(\psi_p{}^*-\psi_{ah})+K_2(R_{ep}{}^*-R_{ea})$. The quantity $(\psi_p{}^*-\psi_{ah})$ may be called a heading difference signal where $\psi_p{}^*$ is the ideal perimetric heading of an aircraft for its particular bearing and $\psi_{ah}$ is the actual heading of the aircraft. The quantity $(R_{ep}{}^*-R_{ea})$ may be called a range difference signal where $R_{ep}{}^*$ is the ideal perimetric range of an aircraft for its particular bearing and $R_{ea}$ is its actual range from the entry gate E. The heading difference signal is produced by an adder 1510 in the lateral control computer 1500. The adder is provided an input $-\psi_{ah}$ from the coordinate translation computer 1500 and a second input from a function generator 1520 which produces $\psi_p{}^*$ as a function of $\theta_{ea}$.

$+\theta_{ea}$ is impressed upon the function generator 1520 by the coordinate translation computer 1400 and $-\theta_{ea}$ is impressed on the function generator 1520 by an inverter 1530 having an input $+\theta_{ea}$. Many function generators generally require positive and negative inputs as stated in the description of the flight time computer 1300 of FIG. 21.

The heading difference signal produced by the adder 1510 is added to the range difference signal in an adder 1540 which is provided with a pair of biased diodes 1541 and 1542 to prevent the $-C_{o2}$ lateral control command signal from increasing or decreasing beyond predetermined and selected limits. The range difference signal is produced by an adder 1550 which receives $-R_{ea}$ and an output $+R_{ep}{}^*$ from a function generator 1560 which produces the negative ideal range of an aircraft for its particular bearing from $\pm\theta_{ea}$ signals.

The output of the adder 1550 is impressed upon an inverter 1570 which is in turn impressed upon the adder 1540. The polarities of the range and heading difference signals are changed by means of a switching circuit 1580 which takes an output from the adder 1550 directly and bypasses the inverter 1570 when a portside signal is received from the coordinate translation computer 1500 which computes the relation of an aircraft with respect to a line through the entry gate and landing station as a function of the bearing of the aircraft with respect to the landing station H. The polarity of the output of the adder 1510 is also reversed by means of the circuit 1580.

In the second part of the operation of the lateral control computer 1500, the command signal produced by the lateral control computer 1500 is represented as $$C_{\theta 2B}=K_1(\psi_p{}^*-\psi_{ah})+K_2\left[(R_{ep}{}^*-R_{ea})+\frac{K_3}{K_2}(TTA-T_{ae})\right]+\beta$$

The quantity $(TTA-T_{ae})$ may be called a time difference signal and the quantity $\beta$ may be called a constant rate of turn signal. Thus during the second part of the operation of the lateral control computer 1500 the time difference signal and the constant rate of turn signal are added to the heading and range difference signals. Specifically the time difference signal is added to the range difference signal in the adder 1550 by means of a switch 1590-S which is operated by a switching circuit 1590 in response to the entry gate bearing of an aircraft reaching a predetermined level. The inputs to the function generator 1560 and to the switching circuit 1590 are plus the absolute value of $\theta_{ea}$. Hence the polarity of the range difference signal is not a function of the entry gate bearing signal $\theta_{ea}$ produced by the coordinate translation computer 1500.

The switching circuit 1580 produces a constant rate of turn signal $\beta$ of the proper polarity by means of a relay 1581 contained therein. The time difference signal provided by the speed control computer 1200 is then impressed upon the adder 1500 to be added to the range difference signal. The constant rate of turn signal $\beta$ is then added at the proper time to the sum of the range difference signal, the time difference signal, and the heading difference signal in the adder 1540 to produce the phase II lateral control command signal $-C_{\theta 2}$.

The Phase III Lateral Control Computer 1600 Shown in FIG. 25

The phase III lateral control computer 1600 shown in FIG. 25 comprises simply a summing circuit including a summing amplifier 1610 and a pair of biased diodes 1620 which are employed to prevent an output final phase command signal or $-C_{\theta 3}$ from increasing or decreasing beyond predetermined limits. Appropriate resistor circuitry is then employed to operatively connect the diode 1620 with the amplifier 1610 to produce the command signal $C_{\theta 3}$ from input signals $\psi_{ah}{}^{-1}$ and $\theta_{ha}$ in a well known manner. The command signal $C_{\theta 3}$ is then represented as:

$$C_{\theta 3}=K_4\left(\frac{K_1}{K_4}\psi_{ah}{}^{-1}+\theta_{ha}\right)$$

where $K_1$ and $K_4$ are constants of the summing circuit 1600 and $\psi_{ah}{}^{-1}$ is equal to $\psi_{ah}$ plus or minus 180°. The command signal $-C_{o3}$ is, of course, introduced to the command signal selector 1700 of FIG. 28, the phase III lateral control computer 1600 being provided inputs $\psi_{ah}{}^{-1}$ and $\theta_{ha}$ from the air to ground message converter 2100 shown in FIG. 7.

Figure 26:
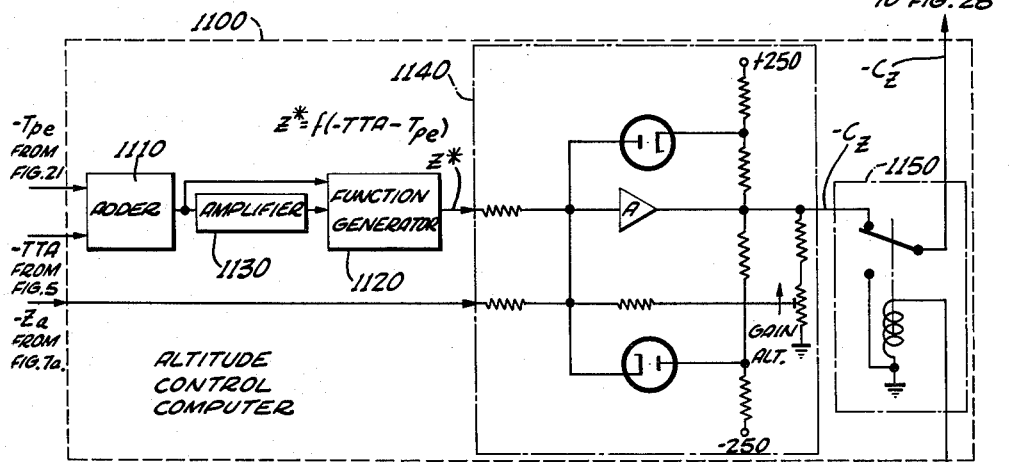
FIGS. 26 and 27 are diagrammatic views of altitude and speed control computers, respectively.

The Altitude Control Computer 1100 Shown in FIG. 26

The altitude control computer is employed to produce an ideal altitude $Z^*$ as a function of a corrected selected time to arrival signal. The actual altitude of the aircraft is then subtracted from the ideal altitude to give a negative altitude command signal $-C_z$. The corrected time to arrival is produced by adding $-T_{pe}$ and $-TTA$, $-T_{pe}$ being produced by the flight time computer 1300 and $-TTA$ being produced by the TTA generator T-2000. These two times are added in an adder 1110. The output of the adder is impressed upon a function generator 1120. The function generator 1120 is also provided with a negative input signal proportional to the output of the adder 1110 by an inverter amplifier 1130. The output of the function generator, which is $Z^*$, is then added to $-Z_a$ in an adder 1140 which is substantially identical to the adder 1540 shown in FIG. 24. The output of the adder 1140 is then $-C_z$. A switching circuit 1150 is provided to switch the output of the altitude control computer 1100 to ground on the condition that an aircraft is below the cone. Altitude command signals are not employed when an aircraft is below the cone, as stated previously, since an aircraft may want to rise to a higher altitude to conserve fuel.

Figure 27:
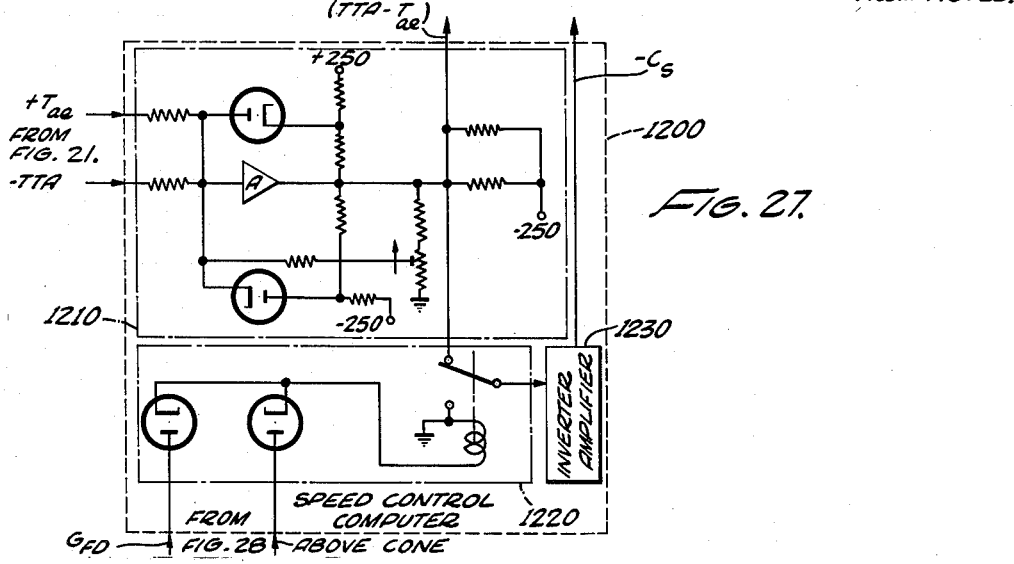

*The Speed Control computer 1200 Shown in FIG. 27*

The speed control computer 1200 is employed simply to add a $+T_{ac}$ signal produced by the flight time computer 1300 to a $-TTA$ signal produced by the TTA generator T-2000. Accordingly an amplifier 1210 is provided in the speed control computer which is substantially identical to the adder 1140 of the altitude control computer 1100 and the adder 1540 of the phase II lateral control computer 1500. The time difference signal $(TTA-T_{ae})$, which the adder 1210 produces, is employed in other circuits such as the phase II lateral control computer 1500 shown in FIG. 24. The output of the speed control computer, $-C_s$, is shorted to ground by an "or" gate switch 1220 on one of two conditions. The first condition is that the gate $G_{FD}$ is true or that the command signal selector 1700 produces an "above cone" gate. The $G_{FD}$ gate is produced in response to signals representing that the landing station is disabled and all aircraft are circling circumferentially around the entry gate E. The "above cone" gate is employed to shunt the $-C_5$ command signal to ground where an aircraft is above the ideal descent cone since speed control is undesirable then because an aircraft pilot may want to choose his own speed for comfort or for fuel conservation purposes. The output of the "or" gate switch 1220 is then inverted by an inverter amplifier 1230 to produce the negative speed command signal $-C_s$.

Figure 28:
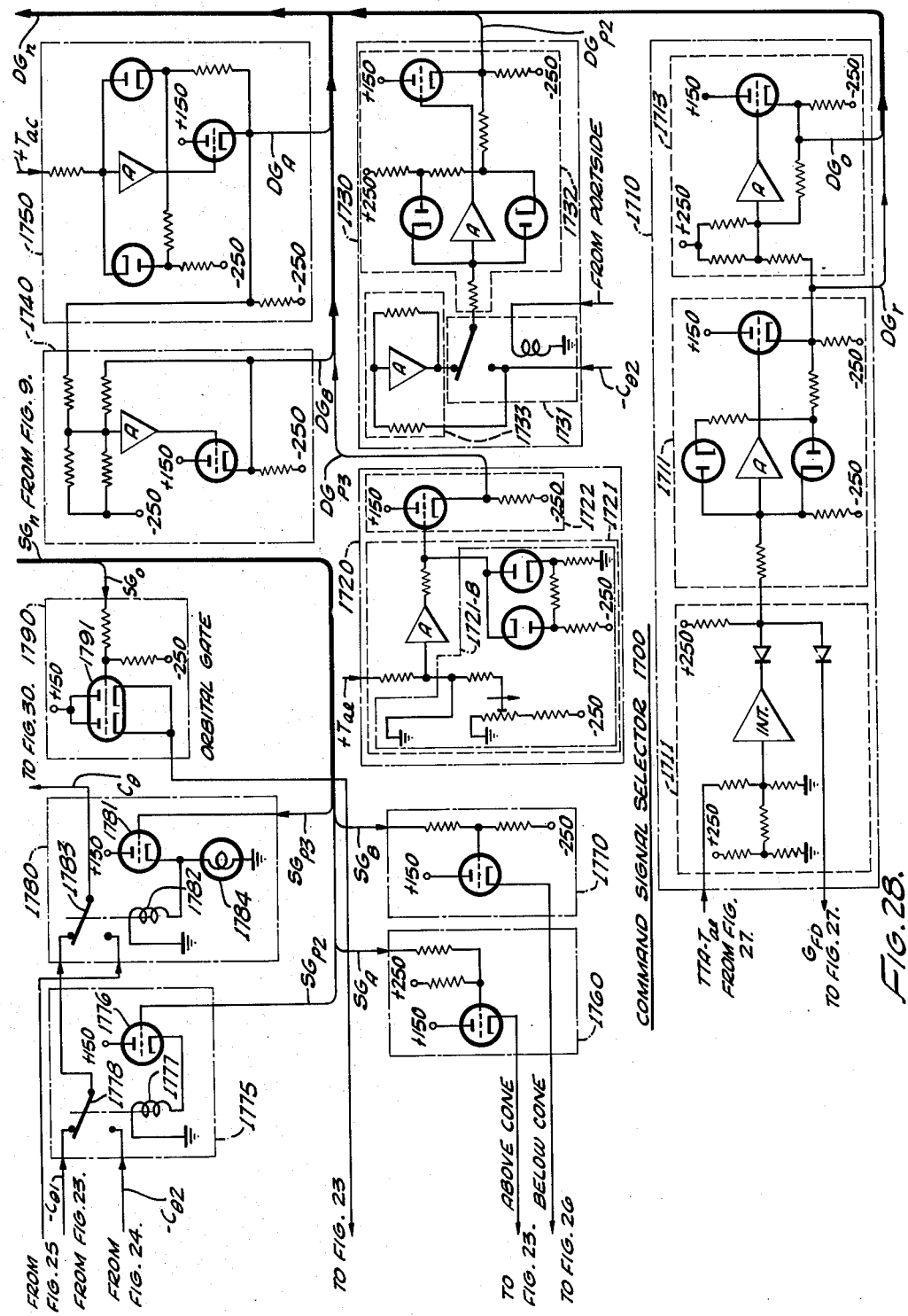
FIG. 28 is a diagrammatic view of a command signal selector shown in the block diagram of FIG. 1.

*The Command Signal Selector 1700 Shown in FIG. 28*

The command signal selector 1700 primarily cooperates with the switch code shift register 2334 and the computers in the guidance unit 1000 to switch the command signals of the control computers contained in the guidance unit 1000 shown in FIG. 1. Accordingly, the command signal selector 1700 produces decision gates as indicated inputs to the "and" gate 2335 shown in FIG. 9, which change the state of the switch code shift register 2334 when a change is made in the lateral, altitude or speed control of an aircraft.

The command signal selector 1700 is employed to produce a plurality of decision gates generally denoted as $DG_n$ which are introduced to the "and" gates 2335 shown in FIG. 9. The command signal selector 1700 is also employed to receive a plurality of switch gates generally denoted as $SG_n$ to produce corresponding gates to operate a number of the control computers in the flight time computer shown in the guidance unit 1000 of FIG. 1. The command signal selector 1700 comprises a radial-orbital decision gate circuit 1710; a phase III decision gate circuit 1720, a phase II decision gate circuit 1730, a below-cone decision gate circuit 1740, an above-cone decision gate circuit 1750; an above-cone switch gate circuit 1760, a below-cone switch gate circuit 1770, a phase II switch gate circuit 1775, a phase III switch gate circuit 1780, an orbital switch gate circuit 1790, and a phase II relay 1795.

The radial-orbital decision gate circuit 1710 comprises an integrator circuit 1711 for producing an output pulse when the TTA generator T-2000 produces constant TTA signals. The output pulse of the integrator circuit 1711 is employed to produce the disabled gate $G_{FD}$ for indicating the condition that an associated landing station is disabled and that aircraft must hold or circle about the landing system entry gate E at constant range. The output of the integrator circuit 1711 is also impressed upon an amplifier and cathode follower circuit 1712 which produces a radial decision gate $DG_r$ which is impressed upon the proper "and" gate 2335 in FIG. 9. The decision gate $DG_r$ is also impressed upon an amplifier and cathode follower circuit 1713 which is employed to produce an orbital decision gate $DG_o$, which is also impressed upon the corresponding "and" gate 2335 in FIG. 9.

The phase II decision gate circuit 1730 comprises a relay circuit 1731 to receive a "portside" signal from a coordinate translation computer 1400 to accordingly switch a $-C_{o2}$ input directly to an amplifier and cathode follower output stage 1732 when a portside signal is received and to connect the $-C_{o2}$ input through an inverter amplifier 1733 to the amplifier and cathode follower output stage 1732 on the condition that an aircraft is positioned in a particular two of the quadrants above and below a line through the entry gate E and landing station H in the associated landing system. The output of the phase II decision gate circuit 1730 is then a decision gate $DG_{p2}$ which occurs when $C\theta_z$ becomes zero.

The phase III decision gate circuit 1720 comprises an amplifier circuit 1721 which is employed to produce a positive gate when $+T_{ae}$ passes a predetermined low level set by a bias circuit 1721-B. The output of the amplifier circuit 1721 is then impressed upon a cathode follower stage 1722, the output of which is the phase III decision gate $DG_{p3}$.

The below cone decision gate circuit 1740 also comprises an amplifier and cathode follower output stage to produce a below cone decision gate $DG_B$ when the above cone decision gate circuit 1750 produces a gate of an opposite polarity. The above cone decision gate circuit 1750 is accordingly provided with a similar amplifier and cathode follower output stage to produce an above cone decision gate $DG_A$ when $+T_{ac}$ is positive, this time indicating that an aircraft is positioned below the ideal descent cone.

The above cone switch gate circuit 1760 is simply a biased vacuum tube gating circuit which is employed to produce an above cone gate on the reception of a switch gate $SG_A$ from the cathode followers 2337 connected to the switch cone shift register 2334 of FIG. 9.

The below cone switch gate circuit 1770 is provided with an identical circuit as the above cone switch gate circuit 1760 except for the fact that the vacuum tube in the circuit is biased in a negative direction whereas the vacuum tube in the above cone switch gate circuit 1760 is biased in a positive direction. The below cone switch gate circuit is provided with a switch gate $SG_B$ to produce a "below cone" gate.

The phase II switch gate circuit 1775 is provided with a triode vacuum tube having a switch gate signal $SG_{p2}$ impressed on the grid thereof to operate a relay 1777, whereby a switch 1778 is actuated to change the output $C_o$ signal from $C_{o1}$ to $C_{o2}$. The phase III switch gate circuit 1780 is similarly provided with a vacuum tube 1781. A switch gate $SG_{p3}$ from FIG. 9 is then impressed upon the grid of the vacuum tube 1781 to actuate a relay 1782. The relay 1782 in turn operates a switch 1783 to change the $C_o$ output signal of the phase III switch gate circuit 1780 from $C_{o2}$ to $C_{o3}$.

A voltage regulator tube 1784 is provided in the phase III switch gate circuit 1780 to maintain a substantially constant voltage across the relay 1782. The orbital switch gate circuit 1790 is employed to produce an orbital gate on the reception of an orbital switch gate $SG_o$. The orbital gating circuit is provided with a twin triode 1791 which operates in substantially the same manner as the triode contained in the below cone switch gate circuit 1770.

Figures 29, 30:
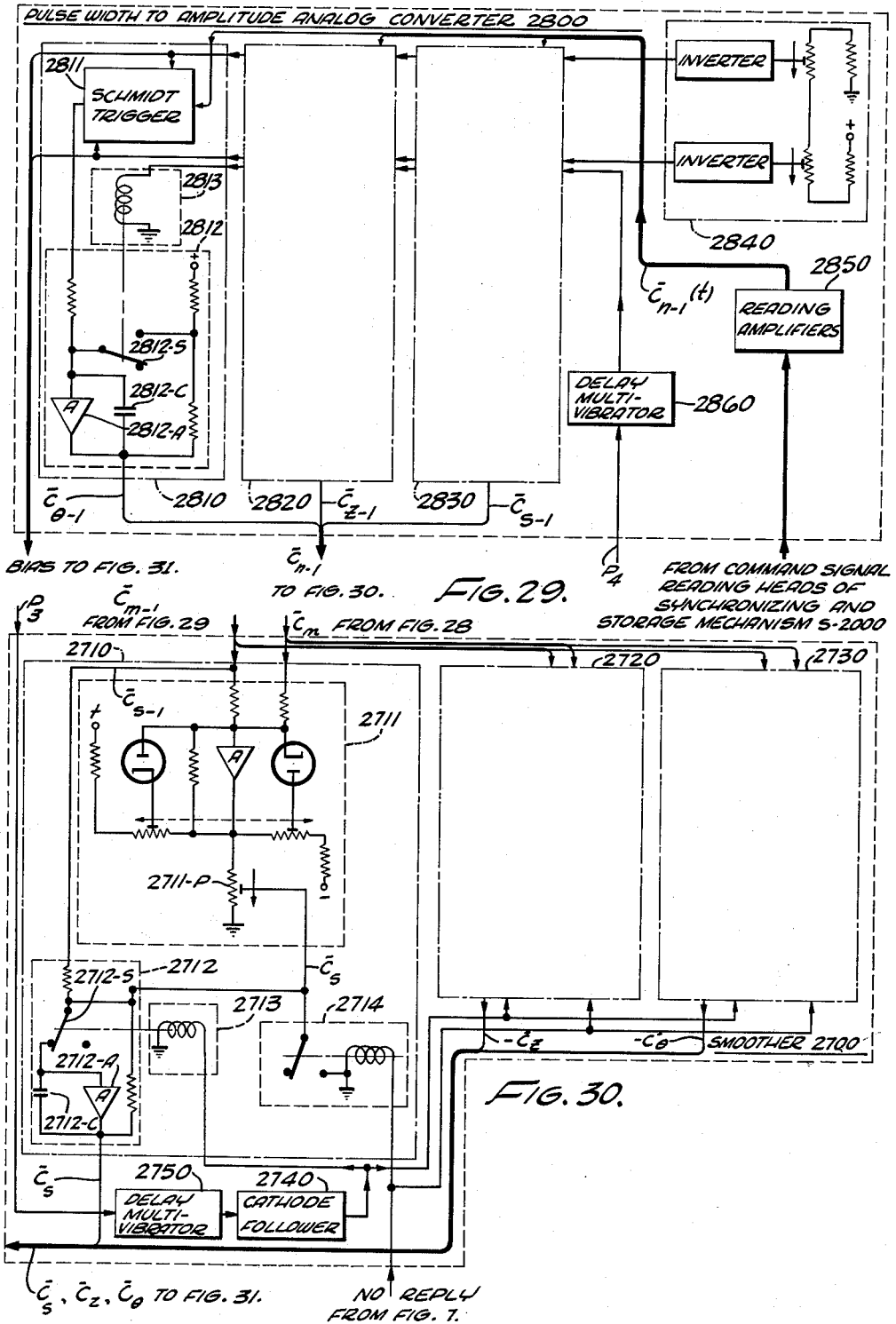
FIG. 29 is a block diagram of a pulse width to amplitude analog converter shown in FIG. 1.
FIG. 30 is a block diagram of a smoother or smoothing circuit shown in the diagram of FIG. 1, which may be employed to average out certain of the command signal errors produced by the system shown in FIG. 1.

*The Pulse Width to Amplitude Analog Converter 2800 Shown in FIG. 29*

The pulse width to amplitude analog converter 2800 shown in FIG. 29 comprises three converter circuits 2810, 2820 and 2830 for converting smoothed pulse width analogs $\overline{C}_{n-1}(t)$ to pulse amplitude analogs $\overline{C}_{n-1}$ of command signals computed during a data interval 3⅓ seconds previous to the data interval corresponding to the computation of error control signals for a current aircraft. In the instant case with the typical cycling of the synchronizing and storage mechanism S–2000, the past smooth command signals designated $\overline{C}_{n-1}$ are generated 3⅓ seconds before current computed command signals which may be designated $C_n$. Each of the converters 2810, 2820 and 2830 which correspond to lateral, altitude and speed control signals respectively contain a Schmidt trigger circuit, for example, such as the Schmidt trigger circuit 2811 shown in the converter 2810. The Schmidt trigger circuit 2811 is biased positively and negatively by a biasing circuit 2840 as are the other Schmidt trigger circuits in the converters 2820 and 2830, not shown. Three read amplifiers 2850 are connected from the read heads of the synchronizing and storage mechanism S–2000 to amplify a positive pulse at the beginning of a reproduction of a pulse width analog. The read heads of the synchronizing and storage mechanism S–2000 then produce a negative pulse at the end of the reproduction of a pulse width analog. The pulses are thus employed to set and reset the Schmidt trigger circuit 2811 whereby a gate output is provided to an integrator circuit 2812, the output of which eventually reaches an amplitude proportional to the gate width impressed upon it. The converters 2820 and 2830 operate similarly to produce past smooth values of the command signals $\overline{C}_{z-1}$ and $\overline{C}_{s-1}$ respectively, the converter 2810 producing the command signal $\overline{C}_{\ell-1}$. Use of the biasing circuit 2440 is also made in connection with the amplitude to pulse width analog converter 2600 shown in FIG. 31 which contain converters very similar to the converters 2810, 2820 and 2830.

A delay multivibrator 2860 is also provided in the pulse width to amplitude analog converter 2800 actuable by a $P_4$ pulse to energize relays in the converters 2810, 2820 and 2830. For example, a relay 2813 in the converter 2810 is employed to close a switch 2812–S in the integrator 2812 to reset the integrator to a level corresponding to a zero width pulse input. The integrator 2812 is entirely conventional with and includes a feedback amplifier 2812–A, which is provided with a feedback capacitor 2812–C.

*The Smoother 2700 Shown in FIG. 30*

The smoother 2700 comprises separate smoothing circuits 2710, 2720 and 2730 for smoothing the current computed value and the passed smooth value of lateral, altitude and speed command signals. All of the smoothing circuits 2710, 2720 and 2730 are identical, thus only the lateral smoothing circuit 2710 is shown in detail. The smoothing circuit 2710 comprises a summing circuit 2711 for summing the current computed value of a lateral command signal, the passed smooth value of a command signal corresponding to one particular aircraft assigned to the air traffic control system shown in FIG. 1. The summing circuit 2711 is provided with a potentiometer 2711–P from which a portion of the sum of the negative current computed value and the positive past smoothed value of command signals are introduced to a second summing circuit 2712. The output of the summing circuit 2712 thus is a fraction of the difference of the current computed value and the past smoothed value. $\overline{C}_{s-1}$ is then added $-\alpha(C_s - \overline{C}_{s-1})$ where $\alpha$ is a constant proportionality determined by the physical position of the potentiometer 2711–P in the summing circuit 2711. The output of the summing circuit 2712 thus is $\overline{C}_s$.

The summing circuit 2712 is provided with an amplifier 2712–A with a feedback capacitor 2712–C. A switch 2712–S is also provided in the summing circuit 2712 and is actuable by a relay 2713 from a cathode follower 2740 through a delay multivibrator 2750 actuable by a $P_3$ pulse.

The conversion of smoothed control signals by the air to ground message converter 2100 for storage and for transmission to the data link and message storage unit 3000 is made following the computation interval and during the shift period of the synchronizing and storage mechanism S–2000. The input signals to the smoother from the pulse width to amplitude to analog converter 2800 will be changing during this interval as the unit establishes past smoothed values $\overline{C}_{n-1}$ from storage in the synchronizing and storage mechanism S–2000 for use by an aircraft during the next preceding data interval. It is necessary therefore for the smoother 2700 to "hold" the current smoothed values $\overline{C}_n$ of command signals from the end of a computation interval through the following shift period. The summing amplifier 2712 of each of the smoothing circuits 2710 is made a holding amplifier simply by means of the relay 2713. The hold gate for the relay 2713 is established by the delay multivibrator 2750 initiated by the timing pulse $P_3$. The delay multivibrator 2750 may, for example, maintain the hold condition for approximately 15 milliseconds in the typical system described herein. This is sufficient to span the interval from the end of computation to the end of the shift period.

An additional operating feature of the smoother 2700 consists of a relay 2714 that is employed to short the factors $-\alpha_n[C_n - \overline{C}_{n-1}]$ to ground. In the event of failure of the data link and message storage unit 3000 to obtain "good data," this is indicated by one bit in the air to ground message register contained in the air to ground message register contained in the air to ground message converter 2100, i.e. no reply received or yes reply received. This no reply received report causes the relay 2714 to be energized to make the factors $-\alpha_n[C_n - \overline{C}_{n-1}]$ equal to zero in all channels. The new smooth value of the control signal then remains the same as the previously computed value for a "poor data" report from the data link, or a no reply received report. Obviously the inputs to the smoother 2700 are from the command signal selector 1700 which provides the current computed values of control signals $C_n$ and from the pulse width to analog converter 2800 which provides the negative passed smoothed values of command signals. The smoother 2700 also receives the no reply report from the air to ground message converter 2100 and produces current smoothed values of command signals designated as $\overline{C}_n$.

Figure 31:
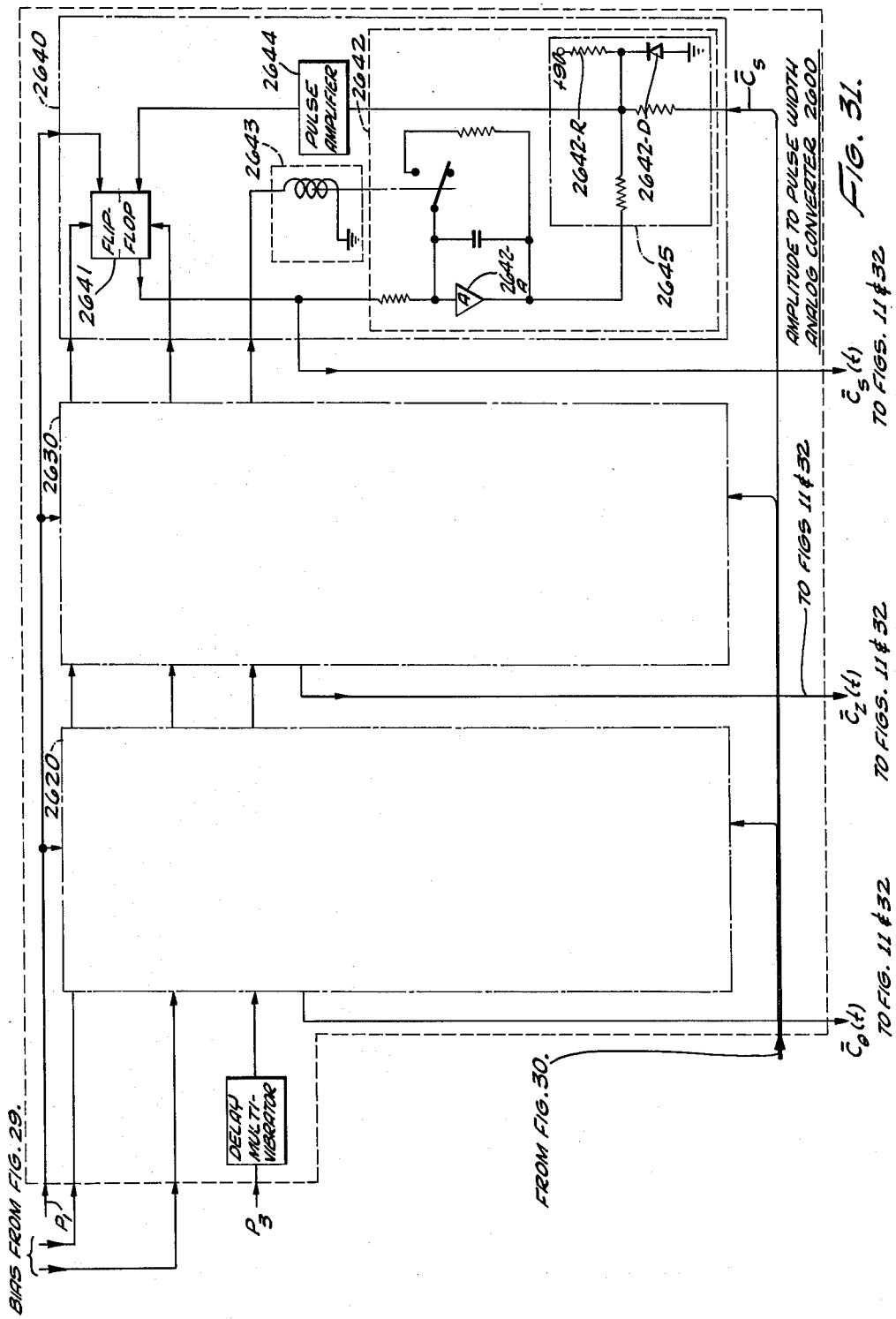
FIG. 31 is a block diagram of an amplitude to pulse width analog converter shown in FIG. 1 which may be employed to convert averaged or smoothed error control signals to a pulse width code.

*The Amplitude to Pulse Width Analog Converter 2600 Shown in FIG. 31*

The amplitude to pulse width analog converter 2600 comprises three individual converters 2620, 2630 and 2640. The converters 2620, 2630 and 2640 are employed to convert the current smoothed values of lateral, altitude and speed control signals in amplitude analogs to pulse width analogs, respectively. All the converters 2620, 2630 and 2640 are identical. The converter 2640 is provided with a flip-flop 2641, an integrator 2642, a zeroing relay 2643 and a pulse amplifier 2644. The flip-flop 2641 and the flip-flops on the converters 2620 and 2630 are clamped to typically −10 volts and −40 volts levels by the bias supplied from the biasing circuit 2840 in the pulse width to amplitude analog converter 2800 shown in FIG. 29. A compensating input to each integrating amplifier connected to a +90 volt reference serves as an offset to prevent the amplifier from integrating when the flip-flop gate is at the −10 volt or high level.

The integrator 2642 is provided with an amplifier 2642–A, the bias of which is controlled through a resistor 2642–R which is connected from a positive 90 volt source through a diode 2642–D to ground, the diode 2642–D also being poled to be conductive in the opposite direction. When the flip-flops in the converters 2620, 2630 and 2640 are set to the low level of −40 volts the integrating time constant will result in a ramp of, for example, 15 volts per millisecond for the speed and altitude converters 2640 and 2630 respectively; and 13.5 volts per millisecond for the lateral control command signal developed by the converter 2620.

Amplitude to pulse width analog conversion is initiated by a $P_1$ pulse which sets the flip-flops in the converters 2620, 2630 and 2640 to the low level of −40 volts. Respective integrating amplifiers then begin integrating at the rate specified above. When the amplifiers have integrated through a range equivalent to the amplitude of the corresponding command signal impressed thereon from the smoother 2700, a coincidence circuit consisting of two resistors clamped to ground by a diode indicated at 2645 in the converter 2640 generate a coincidence pulse. This pulse is amplified respectively by the pulse amplifier 2644 to in turn reset the flip-flop 2641. The output of the flip-flop 2641 and those included in the converters 2620 and 2630 thus are rectangular gates whose leading edges are established by $P_1$ and whose trailing edges are determined by the amplitude of the current smoothed value of the respective command signals produced by the smoother 2700.

The positive plate of the flip-flops in the converters 2620, 2630 and 2640 are employed to obtain a positive gate for driving corresponding recording amplifiers in the recording control circuit 2500. The positive going gates are also impressed on the ground to air message converter 2900 which is employed to convert the pulse width analogs of corresponding control signals to digital codes.

Figure 32:
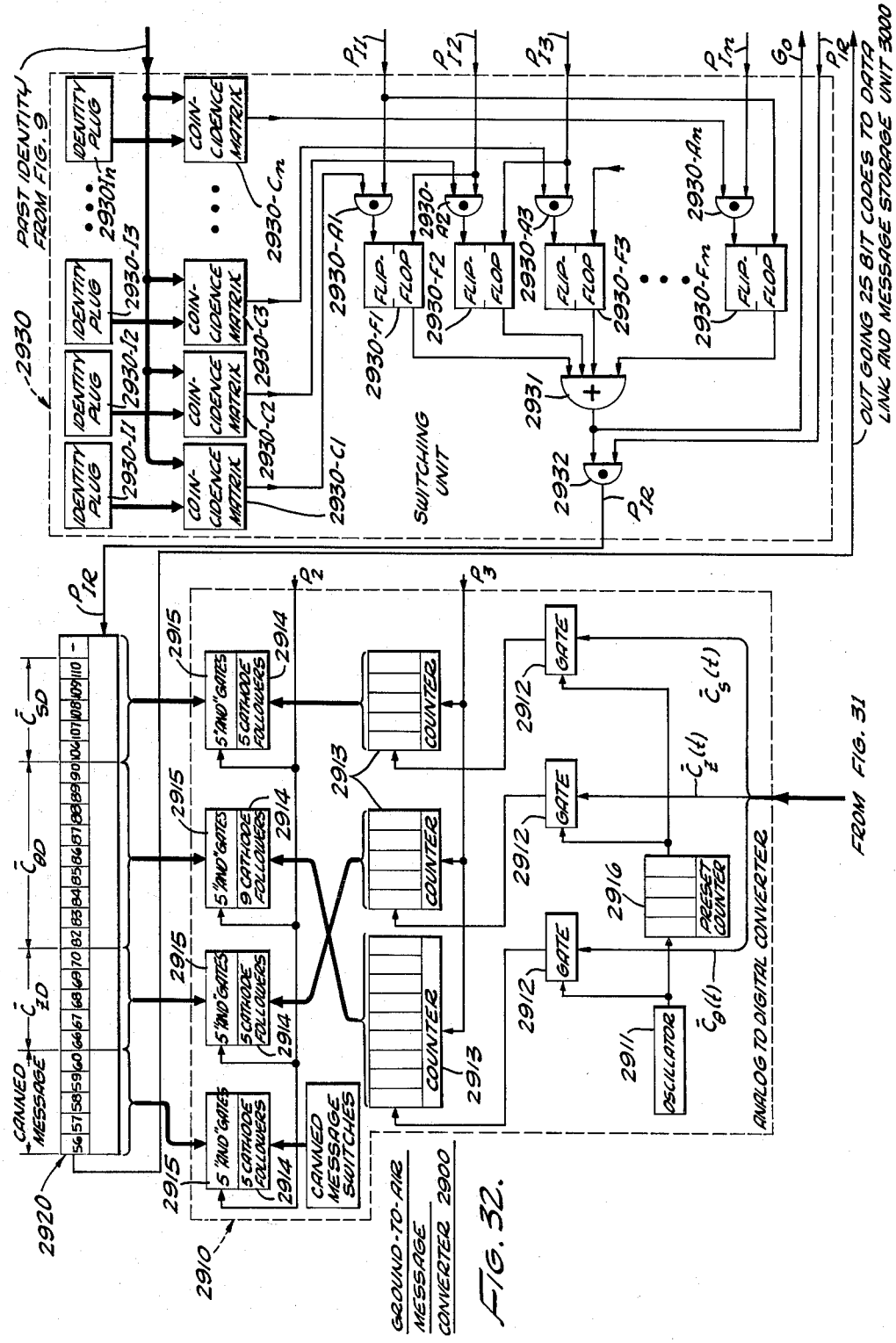
FIG. 32 is a diagrammatic view of a ground to air message converter for converting the error control signals to a digital pulse code for transmission to the aircraft as shown in FIG. 1.

The Ground to Air Message Converter 2900 Shown in FIG. 32

The ground to air message converter 2900 comprises a pulse width analog-to-digital converter 2910, an outgoing message shift register 2920 and a switching unit 2930 to shift out the information in the shift register 2920 at an appropriate time. The pulse width analog-to-digital converter 2910 is conventional wherein an oscillator 2911 is appropriately gated through a preset counter 2916 and through a plurality of gates 2912 to a plurality of counters 2913. The output of the counters 2913 are introduced to a number of cathode followers 2914 corresponding to each bit in each of four positions in the shift register 2920, viz a canned message position, an altitude command signal position $\overline{C}_{zD}$, a lateral control command signal position $\overline{C}_{\phi D}$ and a speed command signal position $\overline{C}_{sD}$. The outputs of the cathode followers are passed through corresponding "and" gates 2915 for each of the canned message and command signal positions in the shift register 2920, the "and" gates 2915 being operated by a $P_2$ synchronizing pulse.

Messages are shifted out of the ground to air message shift register 2920 by shift pulses $P_{IR}$ passed by an "and" gate 2932 in a shift pulse control circuit 2930 shown in FIG. 32. Past identity from the past identity shift register 2321 shown in FIG. 9 is compared with the identity of every aircraft in the system in a plurality of coincidence matrices 2930-C. Identities of each aircraft in the system are provided with identity plugs 2930-I. The identity plugs 2930-I and the coincidence matrices 2930-C may be identical to the wave-off identity selector plug 2511 and its female panel connector 2512 and the ten "and" gates 2513 and the single "and" gate 2514 shown in the wave-off control circuit 2510 of FIG. 11a. Each of the coincidence matrices 2930-C thus provide an output gate when the past identity corresponds to a particular plug identity 2930-I to which a particular coincidence matrix 2930-C may be connected.

Past identity is employed in the identity comparison performed by the shift pulse control circuit 2930 because the command signals and canned message corresponding to a particular aircraft are not shifted into the ground to air message shift register 2930 until a $P_2$ pulse is impressed upon the "and" gates 2515 in the circuit 2910.

Since a $P_2$ pulse is not produced until after the internal shift period of the synchronizing and storage mechanism S–2000, the current identity of an aircraft then must be changed to a past identity and the identity of another aircraft must be shifted into the current identity shift register 2314 of FIG. 9 whereby error control signals may be computed. While the error control signals of a current aircraft are being computed, the command signals and canned message of an aircraft having a past identity are then shifted into the message storage device of the data link and message storage unit 3000 by the shift pulse control circuit 2930.

Shift pulses are actually passed by the "and" gate 2932 when the output of an "or" gate 2931 is positive. The "or" gate is provided with inputs from a plurality of flip-flops 2930–F, each of the flip-flops 2930–F corresponding to a particular one of the coincidence matrices 2930–C. The flip-flops 2930–F are set by corresponding "and" gates 2930–A which have input pulses $P_I$ and an input gate from a corresponding coincidence matrix 2930–C. The gates $P_I$ are received when during a magnetic head scanning period of the recording portion of the tape or drum employed in the message storage device of the data link and message storage unit 3000. Thus the pulses $P_I$ are identity gates corresponding to a particular aircraft in the system, a reserved recording space of which is provided on the recording tape or record of the message storage device contained in the data link and message storage unit 3000. All the flip-flops 2930–F are reset by next succeeding $P_I$ gates. Thus all the flip-flops provide a negative output to the "or" gate 2931 until one of the coincidence matrices 2930–C provides a gate at a time when a corresponding one of the gates $P_I$ is received.

The $P_I$ gates, $P_{I1}$, $P_{I2}$ and $P_{I3}$ may be representative of adjacent recording positions of three particular aircraft on a magnetic tape or drum. Thus when a $P_{I2}$ gate is received the flip-flop 2930–F1 should be reset since the $P_{I1}$ gate no longer will be present and the recording space in the message storage device of the data link and message storage unit 3000 will no longer correspond to the identity of the identity plug 2930–I1, but to the identity provided to the coincidence matrix 2930–C2 by the identity plug 2930–I2. This occurs successively until the last flip-flop 2930–F$n$ is set by a $P_{In}$ gate and a gate from the coincidence matrix 2930–C$n$ through an "and" gate 2930–A$n$. The last flip-flop 2930–F$n$ is then reset by the $P_{I1}$ gate since the aircraft corresponding to the $P_{I1}$ gate will correspond to a place on the drum or recording tape of the message storage device contained in the data link and message storage unit 3000 adjacent the space provided for recording outgoing command signals and canned messages corresponding to an aircraft having a $P_{In}$ gate. The output of the "or" gate 2931 is impressed upon the message storage device of the data link and message storage unit 3000 as a $G_0$ gate to indicate that message is actually being recorded in the message storage device.

FIGS. 33 through and including 36 are illustrative of airborne instrumentation that may be employed with the air traffic control system shown in FIG. 1. If the control system of FIG. 1 is employed simply to direct a pilot to a landing system entry gate, for example, as a GCA landing system is employed to direct an aircraft on an ideal glidepath to a landing strip, the instrumentation shown in FIGS. 33, 34 and 35 may be employed. An indicator 33A is shown in FIG. 33 which is a cross-pointer meter. This meter is presently in use and employed to indicate simultaneously heading and altitude errors of an aircraft. The heading error is indicated as an angle between a vertical crosshair 33B and a vertical arm 33C pivoted from the top of the meter. Dotted lines 33D are employed to indicate the arm 33C in each of two positions representative of two heading errors, respectively, the sense of which may be arbitrarily selected. An arm 33E is also pivoted from the left side of the meter to indicate low or high altitude errors in positions 33F. The meter may be wired to indicate low altitude in one position and high in the other. The respective position of the arm 33E may also be chosen arbitrarily. When the arm 33C is on the crosshair 33B, the aircraft is on course. Similarly, a horizontal crosshair 33G is provided so that when the arm 33E is in the 33G position shown in FIG. 33, the aircraft pilot may be informed that his aircraft is at the ideal altitude for his particular selected time-to-arrival.

A rate of turn or rudder displacement error ΔR is indicated in FIG. 34 where a rudder displacement meter 34A is shown comprising a pair of vertical index lines 34B and a movable index line 34C. The meter 34A is simply a bank and turn indicator.

FIG. 35 is an elevation view of a throttle error meter 35A which is also provided with index lines 35B and a pointer needle 35C to indicate how much early or late the aircraft is with respect to its assigned time-to-arrival schedule.

In the guidance of an aircraft, the pilot thereof will control the heading, rate of descent, and speed manually to reduce all the errors indicated by the cross-pointer meter and the throttle meter to zero. The aircraft will then be grounded controlled, or carrier controlled, effectively through the pilot to fly to or on the ideal descent cone.

Alternatively, an aircraft may be automatically controlled by the system of FIG. 1 by means of aileron, elevator, throttle and rudder servos and function generators 36A, 36B, 36C, and 36D as shown in FIG. 36. In order for the rudder servo and function generator to cause an aircraft A as shown in FIG. 36 to turn at a proper rate dependent upon its air speed and lateral control signal $C_\theta$ an air speed computer is employed to introduce a velocity signal V into the rudder servo and function generator 36D. The altitude command signal $C_z$ is then impressed upon the elevator servo and function generator 36B and the speed command signal $C_s$ is impressed upon the throttle servo and function generator 36C.

It is thus evident that the air traffic control system of the present invention provides means for reducing the amount of equipment necessary to guide a relatively large number of aircraft to and through a landing system entry gate. Namely, the control system of FIG. 1 by providing the synchronizing and mechanism S-2000 and means for driving the storage mechanism therein to recurrently reproduce the identity of aircraft acquired by the system at a rate approximately equal to $C/R$ to initiate the computation of error signals periodically whereby the use of the guidance unit 1000 may be made on a time shared basis for all aircraft acquired by the system. In this case C represents the capacity of the system and $1/R$ represents a data interval.

The different lateral controls employed in the guidance of aircraft in its particular guidance phases also permits the elimination of additional coordinate translation computer for translating the coordinates of an aircraft with respect to the landing system entry gate to coordinates with respect to a turning circle to which the aircraft may be directed tangentially. The method of guiding an aircraft directly toward the entry gate E around the perimeter of the approach zone Z and directly toward the landing station H as the aircraft passes through the entry gate E, has the additional advantage particularly in the first step of guidance of an aircraft in that an aircraft is guided directly toward the entry gate to minimize fuel consumption. The last step in the method of lateral control also provides means to permit discontinuities from interrupting aircraft guidance as an aircraft passes through the entry gate E.

The command signal selector 1700 also provides novel phase control switching particularly from the $C_{\theta 1}$ command signal of the phase I lateral control computer 1800 to the $C_{\theta 2}$ command signal of the phase II lateral control computer 1500. Switching is actually accomplished from $C_{\theta 1}$ to $C_{\theta 2}$ on the condition that $C_{\theta 2}=0$. Thus the heading difference signal $(\psi_p{}^* - \psi_{ah})$ is always larger than the range difference signal $(R_{ep}{}^* - R_{ea})$ and hence an aircraft is always directed around the perimeter of the approach zone Z to the entry gate E in the shortest possible time, when the $C_{\theta 2}$ command signal is channeled to an aircraft after it has reached zero.

The first step in the radial guidance step of the present invention saves fuel in that an aircraft is not directed along an ideal course according to ideal coordinates but is guided directly toward the entry gate E.

According to the preferred lateral control method of the present invention wherein a heading error control signal is transformed into a bank angle, the invention has numerous other advantages. In particular the aerodynamic servo utilizing a heading error control signal for reducing that control signal to zero, the servo is unconditionally stable.

The lateral control method of the invention also provides a $C_{\theta 2}$ control signal which comprises a heading difference signal and a range difference signal. The heading difference signal causes an aircraft to follow the perimeter of the approach zone Z and the heading difference signal provides a damping factor whereby an aircraft will not oscillate about a line extending around the perimeter of the approach zone Z. In accordance with the phase IIB operation of the phase II lateral control computer 1300, a time difference signal and a constant rate of turn signal is added to the $C_{\theta 2}$ of the phase IIA operation of the lateral control computer 1500. The addition of the time difference signal prevents an aircraft from turning too widely to miss the entry gate E should the constant rate of turn signal be added late to the command signal $C_{\theta 2}$. The time difference signal in addition prevents an aircraft from turning too late should its selected time to arrival be somewhat greater than its computed time to arrival.

Fuel conservation is achieved through the use of the altitude control computer 1100 with the speed control computer 1200 which are both tied to the same standard, viz the output plus TTA signal or the output of the TTA generator T-2000. The speed control computer is also provided with novel means to produce a speed control signal $C_s$ in combination with the flight time computer 1300 which produces a computed flight time based on the flight of an aircraft along the descent cone at an ideal velocity, and in addition to the descent cone at a constant altitude should an aircraft be below the descent cone. When an aircraft is on schedule on the cone the speed of the aircraft is naturally optimum since speed control and altitude control are both based on an optimum speed. This is borne out by the fact that the ideal altitude produced from the TTA signal of the TTA generator T-2000 is a function of ideal velocity in that ideal velocity is also a function of the TTA signal. In addition, the computed flight time signal produced by the flight time computer 1300 is an ideal time to arrival based on an optimum velocity. Hence when the TTA signal and computed flight time signal which are introduced to the speed control computer 1200 are equal, an aircraft must be traveling at an optimum velocity for maximum range and minimum fuel.

The smoother 2700 of the data handling unit 2000 also provides means to prevent an aircraft from being instantaneously misguided upon the computation of one or two large erroneous random signals.

It is also seen that a novel assignment circuit is provided in the assignment control circuit 2400 wherein an aircraft is entered into the acquired identity shift register of the assignment control circuit 2400 and from which assignment is automatically made. The assignment control circuit 2400 in addition provides means for assigning priority aircraft and evicting non-priority aircraft. In this regard a special eviction circuit and eviction control circuit are provided in the recording control circuit 2500. The assignment control circuit 2400 also incorporates means for reassigning aircraft in the event a landing system is disabled. Aircraft are accordingly assigned to advance schedules in order to expedite the landing process of all.

While certain embodiments of the invention have been shown in detail, it will be apparent to those skilled in the art that changes may be made in the method and mode of operation and the forms of apparatus disclosed without departing from the spirit of the invention, and that certain features of the invention may be sometimes used without a corresponding use of other features.

We claim:

1. In an air traffic control system for directing aircraft downwardly along an ideal glidepath through a landing system entry gate, the method of controlling the speed of an aircraft to guide it through the entry gate at a selected time of arrival, said method comprising the steps of: deriving a first signal proportional to the entry gate time to arrival of the aircraft flying a predetermined path to and along the ideal glidepath at a velocity that is a fixed function of the altitude of the aircraft, deriving a second signal proportional to a selected time to arrival of the aircraft, and determining the difference between said first and second signals.

2. In an air traffic control system for directing aircraft downwardly along an ideal glidepath through a landing system entry gate, the method of controlling the speed of an aircraft to guide it through the entry gate at a selected time of arrival, said method comprising the steps of: transmitting electromagnetic waves toward the aircraft from a relatively fixed station, receiving electromagnetic waves reflected from said aircraft, determining the position of the aircraft from said reflected waves, deriving a first signal proportional to the entry gate time to arrival of the aircraft as a function of the position of the aircraft, deriving a second signal proportional to a selected time to arrival of the aircraft, determining the difference between said first and second signals, and communicating said difference to the aircraft from said fixed station for effecting a change in the speed of the aircraft to reduce said difference to zero.

3. In an air traffic control system for directing aircraft downwardly along an ideal descent cone through a landing system entry gate, the method of controlling the speed of an aircraft to guide it through the entry gate at a selected time of arrival, said method comprising the steps of: deriving a first signal proportional to the time to arrival of the aircraft at the descent cone, deriving a second signal proportional to the time to arrival of the aircraft at the entry gate after the aircraft has reached the descent cone, adding said first and second signals together to form a third signal, deriving a fourth signal proportional to a selected entry gate time to arrival of the aircraft, determining the difference between said third and fourth signals, and changing the speed of the aircraft to reduce said difference to zero.

4. In an air traffic control system for directing an aircraft downwardly along an ideal descent cone through a landing system entry gate, the method of controlling the altitude of the aircraft, said method comprising the steps of: transmitting electromagnetic waves toward the aircraft from a relatively fixed station, receiving electromagnetic waves reflected from said aircraft, determining the position of the aircraft from said reflected waves, deriving a first signal substantially proportional to the entry gate time to arrival of the aircraft, generating a second signal in response to said first signal, said second signal representing the ideal cone altitude of the aircraft for its particular entry gate time to arrival, deriving a third signal proportional to the actual altitude of the aircraft, comparing said second and third signals, and communicating the results of said comparison to the aircraft for effecting a change in the altitude of the aircraft to cause the aircraft to fly along the surface of the descent cone.

5. A method of controlling the vertical descent of a plurality of aircraft along an ideal glidepath to a landing system entry gate, said method comprising the steps of: transmitting electromagnetic waves toward the aircraft from a relatively fixed station, receiving electromagnetic waves reflected from said aircraft, determining the position of the aircraft from said reflected waves, generating a first signal proportional to a selected entry gate time to arrival of an aircraft, generating a second signal in response to said first signal, said second signal being representative of the ideal altitude of said aircraft at its particular time to arrival, deriving a third signal proportional to the actual altitude of said aircraft, comparing said second and third signals, deriving a fourth signal proportional to the entry gate time to arrival of said aircraft as a function of the position of said aircraft, comparing said first and fourth signals, and communicating the results of each of said comparisons to said aircraft.

6. In an air traffic control system for directing a plurality of aircraft to and through a landing system entry gate disposed approximately at one point on the perimeter of an approach zone and spaced from a landing station contained therein, the aircraft guidance method comprising the steps of: transmitting electromagnetic waves toward the aircraft from a relatively fixed station, receiving electromagnetic waves reflected from said aircraft, determining the position of the aircraft from said reflected waves, deriving a phase I error control signal proportional to the difference between the heading and bearing of an aircraft with respect to a line passing through the entry gate; deriving a phase II error control signal proportional to the difference between the heading of said aircraft and a perimetric heading tangent to the perimeter of the approach zone, said phase II error control signal also being proportional to the difference between the range of said aircraft from the entry gate and the range of the perimeter of the approach zone from the entry gate at the bearing of said aircraft; deriving a phase III error control signal proportional to the difference between the heading and bearing of said aircraft with respect to the landing station; communicating said phase I error control signal to said aircraft while said aircraft is outside the approach zone; communicating said phase II error control signal after said aircraft has approximately reached the perimeter of the approach zone; and communicating said phase III error control signal as said aircraft passes through the entry gate.

7. In an air traffic control system having the capacity C and an error signal computation rate R, a data handling unit for periodically producing predetermined and coded aircraft identities to initiate the computation of command signals, whereby aircraft having the identities may be continually guided to and through a landing system entry gate, said unit comprising: a mechanism for storing the coded identity of an aircraft acquired by the system, and means for recurrently reproducing said recorded identity from said mechanism at a rate approximately proportional to $C/R$.

8. In an air traffic control system for continually guiding a plurality of aircraft to and through a landing system entry gate during successive command signal computation intervals, said entry gate being disposed approximately at one point on the perimeter of an approach zone and spaced from a landing station contained therein, the combination comprising: a guidance unit for developing a plurality of error control signals to guide aircraft acquired by said system, a command signal selector included in said guidance unit to pass only selected ones of said error control signals to an acquired aircraft, a switch code shift register for temporarily storing a switch code corresponding to a particular one of said acquired aircraft to operate said command signal selector during a single command signal computation interval, a storage mechanism, means for recording said switch code of said one aircraft in said storage mechanism during said command signal computation interval, means for periodically reproducing said switch code to reset said switch code shift register accordingly, whereby suitable error control signals may be continually recomputed, and selector means included in said command signal selector for changing the switch code in said switch code shift register in response to changes of conditions in said system.

9. The invention as defined in claim 8, wherein said guidance unit additionally includes the following: a phase I lateral control computer for producing phase I command signals to guide said aircraft directly toward said entry gate, a phase II lateral control computer for producing phase II command signals to guide said aircraft around the perimeter of said approach zone to said entry gate, and a phase III lateral control computer for producing a phase III command signal to guide said aircraft directly toward said landing station; said selector means including means for changing said switch code shift register to cause said command signal selector to pass only said phase I command signal until a guided aircraft arrives approximately at the perimeter of said approach zone, to pass only said phase II command signal until said guided aircraft arrives approximately at said entry gate, and to pass only said phase III command signal as said guided aircraft passes through said entry gate.

10. The invention as defined in claim 8, wherein said guidance unit additionally includes a speed control computer, an altitude control computer for controlling the descent of said guided aircraft according to an ideal glidepath, a cone decision gating circuit included in said command signal selector for disabling said speed control computer when said aircraft is above said ideal glidepath and for disabling said altitude control computer when said aircraft is below said ideal glidepath, said cone decision gating circuit also being conditioned to change the switch code in said switch code shift register to correspond to the position of said aircraft relative to said ideal glidepath.

11. In an air traffic control system for continually guiding a plurality of aircraft to and through a landing system entry gate during successive command signal computation intervals, said system including a landing station disposed approximately midway from the sides of an elongated heart-shaped approach zone having two tangentially curved portions at one end forming an inwardly extending perimetric cusp, said entry gate being disposed approximately at said cusp, the combination comprising: a guidance unit for developing a plurality of error control signals to guide aircraft acquired by said system, a command signal selector included in said guidance unit to pass only selected ones of said error control signals to an acquired aircraft, a switch code shift register for temporarily storing a switch code corresponding to a particular one of said acquired aircraft to operate said command signal selector during a single error signal computation interval, a current identity shift register for temporarily storing a coded identity corresponding to said switch code and said one aircraft during the same error signal computation interval, a storage mechanism, means for recording the switch code with the coded identity of said one aircraft in said storage mechanism during said error signal computation interval, means for periodically reproducing said switch code and said coded identity to reset said shift registers accordingly, whereby the computation of suitable error control signals may be continually initiated, and selector means included in said command signal selector for changing the switch code in said switch code shift register in response to changes of aircraft flight conditions.

12. The invention as defined in claim 11, wherein said guidance unit additionally includes the following: a phase I lateral control computer for producing a phase I command signal to guide said aircraft directly toward said entry gate, said phase I command signal being proportional to a bank angle error equal to $K_1(\theta_{ea}-\psi_{ah}^{-1})$ where $K_1$ is a constant of proportionality $\theta_{ea}$ is the angular position of said aircraft with respect to a line through said entry gate and said landing station, and $\psi_{ah}^{-1}$ is 180 degrees from the heading of said aircraft;

a phase II lateral control computer for producing a phase IIA command signal and a phase IIB command signal to guide said aircraft around the perimeter of said approach zone to said entry gate, said phase IIA command signal being proportional to $K_2(\psi_p^*-\psi_{ah})+K_3(R_{ep}^*-R_{ea})$ where $K_2$ and $K_3$ are constants $\psi_p^*$ is the ideal heading of said aircraft around the perimeter of said approach zone, $\psi_{ah}$ is the actual heading of said aircraft, $R_{ep}^*$ is the ideal range of said aircraft for its particular angular position with respect to a line through said entry gate and said landing station, and $R_{ea}$ is the actual range of said aircraft from said entry gate, said phase IIB command signal being proportional to $K_2(\psi_p^*-\psi_{ah})+K_3(R_{ep}^*-R_{ea})+K_4(TTA-T_{ae})+\beta$, where TTA is the selected time to arrival of said aircraft at the entry gate, $T_{ae}$ is the time to arrival of said aircraft at said entry gate based on a predetermined flight path and velocity, $\beta$ is a constant rate of turn signal, and $K_4$ is a constant;

a phase III lateral control computer for producing a phase III command signal to guide said aircraft directly toward said landing station, said phase III command signal being proportional to $K_5(\psi_{ah}^{-1}+\theta_{ha})$; said selector means including means for changing said switch code shift register to cause said command signal selector to pass only said phase I command signal until a guided aircraft arrives approximately at the perimeter of said approach zone, to pass only said phase IIA command signal until said guided aircraft arrives approximately at the tangentially curved portions of the perimeter of said approach zone, to pass only said phase IIB command signal until said guided aircraft approximately arrives at said entry gate, and to pass only said phase III command signal as said guided aircraft passes through said entry gate.

13. In an air traffic control system for directing aircraft downwardly along a predetermined descent cone and around an approach zone to a landing system entry gate situated at a point on the perimeter thereof, a lateral control computer for guiding an aircraft around the approach zone, said lateral control computer comprising: means for generating a first signal proportional to the angular position of said aircraft with respect to a reference line through said entry gate, means for generating a second signal proportional to the ideal heading of said aircraft in response to said first signal, means for generating a third signal proportional to the actual heading of said aircraft, means for generating a heading difference signal proportional to the difference between said third signal and said second signal, means for generating a fourth signal proportional to the altitude of said aircraft, means for generating a fifth signal proportional to the ideal range of said aircraft for its particular altitude, means for generating a sixth signal proportional to the actual range of said aircraft from the entry gate, means for generating a range difference signal proportional to the difference between said fifth and sixth signals, and means for combining said heading and range difference signals to produce an error control signal to guide said aircraft around the approach zone on the perimeter thereof.

14. The invention as defined in claim 13, wherein the following are additionally provided: a first time-to-arrival generator for producing a first time-to-arrival signal proportional to a selected entry gate time to arrival, a second time-to-arrival generator for producing a second time-to-arrival signal proportional to the entry gate time to arrival of said aircraft as a function of the altitude of said aircraft, means for comparing said first time-to-arrival signal and said second time-to-arrival signal to derive a time difference signal, means for producing a constant rate of turn signal and means for combining said time difference signal and said constant rate of turn signal with said heading and range difference signals when the bearing of said aircraft with respect to the entry gate falls within a predetermined range of magnitude.

15. The invention as defined in claim 14, wherein said second time-to-arrival generator comprises: means for producing a velocity signal proportional to the ideal velocity of said aircraft at its particular altitude, means responsive to the ratio of said range difference signal to said velocity signal for computing a third time-to-arrival signal proportional to the time to arrival of said aircraft at said descent cone, a function generator for producing an entry gate time to arrival of an aircraft as a function of range on said descent cone at an altitude equal to that of said aircraft, first switch means for selectively introducing said sixth signal to said function generator when said aircraft is on said descent cone and for introducing said fifth signal to said function generator when said aircraft is not on said descent cone, an adder responsive to the output signal of said function generator, and second switch means for introducing said third time-to-arrival signal to said adder only when said aircraft is below said descent cone.

16. In an air traffic control system for guiding aircraft to an entry gate of a landing station situated at a point on the perimeter of an approach zone, the combination comprising: means for producing a first error control signal to guide an aircraft toward the entry gate, means for producing a second error control signal to guide said aircraft around the perimeter of the approach zone, means for producing a third error control signal to guide said aircraft through the entry gate toward the landing station, and selector means for selectively channeling only one of said error control signals to said aircraft, said selector means including means to channel said second signal to said aircraft after said first signal, and means to channel said third signal to said aircraft after said second signal and at a time when said aircraft has a predetermined time to arrival to the entry gate.

17. In an air traffic control system for guiding aircraft to an entry gate of a landing station situated at a point on the perimeter of an approach zone, the combination comprising: first means for producing a first error control signal to guide an aircraft toward the entry gate, second means for producing a second error control signal to guide said aircraft around the perimeter of the approach zone, and selector means for selectively channeling only one of said error control signals to said aircraft, said selector means including switch means to channel said second error control signal to said aircraft after said first signal, and means for operating said switch means when said second error control signal is equal to zero.

18. In an air traffic control system wherein an aircraft is directed along an ideal descent cone and around the perimeter of an approach zone to a landing system entry gate, a flight time computer for computing the actual entry gate time to arrival of an aircraft flying on a predetermined flight path to and along the descent cone, said flight time computer comprising: means for producing an $R_{ea}$ signal proportional to the range of an aircraft, means for producing a $Z_a$ signal proportional to the actual altitude of said aircraft, means responsive to said $Z_a$ signal for producing an $R_{ec}*$ signal proportional to the range of an aircraft on the descent cone at the particular altitude of said aircraft, means for determining the difference between said $R_{ea}$ and said $R_{ec}*$ to derive a range difference signal, means responsive to said $Z_a$ signal for producing a $V*$ signal proportional to the ideal velocity of said aircraft at its particular altitude, means for computing the ratio of said range difference signal to said $V*$ signal, means for deriving a $T_{ac}$ signal proportional to said ratio and representative of the time to arrival of said aircraft at the descent cone, a $T_{ce}*$ function generator for producing a $T_{ce}*$ signal proportional to the time to arrival of an aircraft on the descent cone at the altitude of said aircraft, first switch means for selectively introducing said $R_{ea}$ signal to said $T_{ce}*$ function generator when said aircraft is on the descent cone and for introducing said $R_{ec}*$ signal to said $T_{ce}*$ function generator when said aircraft is not on the descent cone, an adder responsive to said $T_{ce}*$ signal for producing a $T_{ae}$ signal proportional to the time to arrival of said aircraft at the entry gate, and second switch means for introducing said $T_{ae}$ signal to said adder only when said aircraft is below the descent cone.

19. The invention as defined in claim 18, wherein the following are additionally provided: means for producing a $\theta_{ea}$ signal proportional to the angular position of said aircraft with respect to the entry gate, means responsive to said $\theta_{ea}$ signal for introducing a $T_{pe}$ signal to said adder to correct said $T_{ae}$ signal for the additional time required for said aircraft to proceed around the perimeter of the approach zone, means responsive to said $\theta_{ea}$ signal for producing a $\Delta V_w$ signal representative of a wind velocity correction, means for multiplying said corrected $T_{ae}$ signal by said $\Delta V_w$ signal for producing a $\Delta R_w$ signal representative of a range correction for wind, and means for subtracting said $\Delta R_w$ signal from said $R_{ea}$ signal to correct said $R_{ea}$ signal for wind.

20. In an air traffic control system wherein a plurality of aircraft are directed along an ideal descent cone to a landing system entry gate on different and predetermined entry gate time to arrival schedules, a speed control computer for computing a speed correction for each aircraft acquired by the system, said speed control computer comprising: means for producing a TTA signal proportional to the selected time to arrival of an aircraft, means for producing a $T_{ae}$ signal proportional to the time to arrival of an aircraft flying a predetermined path to and along the descent cone at an ideal velocity and means for determining the difference between said TTA and said $T_{ae}$ signal to derive a speed error control signal.

21. The invention as defined in claim 20, wherein said means for producing said $T_{ae}$ signal comprises: means for producing an $R_{ea}$ signal proportional to the range of an aircraft, means for producing a $Z_a$ signal proportional to the actual altitude of said aircraft, means responsive to said $Z_a$ signal for producing an $R_{ec}*$ signal proportional to the range of an aircraft on the descent cone at the particular altitude of said aircraft, means for determining the difference between said $R_{ea}$ and said $R_{ec}*$ to derive a range difference signal, means responsive to said $Z_a$ signal for producing a $V*$ signal proportional to the ideal velocity of said aircraft at its particular altitude, means for computing the ratio of said range difference signal to said $V*$ signal, means for deriving a $T_{ac}$ signal proportional to said ratio and representative of the time to arrival of said aircraft at the descent cone, a $T_{ce}*$ function generator for producing a $T_{ce}$ signal proportional to the time to arrival of an aircraft on the descent cone at the altitude of said aircraft, first switch means for selectively introducing said $R_{ea}$ signal to said $T_{ce}*$ function generator when said aircraft is on the descent cone and for introducing said $R_{ec}*$ signal to said $T_{ce}*$ function generator when said aircraft is not on the descent cone, an adder responsive to said $T_{ce}*$ signal for producing said $T_{ae}$ signal proportional to the time to arrival of said aircraft at the entry gate, and second switch means for introducing said $T_{ae}$ signal to said adder only when said aircraft is below the descent cone.

22. The invention as defined in claim 17, wherein said second means includes means for deriving a heading difference signal proportional to the difference between the actual and ideal headings of said aircraft, and means for deriving a range difference signal proportional to the difference between the actual and ideal ranges of said aircraft for its particular bearing.

23. A guidance unit for controlling the vertical descent of a plurality of aircraft along an ideal glide-path to a landing system entry gate, said unit comprising: means for generating a first signal proportional to the selected entry gate time to arrival of an aircraft, means for generating a second signal in response to said first signal, said second signal being representative of the ideal altitude of said aircraft at its particular selected time to arrival, means for deriving a third signal proportional to the actual altitude of said aircraft, means for comparing said second and third signal to produce an altitude difference signal, means for deriving a fourth signal proportional to the entry gate time to arrival of said aircraft as a function of the position of said aircraft, means for comparing said first and fourth signals to produce a time difference signal, means for selectively communicating only said altitude difference signal to said aircraft when said aircraft is above said ideal glidepath, means for selectively communicating only said time difference signal to said aircraft when said aircraft is below said ideal glidepath, and means for selectively communicating both of said altitude and time difference signals to said aircraft when said aircraft is on said ideal glidepath.

24. An acquisition circuit for entering the identity of and aircraft in an air traffic control system to be stored therein, said acquisition circuit comprising: an acquired identity shift register, an acquired identity selector plug prewired to set said shift register according to the identity of an aircraft selected to be entered in the system upon the application of a shift pulse to said plug, and means for impressing a shift pulse on said plug.

25. The invention as defined in claim 24, wherein said means is conditioned to operate only upon the reception of a signal representating that no identity is currently stored in said shift register.

26. In an air traffic control system for periodically and continually guiding aircraft to and through a landing system entry gate on predetermined and assigned schedules, said system having a data link and message storage unit responsive to the coded identity of an aircraft for delivering at least one position signal corresponding to the identity of a particular aircraft proportional to the position of the aircraft with respect to a cordinate system fixed in space, said system also having means for computing a $T_{ae}$ entry gate time to arrival signal from the position signal, the $T_{ae}$ signal being employed in the acquisition of an aircraft, an interrogation device comprising: a current identity shift register for temporarily storing the identity of an aircraft being currently guided by the system; an acquired identity shift register for storing the identity of an aircraft to be entered in the system; and an interrogate gate for delivering the identity contained in said current identity shift register to the data link and message storage unit only when an identity is actually contained in said current identity shift register, and for delivering the identity contained in said acquired identity shift register when no identity is contained in said current identity shift register, whereby the data link and message storage unit may be operated to deliver the position signal from which the $T_{ae}$ signal may be computed.

27. In an air traffic control system for periodically and continually guiding aircraft to and through a landing system entry gate on predetermined and assigned schedules, said system having a data link and message storage unit responsive to the coded identity of an aircraft for delivering at least one position signal corresponding to the identity of a particular aircraft proportional to the position of the aircraft with respect to a coordinate system fixed in space, an interrogation device comprising: a current identity shift register for temporarily storing the identity of an aircraft being currently guided by the system; an acquired identity shift register for storing the identity of an acquired aircraft to be entered in the system; means for computing a $T_{ae}$ entry gate time to arrival signal from the position signal, the $T_{ae}$ signal being employed in the acquisition of an aircraft, and an interrogate gate for delivering the identity contained in said current identity shift register to the data link and message storage unit only when an identity is actually contained in said current identity shift register, and for delivering the identity contained in said acquired identity shift register when no identity is contained in said current identity shift register, whereby the data link and message storage unit may be operated to deliver the position signal from which the $T_{ae}$ signal may be computed.

28. In an air traffic control system having a mechanism for periodically storing and reproducing coded identities of an aircraft for periodically initiating the computation of error control signals for the guidance of a particular aircraft to and through a landing system entry gate, the identity of which aircraft is being currently reproduced, said system also having an acquired identity shift register for storing the identity of an aircraft to be entered in the storage mechanism, an assignment circuit comprising: means for initiating an assignment cycle at approxmiately the time that the identity of an aircraft closest to the entry gate is reproduced by the storage mechanism, means for producing an ideal entry gate time to arrival signal proportional to the selected entry gate time to arrival of an aircraft on a current assigned schedule, means for producing a $T_{ae}$ signal proportional to a computed value of the entry gate time to arrival of an aircraft to be acquired by the system as a function of the spacial position of the aircraft to be acquired, and means for shifting the identity contained in the acquired identity shift register to the storage mechanism when said ideal time to arrival signal is approximately equal to said $T_{ae}$ signal.

29. The invention as defined in claim 28, wherein said last named means includes means for shifting the identity of a non-priority aircraft, the identity of which is currently being reproduced by the storage mechanism, into the acquired identity shift register when the identity originally contained in the acquired identity shift register corresponds to a priority aircraft.

30. The invention as defined in claim 28, wherein additional means are provided to render said last named means operative only when the current schedule is not reserved and not occupied or when the aircraft to be acquired is a priority aircraft and the aircraft assigned to the current schedule is not a priority aircraft.

31. In an air traffic control system having a mechanism to store and reproduce coded identities of aircraft guided to and through a landing system entry gate by the control system, an eviction circuit for initiating the removal of an aircraft identity, said circuit comprising: a current identity shift register for temporarily storing the identity of an aircraft currently being reproduced by the storage mechanism; gate means for shifting the identity in said current identity shift register back into the storage mechanism; manually operable switch means for evicting an aircraft; an assignment circuit for introducing the identity of an aircraft to be acquired by the system; means for producing a TTA signal proportional to the selected entry gate time to arrival of each aircraft assigned to a time to arrival schedule by the system; means for producing a reference signal proportional to zero entry gate time to arrival; means for rendering said gate means inoperative when said switch means is actuated; means for rendering said gate means inoperative when said assignment circuit is actuated; and means for rendering said gate means inoperative when said reference signal exceeds said TTA signal.

32. In an air traffic control system having a synchronizing and storage mechanism for periodically initiating the computation of attitude error control signals to guide a plurality of aircraft to and through a landing system entry gate, said synchronizing and storage mechanism being provided with means to reproduce the current identity of an aircraft, the error signals of which are currently being computed, an eviction control circuit for evicting an aircraft from the system, said eviction control circuit comprising: a prewired eviction identity selector plug for producing a selected coded identity of an aircraft selected to be evicted, and an identity coincidence circuit for producing an eviction signal when said selected identity coincides with the current identity reproduced from the synchronizing and storage mechanism.

33. In an air traffic control system for guiding a plurality of aircraft to and through a landing system entry gate on predetermined and assigned entry gate time-to-arrival schedules, a device for reassigning aircraft to earlier schedules, said device comprising: a mechanism for storing and reproducing the coded identities of aircraft guided by the system, gate means for recording the identity of an aircraft in an advance schedule position in said storage mechanism, switch means producing an S signal to initiate a reassignment cycle, means for producing a $TTA_{reset}$ signal approximately when the reproduction cycle of said storage mechanism in producing all aircraft identities is started, means for producing a $O'_{n-1}$ signal representative of the fact that the next earlier schedule is unoccupied, means for producing a $P_r$ signal representative of the fact that a priority aircraft is assigned to a current schedule, means for producing a $R'_{n-1}$ signal representative of the fact that the next earlier schedule is not reserved, means for producing a $O'_{n-2}$ signal representative of the fact that the second earlier schedule is unoccupied and means for operating said gate means when the following logical equation is true:

$$(S)(TTA_{reset})(P_r=R'_{n-1}+O'_{n-2})(O_{n-1})$$

34. In an air traffic control system for guiding a plurality of aircraft to and through a landing system entry gate on predetermined and assigned entry gate time-to-arrival schedules, a device for reassigning aircraft to earlier schedules, said device comprising: a mechanism for storing and reproducing the coded identities of aircraft guided by the system, gate means for recording the identity of an aircraft in an advance schedule position in said storage mechanism, means for producing $R_n$ signal representative of the fact that a current schedule is reserved, means for producing an $O'_{n-1}$ signal representative of the fact that the next earlier schedule is unoccupied, means for producing a synchronizing signal P each time an identity is reproduced by the said storage mechanism and means for operating said gate means when the following logical equation is true:

$$(R_n)(O'_{n-1})(P)$$

35. In an air traffic control system, a lateral control computer for guiding an aircraft directly toward a landing system entry gate, said computer comprising: means for deriving a heading difference signal proportional to the heading error of the aircraft; means for deriving a time difference signal proportional to a time-to-arrival error including the difference between the ideal scheduled time to arrival of said aircraft and a time to arrival computed on the conditions that said aircraft will fly an ideal glidepath on an ideal course at an ideal velocity, all of which are functions of the coordinate position of said aircraft; means for adding said heading and time difference signals to derive a heading command signal; and means for causing the aircraft to turn at a rate proportional to said heading command signal, whereby said heading and time-to-arrival errors may be simultaneously corrected.

36. In an air traffic control system for directing aircraft downwardly and along an ideal glidepath through a landing system entry gate, the method of controlling the speed of an aircraft to guide it through the entry gate at a selected time of arrival, said method comprising the steps of: deriving a first signal proportional to the entry gate time to arrival of the aircraft as a function of the position of the aircraft; deriving a second signal proportional to a selected time to arrival of the aircraft; and changing the speed of the aircraft in a manner to reduce departure of said first signal from said second signal to zero.

37. In an air traffic control system for directing a plurality of aircraft successively to and through a landing system entry gate disposed approximately at one point on the perimeter of an approach zone and spaced from a landing station contained therein, the aircraft guidance method comprising the steps of: guiding each successive aircraft directly toward the entry gate until each arrives approximately at the perimeter of the same approach zone; guiding each successive aircraft around the perimeter of the approach zone until it arrives approximately at the entry gate; and guiding each successive aircraft directly toward the landing station as each passes through the entry gate.

38. A command signal smoothing circuit for use with an air traffic control system wherein command signals are periodically communicated to each of a plurality C of aircraft at different data intervals on a time shared basis, said smoothing circuit comprising: means for producing a first signal proportional to the current computed value of a command signal proportional to the departure of a flight condition of the aircraft from an ideal flight condition; means for storing a second signal proportional to the past smoothed value of a command signal for C data intervals; means for subtracting said second signal from said first signal for deriving a difference signal; and means for subtracting a fraction of said difference signal from said second signal for deriving an output signal proportional to the current smoothed value of the command signal.

39. In an air traffic control system for directing aircraft downwardly and along an ideal glidepath through a landing system entry gate, the method of controlling the speed of an aircraft to guide it to the entry gate at a selected time of arrival, said method comprising the steps of: producing a first signal proportional to an estimated time to arrival of the aircraft as a function of the position of the aircraft, said estimated time to arrival being computed assuming that the aircraft will follow an ideal course and glidepath and will have an ideal velocity, deriving a second signal proportional to a selected ideal time to arrival of the aircraft, said selected ideal time to arrival decreasing with respect to time at a constant rate; and changing the speed of the aircraft in a manner to reduce departure of said first signal from said second signal to zero.

40. In an air traffic control system for directing aircraft downwardly and along an ideal glidepath through a landing system entry gate, the combination comprising: a relatively fixed surface-based radar station for producing output signals proportional to the position of an aircraft; means at said station responsive to said position signals for producing a first comparison signal proportional to an estimated entry gate time to arrival of the aircraft computed assuming that the aircraft will fly an ideal course, glidepath and at an ideal velocity; means at said station for producing a second comparison signal proportional to a selected ideal time to arrival of the aircraft, said second signal decreasing with time at a constant rate; means at said station for producing a difference signal proportional to the departure of said first signal from said second signal; and means at said station for communicating said difference signal to the aircraft.

41. In an air traffic control system for directing aircraft downwardly and along an ideal glide path through a landing system entry gate, the combination comprising: a relatively fixed surface-based radar station for producing output signals proportional to the position of an aircraft; means at said station responsive to said position signals for producing a first comparison signal proportional to an estimated entry gate time to arrival of the aircraft computed assuming that the aircraft will fly an ideal course, glidepath and at an ideal velocity; means at said station for producing a second comparison signal proportional to a selected ideal time to arrival of the aircraft, said second signal decreasing with time at a constant rate; means at said station for producing a difference signal proportional to the departure of said first signal from said second signal; a radio transmitter at said station for communicating said difference signal to the aircraft; a receiver in said aircraft for receiving the output signal of said radio transmitter; and means in said aircraft for visually indicating said difference signal, whereby the pilot of the aircraft may change the speed thereof to reduce said difference signal to zero.

42. In an air traffic control system for directing aircraft downwardly and along an ideal glidepath through a landing system entry gate, the combination comprising: a relatively fixed surface-based radar station for producing output signals proportional to the position of an aircraft; means at said station responsive to said position signals for producing a first comparison signal proportional to an estimated entry gate time to arrival of the aircraft computed assuming that the aircraft will fly an ideal course, glidepath and at an ideal velocity; means at said station for producing a second comparison signal proportional to a selected ideal time to arrival of the aircraft, said second signal decreasing with time at a constant rate; means at said station for producing a difference signal proportional to the departure of said first signal from said second signal; a radio transmitter at said station to communicate said difference signal to the aircraft; a receiver in the aircraft to receive the output signal of said radio transmitter; and an autopilot responsive to the output of said receiver to control the speed of the aircraft in a manner to reduce said difference signal to zero.

References Cited in the file of this patent

UNITED STATES PATENTS

| | | |
|---|---|---|
| 2,429,595 | Abraham | Oct. 28, 1947 |
| 2,458,361 | Field et al. | Jan. 4, 1949 |
| 2,521,697 | Deloraine | Sept. 12, 1950 |
| 2,543,002 | Deloraine | Feb. 27, 1951 |
| 2,613,350 | Kellogg | Oct. 7, 1952 |
| 2,613,352 | Kellogg | Oct. 7, 1952 |
| 2,709,807 | Strong | May 31, 1955 |
| 2,776,099 | Ferrill | Jan. 1, 1957 |

UNITED STATES PATENT OFFICE
Certificate of Correction

April 24, 1962

Patent No. 3,031,658

David J. Green et al.

It is hereby certified that error appears in the above numbered patent requiring correction and that the said Letters Patent should read as corrected below.

Column 1, line 39, for "disclosed" read —disposed—; column 2, line 72, for "aircarft" read —aircraft—; column 3, line 15, strike out "by the phase", first occurrence; column 7, line 28, after "means" insert —are provided—; same column, line 67, for "exict" read —evict—; column 13, line 12, for "regitser" read —register—; column 14, line 54, for "4100" read —4000—; column 15, line 48, for "system" read —station—; column 19, line 74, for "analog digital" read —analog-to-digital—; column 22, lines 27 and 28, for "leading" read —heading—; same column, line 45, for "E. From" read —E from—; column 24, line 47, for "is" read —circuits—; same column, lines 47 and 52, for "circuit", each occurrence, read —circuits—; same column, line 59, for "as" read —is—; column 27, line 3, for "$P_R$. The" read —$P_R$, the—; column 28, line 5, for "commpand" read —command—; lines 20 and 22, for "synchroniing", each occurrence, read —synchronizing—; same column, line 26, before "associated" insert —an—; column 33, line 64, for "in" read —and—; line 68, after "time" insert a comma; column 34, line 46, for "been" read —be—; column 37, line 70, for "—$(R_{ea}\Delta R_w)$" read ——$(R_{ea}-\Delta R_w)$—; column 38, line 58, for "$\theta$" read —$\phi$—; column 41, line 23, for "laterally" read —lateral—; column 43, line 28, for "$C_5$" read —$C_s$—; column 46, line 27, for "$[C_n-\overline{C}_{n-1}]$" read —$[\overline{C}_n-\overline{C}_{n-1}]$—; line 31, strike out "contained in the air to ground"; line 32, strike out "message register"; line 35, for "$[C_n-\overline{C}_{n-1}]$" read —$[\overline{C}_n-\overline{C}_{n-1}]$—; column 48, line 21, strike out "when"; column 49, line 25, for "grounded" read —ground—; line 46, before "mechanism" insert —storage—; same column, line 69, for "permit" read —prevent—; column 50, line 18, strike out ", the servo"; column 56, line 5, after "$R_{ea}$" insert —signal—; same column, line 5, after "$R_{ec}*$" insert —signal—; column 57, line 52, for "cordinate" read —coordinate—; column 58, line 32, for "approxmiately" read —approximately—; column 59, line 41, for the right-hand portion of the equation for "$(O_{n-1})$" read —$(O'_{n-1})$—.

Signed and sealed this 2nd day of October 1962.

[SEAL]

Attest:
ERNEST W. SWIDER,
*Attesting Officer.*

DAVID L. LADD,
*Commissioner of Patents.*